(12) United States Patent
Yan et al.

(10) Patent No.: US 9,725,158 B2
(45) Date of Patent: Aug. 8, 2017

(54) SELF-RIGHTING FRAME AND AERONAUTICAL VEHICLE AND METHOD OF USE

(71) Applicants: Gaofei Yan, Hallandale, FL (US); James Dees, Hallandale, FL (US)

(72) Inventors: Gaofei Yan, Hallandale, FL (US); James Dees, Hallandale, FL (US)

(*) Notice: Subject to any disclaimer, the term of this patent is extended or adjusted under 35 U.S.C. 154(b) by 0 days.

(21) Appl. No.: 15/257,904

(22) Filed: Sep. 6, 2016

(65) Prior Publication Data

US 2016/0375983 A1    Dec. 29, 2016

Related U.S. Application Data

(60) Continuation-in-part of application No. 14/977,546, filed on Dec. 21, 2015, now Pat. No. 9,434,462, (Continued)

(30) Foreign Application Priority Data

Jul. 23, 2010    (CN) .......................... 2010 1 0235257

(51) Int. Cl.
| | |
|---|---|
| *B64C 27/08* | (2006.01) |
| *B64C 17/02* | (2006.01) |
| *B64C 39/02* | (2006.01) |
| *B64D 47/08* | (2006.01) |
| *B64C 1/08* | (2006.01) |

(Continued)

(52) U.S. Cl.
CPC ............. *B64C 17/02* (2013.01); *A63H 15/06* (2013.01); *A63H 27/12* (2013.01); *A63H 30/04* (2013.01); *A63H 33/005* (2013.01); *B64C 1/00* (2013.01); *B64C 1/061* (2013.01); *B64C 1/08* (2013.01); *B64C 17/00* (2013.01); *B64C 27/10* (2013.01); *B64C 39/024* (2013.01); *B64D 47/08* (2013.01); *G05D 1/0011* (2013.01); *G05D 1/0094* (2013.01); *B64C 2201/12* (2013.01)

(58) Field of Classification Search
USPC ..... 244/17.23, 17.11, 119, 8, 17.19; 446/36, 446/37
See application file for complete search history.

(56) References Cited

U.S. PATENT DOCUMENTS 3,019,555 A    2/1962  Poticha
3,204,891 A    9/1965  Cline
(Continued)

*Primary Examiner* — Christopher P Ellis
(74) *Attorney, Agent, or Firm* — Allen D. Hertz, P.A.; Allen D. Hertz

(57) ABSTRACT

A self-righting aeronautical vehicle comprising a hollowed frame and a lift mechanism. The exterior of the frame and center of gravity are adapted to self-right the vehicle. The frame can include sealed, hollowed sections for use in bodies of water. The frame can be spherical in shape enabling inspection of internal surface of partially or fully enclosed structures. Inspection equipment can be integrated into the vehicle and acquired data can be stored or wirelessly communicated to a server. A controlled or other mass can be pivotally assembled to a pivot axle spanning across the interior of the frame. The pivot axis can rotate about a vertical axis (an axis perpendicular to the elongated axis). The propulsion mechanisms can be adapted for use as a terrestrial vehicle when enclosed in a sealed spherical shell.

22 Claims, 38 Drawing Sheets

Related U.S. Application Data which is a division of application No. 14/751,104, filed on Jun. 25, 2015, now Pat. No. 9,216,808, which is a division of application No. 14/022,213, filed on Sep. 9, 2013, now Pat. No. 9,067,667, which is a continuation-in-part of application No. 13/096,168, filed on Apr. 28, 2011, now Pat. No. 8,528,854.

(51) Int. Cl.

| | |
|---|---|
| *B64C 27/10* | (2006.01) |
| *G05D 1/00* | (2006.01) |
| *A63H 27/00* | (2006.01) |
| *A63H 30/04* | (2006.01) |
| *A63H 33/00* | (2006.01) |
| *A63H 15/06* | (2006.01) |
| *B64C 1/00* | (2006.01) |
| *B64C 1/06* | (2006.01) |
| *B64C 17/00* | (2006.01) |

(56) References Cited

U.S. PATENT DOCUMENTS

| | | |
|---|---|---|
| 3,213,944 A | 10/1965 | Nichols et al. |
| 4,065,873 A | 1/1978 | Jones |
| 5,071,383 A | 12/1991 | Kinoshita |
| 5,645,248 A | 7/1997 | Campbell |
| 6,550,715 B1 | 4/2003 | Reynolds et al. |
| 7,273,195 B1 | 9/2007 | Golliher |
| 8,033,498 B2 | 10/2011 | Blackburn |
| 9,061,558 B2 | 6/2015 | Kalantari et al. |
| 2006/0121818 A1 | 6/2006 | Lee et al. |
| 2009/0215355 A1 | 8/2009 | Elson et al. |
| 2010/0120321 A1 | 5/2010 | Rehkemper et al. |
| 2010/0224723 A1 | 9/2010 | Apkarian |
| 2011/0226892 A1* | 9/2011 | Crowther .......... B64C 1/30 244/17.23 |
| 2014/0319266 A1 | 10/2014 | Moschetta et al. |
| 2015/0377405 A1* | 12/2015 | Down .......... B64C 39/024 73/865.8 |
| 2016/0280359 A1* | 9/2016 | Semke .......... B64C 25/32 |
| 2017/0050726 A1* | 2/2017 | Yamada .......... B64C 27/08 |

\* cited by examiner

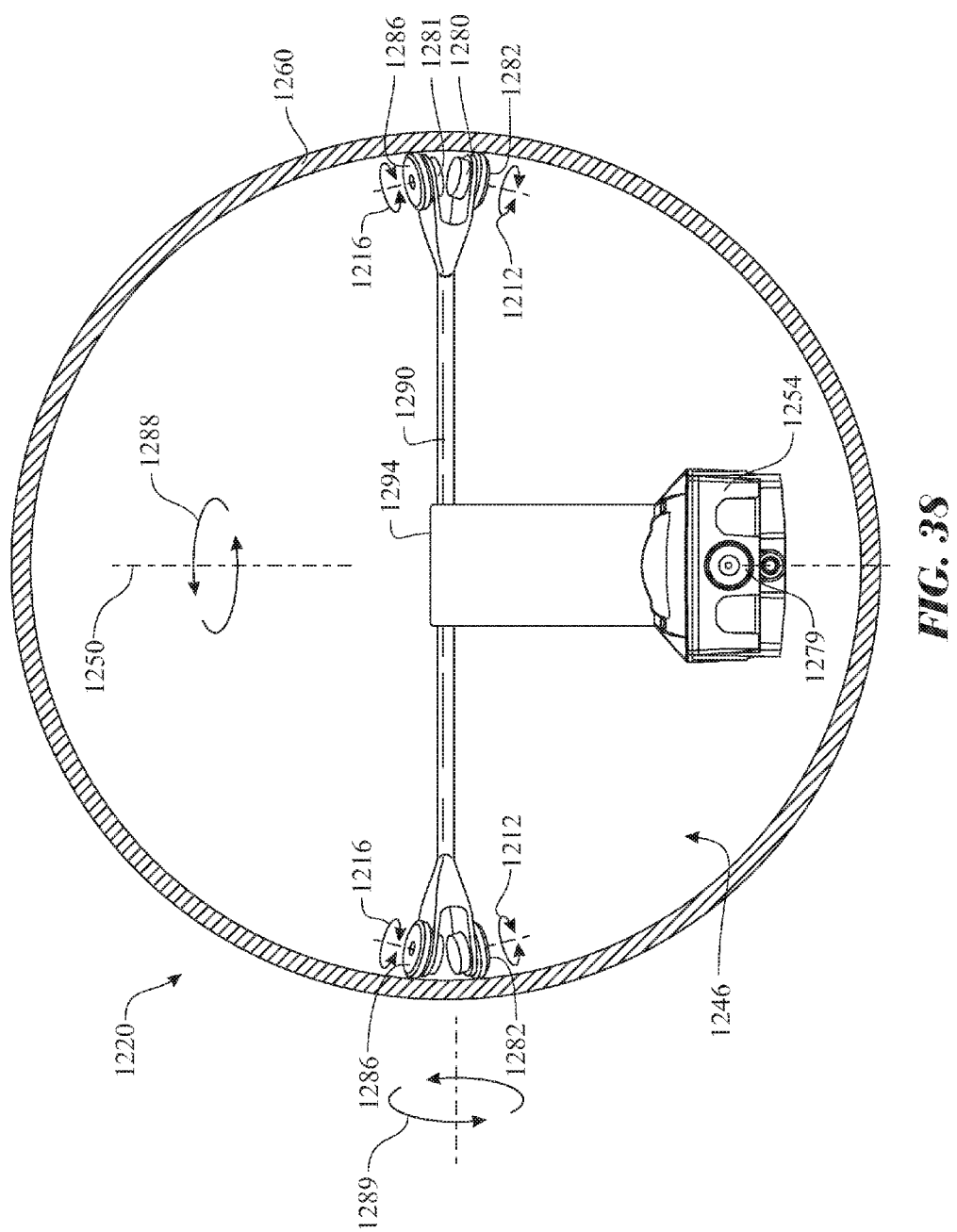

SELF-RIGHTING FRAME AND AERONAUTICAL VEHICLE AND METHOD OF USE

CROSS-REFERENCE TO RELATED APPLICATION

This Non-Provisional Utility patent application is:
a Continuation-In-Part application (OP) claiming the benefit of U.S. Non-Provisional patent application Ser. No. 14/977,546, filed on Dec. 21, 2015, scheduled to issue as U.S. Pat. No. 9,216,808 on Sep. 6, 2016,
which is a Divisional application claiming the benefit of U.S. Non-Provisional patent application Ser. No. 14/751,104, filed on Jun. 25, 2015, now issued as U.S. Pat. No. 9,216,808 on Dec. 22, 2015,
which is a Divisional application claiming the benefit of U.S. Non-Provisional patent application Ser. No. 14/022,213, filed on Sep. 9, 2013, now issued as U.S. Pat. No. 9,067,667 on Jun. 30, 2015,
which is a Continuation-in-Part application claiming the benefit of U.S. Non-Provisional patent application Ser. No. 13/096,168, filed on Apr. 28, 2011, which issued as U.S. Pat. No. 8,528,854 on Sep. 10, 2013,
which claims the benefit of co-pending Chinese Patent Application Serial No. 201010235257.7, filed on Jul. 23, 2010,
all of which are incorporated herein in their entireties.

FIELD OF THE INVENTION

The present disclosure generally relates to apparatuses and methods for a frame and the construction of a frame that rights itself to a single stable orientation. More particularly, the present disclosure relates to an ovate frame that rights itself to an upright orientation regardless of the frame's initial orientation when placed on a surface.

BACKGROUND OF THE INVENTION

Remote controlled (RC) model airplanes have been a favorite of hobbyists for many years. Initially, in the early years of RC aircraft popularity, the radio controls were relatively expensive and required a larger model aircraft to carry the weight of a battery, receiver and the various servos to provide the remote controllability for the model aircraft. These aircraft were typically custom built of lightweight materials, such as balsa wood, by the hobbyist. Consequently, these RC models represented a significant investment of the hobbyist's time, effort, experience, and money. Further, because of this investment, the hobbyist needed a high degree of expertise in flying the model aircraft to conduct safe operations and prevent crashes. In the event of a crash, most models would incur significant structural damage requiring extensive repairs or even total rebuilding of the model. For these reasons, participation in this hobby was self-restricting to the few who could make the required investments of time and money.

As innovations in the electronics industry resulted in smaller and less inexpensive electronics, the cost and size of radio control units were also reduced allowing more hobbyists to be able to afford these items. Further, these advances also result in reductions in weight of the battery, receiver and servos, which benefits could then be realized in smaller and lighter model airframes. This meant that the building of the airframes could become simpler and no longer requiring the degree of modeling expertise previously required. Simplicity of construction and durability of the airframes were further enhanced with the advent of more modern materials, such as synthetic plastics, foams, and composites, such that the airframes could withstand crashes with minimal or even no damage.

These RC models were still based upon the restraints of airplane aerodynamics meaning they still needed a runway for takeoffs and landings. While the length of the required runways (even if only a relatively short grassy strip) vary according to the size of the RC model, the requirement often relegated the flying of these models to designated areas other than a typical back yard. Model helicopters, like the full-scale real life aircraft they are based upon, do not require runways and can be operated from small isolated areas. However, a helicopter with a single main rotor requires a tail rotor, whether full scale or model, also requires a tail rotor to counter the rotational in flight moment or torque of the main rotor. Flying a helicopter having a main rotor and a tail rotor requires a level of expertise that is significantly greater than required for a fixed wing aircraft, and therefore limits the number of hobbyists that can enjoy this activity.

The complexity of remotely flying a model helicopter has at least been partially solved by small prefabricated models that are battery operated and employ two main counter-rotating rotors. The counter-rotation of the two rotors results in equal and counteracting moments or torques applied to the vehicle and therefore eliminating one of the complexities of piloting a helicopter-like vertical take-off and landing model. These models typically have another limiting characteristic in that the form factor of the structure and the necessary placement of the rotors above the vehicle structure result in a tendency for the vehicle to be prone to tipping on one or the other side when landing. In the event of this occurring, the vehicle must be righted in order for further operations and thus requires the operator or other individual to walk to the remote location of the vehicle and right it so that the operator can again command the vehicle to take off.

Therefore, a self-righting structural frame and corresponding vertical take-off vehicle design is needed to permit remote operation of a helicopter-like RC model without the need to walk to a landing site to right the vehicle in the event the previous landing results in a vehicle orientation other than upright.

Inspection of interiors of enclosed structures, such as piping, fuel tanks, water tanks, and the like can be a difficult task. Automated equipment is unable to inspect vertically oriented surfaces.

Therefore, an automated or remotely controlled device capable of reliably inspecting interior surfaces of enclosed structures is needed.

SUMMARY OF THE INVENTION

The present disclosure is generally directed to an aeronautical vehicle that rights itself from an off-kilter, an off-seated, or an inverted state to an upright state, the aeronautical vehicle incorporating:
a self-righting substantially dome shaped vehicle body having an upper region comprising an upper airflow passageway at an upper region, a lower airflow passageway at a lower region, and a convex exterior surface extending between the upper region and the lower region, the self-righting vehicle body defining an interior void, wherein the upper airflow passageway and the lower airflow passageway enable airflow into and from the interior void;

at least one of an apex and a protrusion located generally centered within the upper region of the substantially dome shaped vehicle body, a propulsion system located within the interior void, wherein, the at least one of the apex and the protrusion provides an initial instability to begin a self-righting process when said frame assembly is placed on a generally horizontal surface oriented having the at least one of the apex and the protrusion contacting the generally horizontal surface.

In a second variant, the present disclosure is generally directed to an aeronautical vehicle that rights itself from an off-kilter, an off-seated, or an inverted state to an upright state, the aeronautical vehicle comprising a self-righting frame assembly including:
  a frame structure comprising one of:
    a) at least one generally vertically oriented frame member having an generally uninterrupted, continuous peripheral edge between a top portion and a base portion, and at least one generally horizontally oriented frame, said at least one generally vertically oriented frame member and said at least one generally horizontally oriented frame being mechanically coupled to one another at each intersecting location, said at least one generally vertically oriented frame member and said at least one generally horizontally oriented frame defining a central void, said at least one generally vertically oriented frame member and said at least one generally horizontally oriented frame being arranged in a fixed spatial relationship, or
    b) at least two vertically oriented frame members in registration with a plane extending radially outward from a central vertical axis of said self-righting frame assembly, said at least two vertically oriented frame members having an generally uninterrupted, continuous peripheral edge between a top portion and a base portion, said at least two vertically oriented frame members defining a central void, said at least two vertically oriented frames being arranged in a fixed spatial relationship;
  a lift and stabilization panel carried by a segment of an upper region of said frame structure, said lift and stabilization panel, said lift and stabilization panel providing at least one of:
    enhanced stability during any motion;
    lift when said frame assembly is moving in a generally horizontal motion;
    drag when said frame assembly is moving in a generally vertical motion;
  a weighted mass carried by a lower section of the frame assembly for the purpose of positioning a center of gravity of the frame assembly proximate to a bottom of the frame assembly; and
  an apex formed at a top of the at least one generally vertically oriented frame member for providing an initial instability to begin a self-righting process when the frame assembly is off-kilter; wherein:
    when the frame assembly is off-kilter and resting on a frame assembly supporting surface, the frame assembly contacts the frame assembly supporting surface at the apex and at a point on at least one of the at least one generally vertically oriented frame member and further wherein the apex extends from the top of the at least one generally vertically oriented frame member a distance such that a central axis of the at least one generally vertically oriented frame member is sufficiently angulated from vertical to horizontally displace the center of gravity beyond the point of contact of the at least one vertical frame thereby producing a righting moment to return the frame assembly to an upright equilibrium position,
  at least one propulsion system carried by at least one generally vertically oriented frame member and extending into the central void of the self-righting frame assembly, the at least one propulsion system oriented to provide a lifting force;
  a power supply carried by the self-righting frame assembly and operationally connected to the at least one propulsion system for operatively powering the at least one propulsion system; and
  an electronics assembly carried by the self-righting frame for receiving remote control commands and communicatively interconnected to the power supply for remotely controlling the aeronautical vehicle to take off, to fly, and to land on a frame assembly supporting surface.

In a second aspect, the at least one generally vertically oriented frame member and the at least one generally horizontally oriented frame member is oriented at a substantially perpendicular angle one to the other.

In another aspect, the each of the at least one generally vertically oriented frame member is shaped having at least one of:
  a width dimension, wherein the width dimension is defined as a dimension between the central vertical axis and the radially outer edge of the vertical frame, wherein a height dimension is less than or equal to twice the width dimension,
  a semi-elliptical shape and further wherein the elliptical shape has a horizontal major axis and a vertical minor axis, and
  a semi-circular shape.

In yet another aspect, the self-righting frame assembly includes at least two vertically oriented frames defining a central void and having a central vertical axis. At least one horizontally oriented frame is desired and would be affixed to the vertical frames extending about an inner periphery of the vertical frames for maintaining the vertical frames at a fixed spatial relationship. The at least one horizontally oriented frame provides structural support, allowing a reduction in structural rigidity of the vertical frames. It is understood the at least one horizontally oriented frame can be omitted where the vertical frames are sufficiently designed to be structurally sound independent thereof. A weighted mass is mounted within the frame assembly and positioned proximate to a bottom of the frame assembly along the central vertical axis for the purpose of positioning the center of gravity of the frame assembly proximate to the bottom of the frame assembly. At a top of the vertical axis, it is desirous to include a protrusion extending above the vertical frames for providing an initial instability to begin a self-righting process when the frame assembly is inverted. It is understood that the protrusion may be eliminated if the same region on the self-righting frame assembly is design to minimize any supporting surface area to provide maximum instability when placed in an inverted orientation. When the frame assembly is inverted and resting on a frame assembly supporting surface, the frame assembly contacts the frame assembly supporting surface at the protrusion and at a point on at least one of the vertical frames. The protrusion extends from the top of the vertical axis and above the vertical frames a distance such that the central axis is sufficiently angulated from vertical to horizontally displace the center of gravity beyond the point of contact of the vertical frame and thereby producing a righting moment to return the frame assembly to an upright equilibrium position.

In yet another aspect, an aeronautical vehicle that rights itself from an inverted state to an upright or kilter state has a self-righting frame assembly including a protrusion extending upwardly from a central vertical axis. The protrusion provides an initial instability to begin a self-righting process when the aeronautical vehicle is inverted on a frame assembly supporting surface. At least one rotor is rotatably mounted in a central void of the self-righting frame assembly and oriented to provide a lifting force. A power supply is mounted in the central void of the self-righting frame assembly and operationally connected to the at least one rotor for rotatably powering the rotor. An electronics assembly is also mounted in the central void of the self-righting frame for receiving remote control commands and is communicatively interconnected to the power supply for remotely controlling the aeronautical vehicle to take off, to fly, and to land on a frame assembly supporting surface.

In yet another aspect, an aeronautical vehicle that rights itself from an off-kilter, an off-seated, or an inverted state to an upright state has a self-righting frame assembly including at least two vertically oriented intersecting elliptical frames. The terms off-kilter, off-seated, and inverted refer to a condition where the aeronautical vehicle is not resting on an aeronautical vehicle supporting surface in a desired state or in a proper orientation. The frames define a central void and each frame has a vertical minor axis and a horizontal major axis wherein the frames intersect at their respective vertical minor axes. Two horizontally oriented frames are affixed to the vertical frames and extend about an inner periphery of the vertical frames for maintaining the vertical frames at a fixed spatial relationship. A weighted mass is positioned within the frame assembly along the central vertical axis and is affixed proximate to a bottom of the frame assembly for the purpose of positioning a center of gravity of the aeronautical vehicle proximate to a bottom of the frame assembly. At a top of the vertical axis a protrusion, at least a portion of which has a spherical shape, extends above the vertical frames for providing an initial instability to begin a self-righting process when the aeronautical vehicle is inverted on a frame assembly supporting surface. When the aeronautical vehicle is inverted and resting on a frame assembly supporting surface, the frame assembly contacts the frame assembly supporting surface at the protrusion and at a point on at least one of the vertical frames. The protrusion extends from the top of the vertical axis and above the vertical frames a distance such that the central axis is sufficiently angulated from vertical to horizontally displace the center of gravity beyond the point of contact of the vertical frame thereby producing a righting moment to return the frame assembly to an upright equilibrium position. At least two rotors are rotatably mounted in the void of the self-righting frame assembly. The two rotors are co-axial along the central axis and counter-rotating one with respect to the other. The rotors are oriented to provide a lifting force, each rotor being substantially coplanar to one of the horizontal frames. A power supply is mounted in the weighted mass and operationally connected to the rotors for rotatably powering the rotors. An electronics assembly is also mounted in the weighted mass for receiving remote control commands and is communicatively interconnected to the power supply for remotely controlling the aeronautical vehicle to take off, to fly, and to land on a frame assembly supporting surface.

In yet another aspect, the self-righting aeronautical vehicle can be designed for manned or unmanned applications. The self-righting aeronautical vehicle can be of any reasonable size suited for the target application. The self-righting aeronautical vehicle can be provided in a large scale for transporting one or more persons, cargo, or smaller for applications such as a radio-controlled toy.

In yet another aspect, the one propulsion system further comprising at least one aerodynamic rotor or horizontally oriented propeller, wherein the at least one aerodynamic rotor is located within the central void of the self-righting frame assembly.

In yet another aspect, the self-righting aeronautical vehicle includes one propulsion system comprising a first aerodynamic rotor and a second aerodynamic rotor, wherein the first aerodynamic rotor and the second aerodynamic rotor rotate in opposite directions respective to one another. The first aerodynamic rotor and the second aerodynamic rotor can rotate about the same axis.

In yet another aspect, the self-righting aeronautical vehicle includes a first propulsion system comprising a first aerodynamic rotor, and a second propulsion system comprising a second aerodynamic rotor, wherein the first aerodynamic rotor and the second aerodynamic rotor rotate in opposite directions respective to one another.

In yet another aspect, each aerodynamic rotor is located within the central void of the self-righting frame assembly.

In yet another aspect, the one propulsion system further comprising a second aerodynamic rotor, wherein the second aerodynamic rotor is located within the central void of the self-righting frame assembly, wherein the first aerodynamic rotor rotates in a first direction and the second aerodynamic rotor rotates in a second, opposite direction.

In another aspect, the at least two vertically oriented frames are oriented substantially at equal angles one to the other such that their intersection defines the central vertical axis.

In yet another aspect, the vertical frames define a substantially continuous outer curve about a periphery thereof.

In yet another aspect, the vertical frames are shaped having at least one of:
  a width dimension, wherein the width dimension is defined as a dimension between the central vertical axis and the radially outer edge of the vertical frame, wherein a height dimension is less than or equal to twice the width dimension,
  a semi-elliptical shape and further wherein the elliptical shape has a horizontal major axis and a vertical minor axis, and
  a semi-circular shape.

In yet another aspect, the frame structure is designed to self-right the frame assembly when the frame assembly is placed in an off-kilter, an off-seated, or an inverted orientation on the aeronautical vehicle supporting surface.

In yet another aspect, the frame can be utilized for any application desiring a self-righting structure. This can include any general vehicle, a construction device, a rolling support, a toy, and the like.

In yet another aspect, the frame can be utilized to protect operational components, including the propulsion system, power supply, electrical assembly, and the like.

In another variant, the self-righting frame assembly comprises:
  a hollow frame having an exterior shape, the hollow frame defining an interior or central void;
  a pivot axle spanning across the central void of the hollow frame; and a weighted mass controller assembly rotatably assembly to the pivot axle, wherein the weight of the weighted mass controller assembly retains the weighted mass controller assembly in a generally vertical orientation, wherein the exterior shape of the hollow frame being adapted to return the pivot axle to a horizontal orientation.

In another aspect, the pivot axle is pivotally assembled to the hollow frame.

In another aspect, the pivot axle is pivotally assembled to the hollow frame and the weighted mass controller assembly is rigidly mounted to the pivotal axle.

In another aspect, the pivot axle is rigidly assembled to the hollow frame.

In another aspect, the pivot axle is rigidly assembled to the hollow frame and the weighted mass controller assembly is pivotally mounted to the pivotal axle.

In another aspect, the pivot axle is pivotally assembled to the hollow frame and the weighted mass controller assembly is pivotally mounted to the pivotal axle.

In another aspect, the pivot axle is pivotally controlled respective to the frame by a pivotal control mechanism.

In another aspect, the weighted mass controller assembly is pivotally controlled on the pivot axle by a pivotal control mechanism.

In another aspect, each at least one propulsion member is attached to the weighted mass controller assembly.

In another aspect, each at least one propulsion member is attached to the self-righting frame assembly.

In another aspect, each at least one propulsion member has a center of gravity, wherein the center of gravity of each propulsion member is located below a center of gravity of the self-righting frame assembly.

In one application, the frame is spherical in shape, the aeronautical vehicle further comprises at least one inspection equipment, the application comprising steps of:

placing the aeronautical vehicle within an interior of an at least partially enclosed hollow structure, the interior defined to include at least one vertically arranged interior wall surface therein;

activating the aeronautical vehicle;

directing the aeronautical vehicle to travel by rolling along at least one generally vertically arranged interior wall surface of the at least partially enclosed hollow structure, wherein the maneuvering and lift mechanism provides lift to the aeronautical vehicle, wherein the maneuvering and lift mechanism provides lift remains in a generally vertically lifting orientation respective to the rotation of the spherically shaped frame.

In a second aspect of the application, the maneuvering and lift mechanism providing lift remains in a generally vertically lifting orientation by pivoting about a pivot axle.

In yet another aspect of the application, the pivotal motion employs gravity to retain the maneuvering and lift mechanism providing lift in a generally vertically lifting orientation.

In yet another aspect of the application, the pivotal motion employs an orientation controlling mechanism to position the maneuvering and lift mechanism respective to the frame.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 38 presents a front isometric view introducing an alternative adaptation of the remotely controlled aeronautical vehicle introduced in FIG. 36 to a terrain vehicle.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
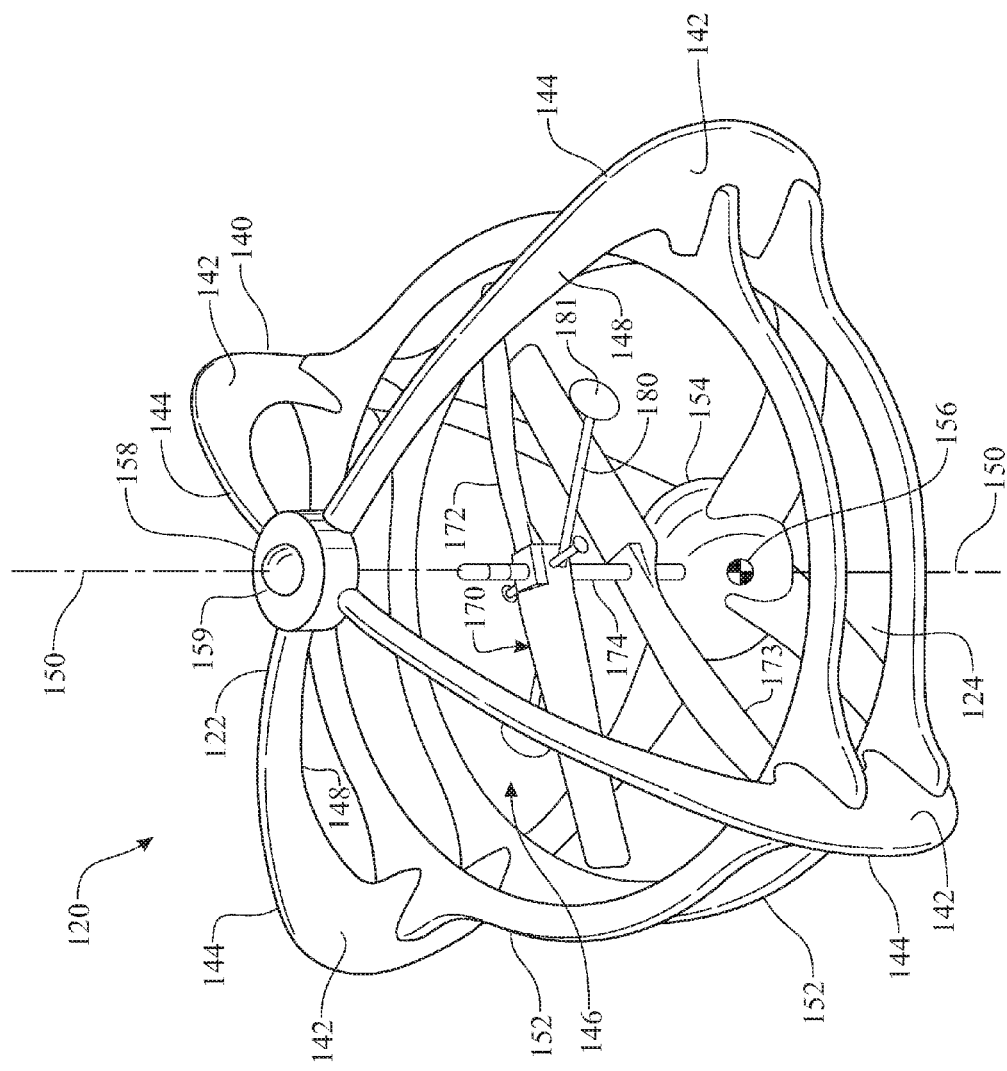
FIG. 1 presents an isometric view of an aeronautical vehicle having a self-righting frame according to the present invention.

A remotely controlled aeronautical vehicle 120 in accordance with a first exemplary embodiment is introduced in the illustration shown in FIG. 1. The remotely controlled aeronautical vehicle 120 employs a self-righting structural frame 140 and illustrates its various components.

Referring now to FIGS. 1 through 6, the aeronautical vehicle 120 and more particularly, the self-righting frame assembly 140 includes at least two substantially identical vertically oriented frames 142 arranged in an intersecting manner such that the axis of their intersection also defines a central vertical axis 150 of the self-righting frame assembly 140. The substantially identical vertically oriented frames 142 are further oriented one with respect to the other to substantially define equal angles about an outer periphery of the self-righting frame assembly 140.

Each substantially identical vertically oriented frame 142 defines an outer edge 144 having a continuous outer curve about a periphery of the respective vertically oriented frame 142. The substantially identical vertically oriented frames 142 may have a circular shaped outer curve 144, but in a most preferred embodiment, substantially identical vertically oriented frames 142 have an elliptical shape wherein the major axis (represented by dimension "a") 186 of FIG. 2) is the horizontal axis of the substantially identical vertically oriented frames 142 and wherein the minor axis (represented by dimension "b") 187 of FIG. 2) is the vertical axis of the substantially identical vertically oriented frames 142 (i.e., dimension "a" 186 is greater than dimension "b" 187). The substantially identical vertically oriented frames 142 also have an inner edge 148 which, if substantially identical vertically oriented frames 142 were rotated about axis 150, define a central void 146. A bottom edge 124 of the substantially identical vertically oriented frames 142 and thus of the self-righting frame assembly 140 is flattened instead of carrying the elliptical form through to central axis 150. The flattened bottom area 124 of the substantially identical vertically oriented frames 142 contributes to a stable upright equilibrium of the self-righting frame assembly 140.

At least one horizontal frame 152 extends about an inner periphery of the central void 146. In a most preferred embodiment, a pair of horizontal frames 152 extends about the inner periphery of the void 146 and are vertically spaced one from the other. The horizontal frames 152 are affixed to each vertically oriented frame 142 substantially at inner edges 148 of the substantially identical vertically oriented frames 142 and maintain the plurality of substantially identical vertically oriented frames 142 at a desired fixed spatial relationship one to the other, i.e. defining substantially equal angles one frame 142 with respect to an adjacent frame 142.

A weighted mass 154 is positioned within the frame assembly 140 and affixed thereto in a stationary manner. As illustrated, the weighted mass 154 is held captive in a stationary manner proximate to the bottom edge 124 of the plurality of substantially identical vertically oriented frames 142 along central vertical axis 150. While one manner of holding the weighted mass 154 captive is accomplished by the substantially identical vertically oriented frames 142 conforming to an outer periphery of the weighted mass 154, as illustrated. It is understood that other manners of retaining weighted mass 154 can be employed such as using mechanical fasteners, bonding agents such as glue or epoxy, or by other known methods of captive retention known in the industry. The preferred position and weight of the weighted mass 152 is selected to place the combined center of gravity 156 of the aeronautical vehicle 120 as close to the bottom edge 124 of the remotely controlled aeronautical vehicle 120 as possible and at a location preferably within the form factor of the weighted mass 154.

A protrusion 158 is affixed to a top portion 122 of frame assembly 140. The protrusion 158 extends upwardly and exteriorly from outer edge 144 of substantially identical vertically oriented frames 142 and in a preferred embodiment an upper most part of protrusion 158 has a spherical portion 159. In an alternate embodiment, the frame assembly 140 defines an apex. In a configuration including the protrusion 158, the protrusion 158 would preferably be in registration with the apex of the frame assembly 140. Those practiced in the art will readily recognize by the disclosures herein that the protrusion 158 can be any shape that provides for a single point of contact 194 (FIG. 9) at either an apex of the frame assembly 140 or, if included, the protrusion 158 with a frame assembly supporting surface 102 (FIG. 9) when the frame assembly 140 is in a substantially inverted orientation on the frame assembly supporting surface 102 (FIGS. 8-15).

Figure 2:
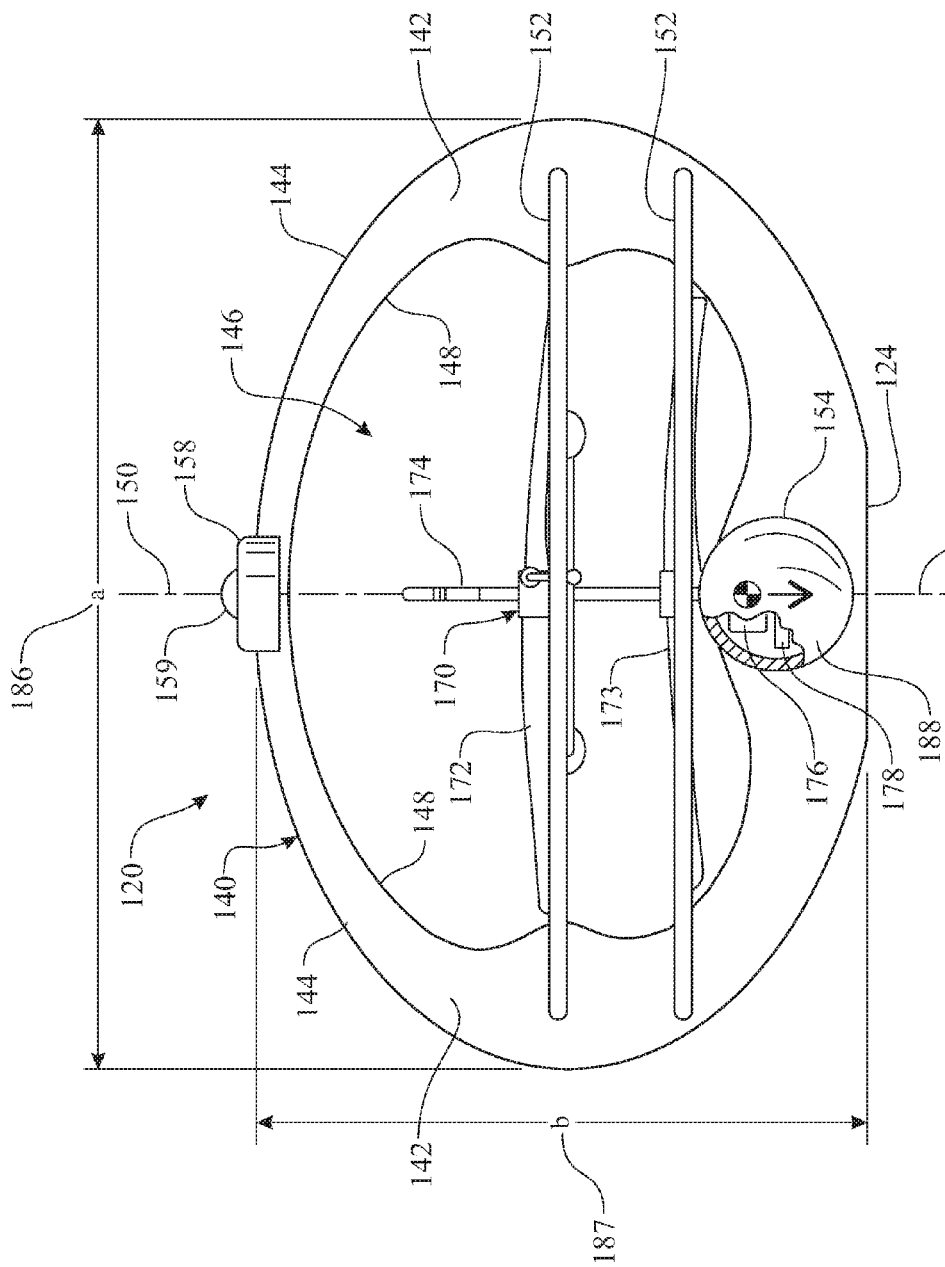
FIG. 2 presents a partially sectioned side elevation view of the aeronautical vehicle.
Figure 6:
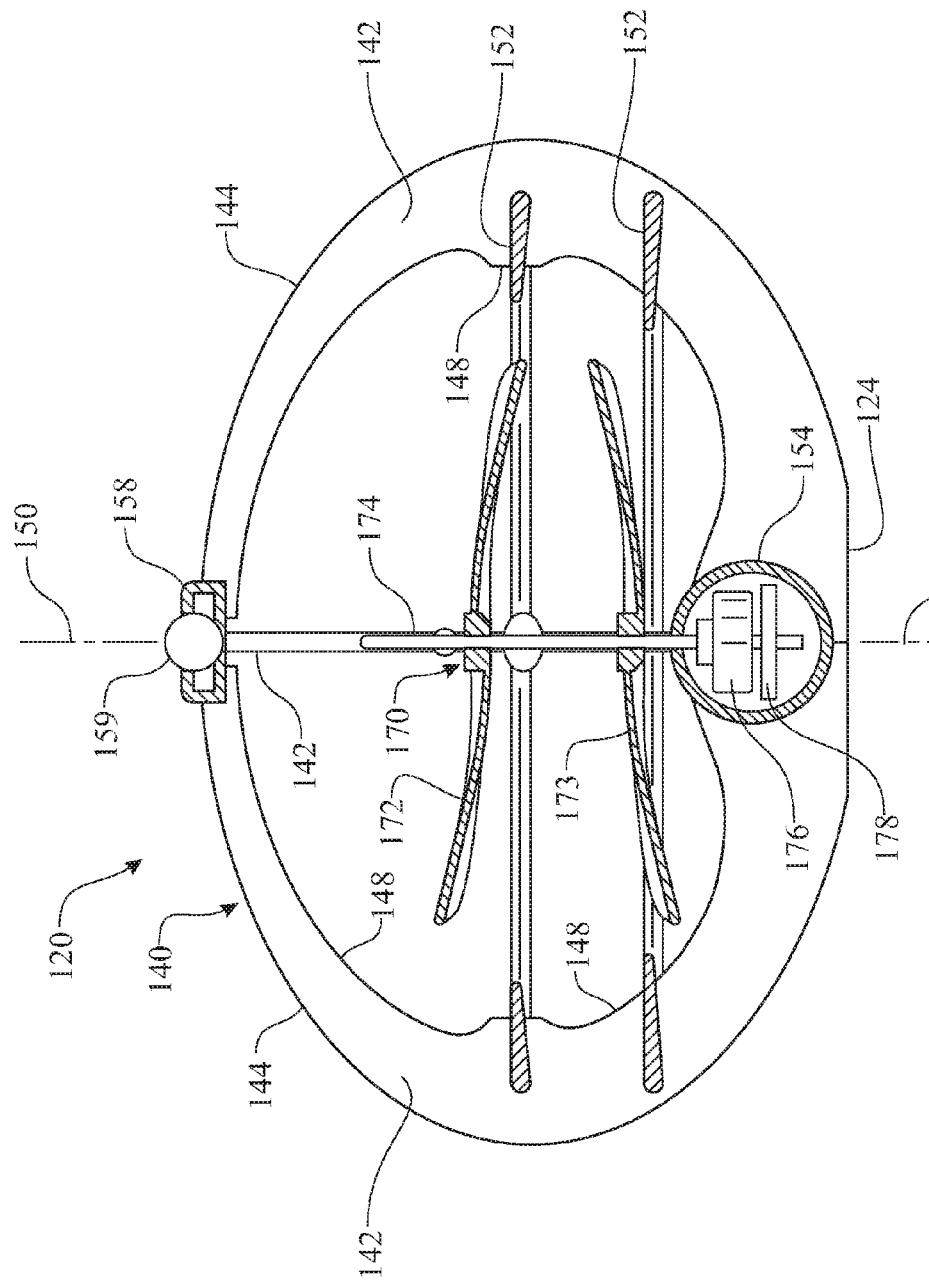
FIG. 6 presents a cross-sectional view of the aeronautical vehicle shown in FIG. 4, taken along the line 6-6 of FIG. 4.

As illustrated in FIGS. 1 through 6 and particularly in FIGS. 2 and 6, the self-righting frame 140 is easily adapted for use in a Vertical Take-Off and Landing (VTOL) aeronautical vehicle 120, here illustrated as a remotely controlled flyable model. The aeronautical vehicle 120 includes the self-righting frame assembly 140 and further includes a maneuvering and lift mechanism 170 for providing aeronautical lift and maneuvering of aeronautical vehicle 120 during flight operations. The maneuvering and lift mechanism 170 includes a power supply 176 and remote control electronics 178 for powering and controlling aeronautical vehicle 120 in flight operations. The power supply 176 as illustrated comprises an electrical battery and electric motor; however other power configurations utilized for flyable model aeronautical vehicles are also understood. The remote control electronics 178 are capable of receiving remote control radio frequency (RF) signals and translating those signals into control inputs to the power supply 176 for providing directional and velocity controls to the aeronautical vehicle 120. The power supply 176 and electronics 178 are further understood to be substantially the same as or adapted from like mechanisms utilized for remotely controlled helicopters, but may also be of a unique design for the aeronautical vehicle 120 and known to those practiced in the art.

Figure 3:
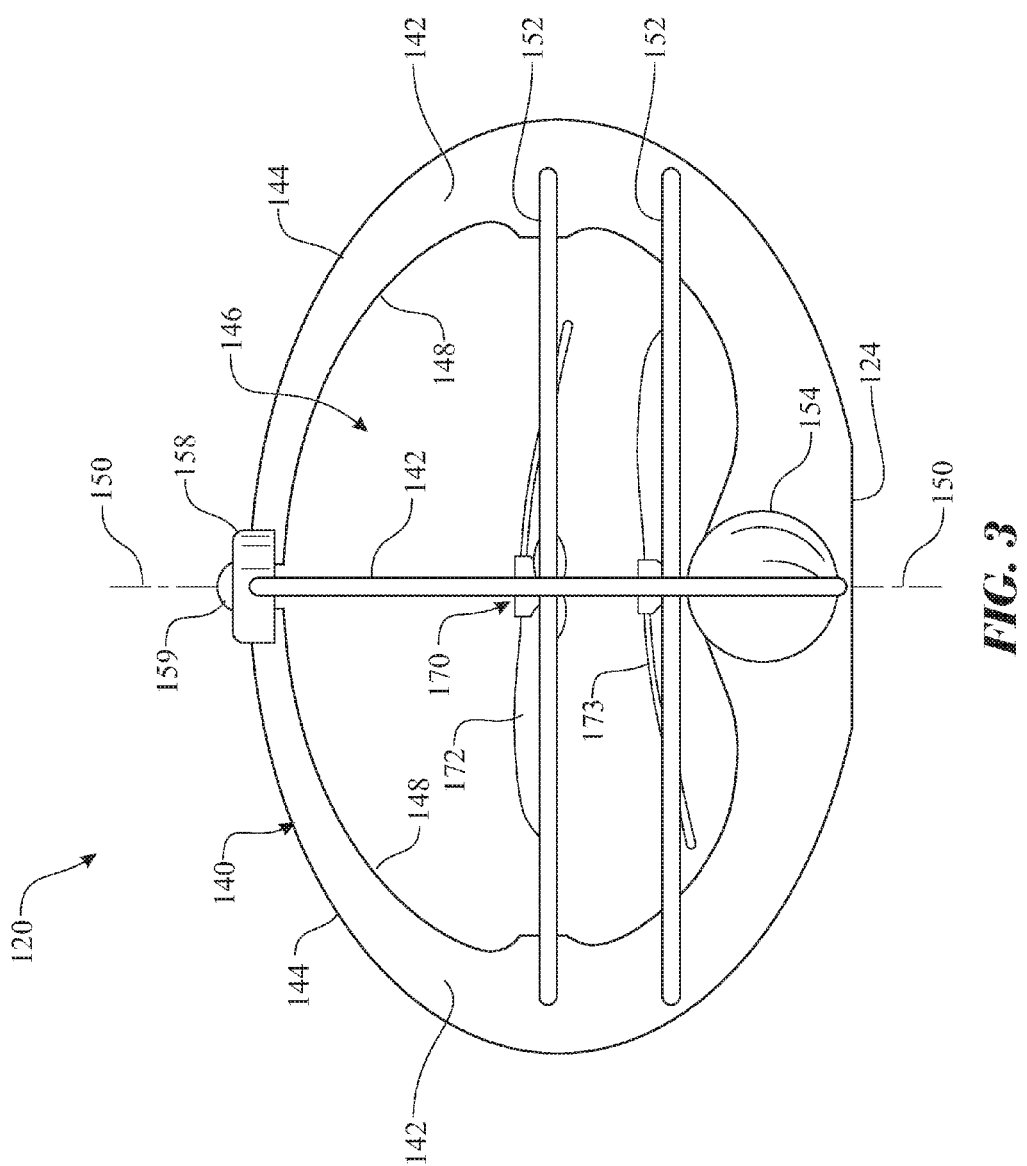
FIG. 3 presents a side elevation view of the aeronautical vehicle.
Figure 4:
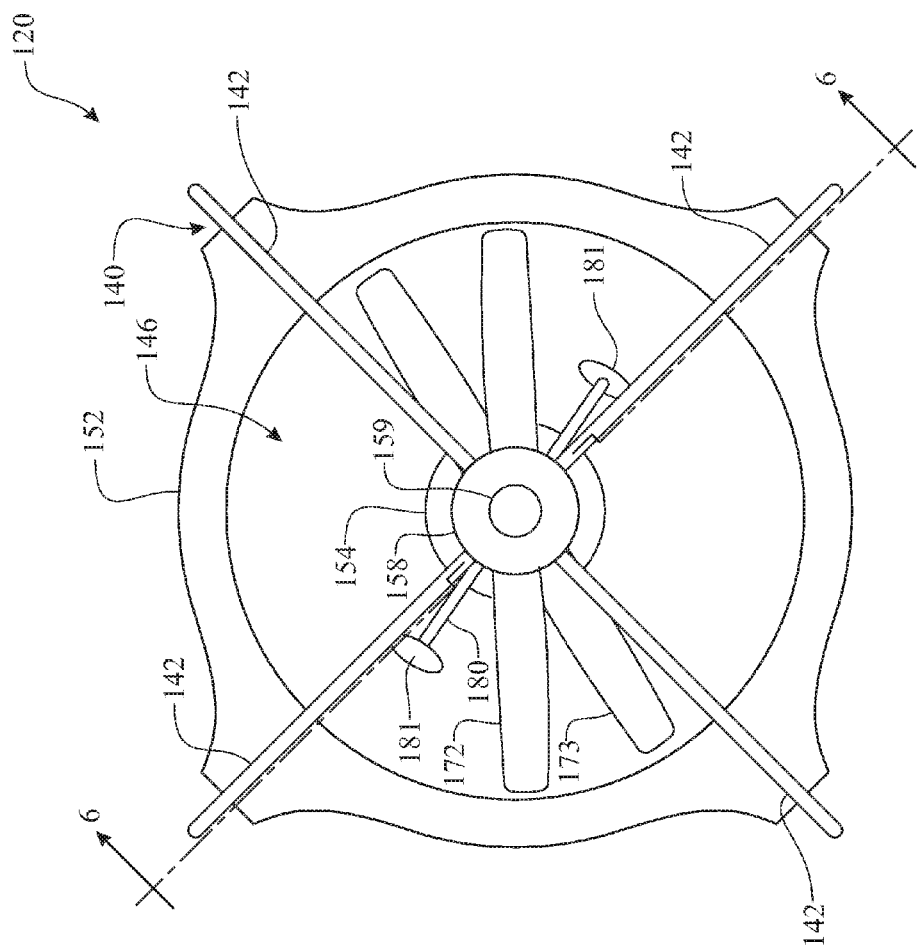
FIG. 4 presents a top plan view of the aeronautical vehicle.
Figure 5:
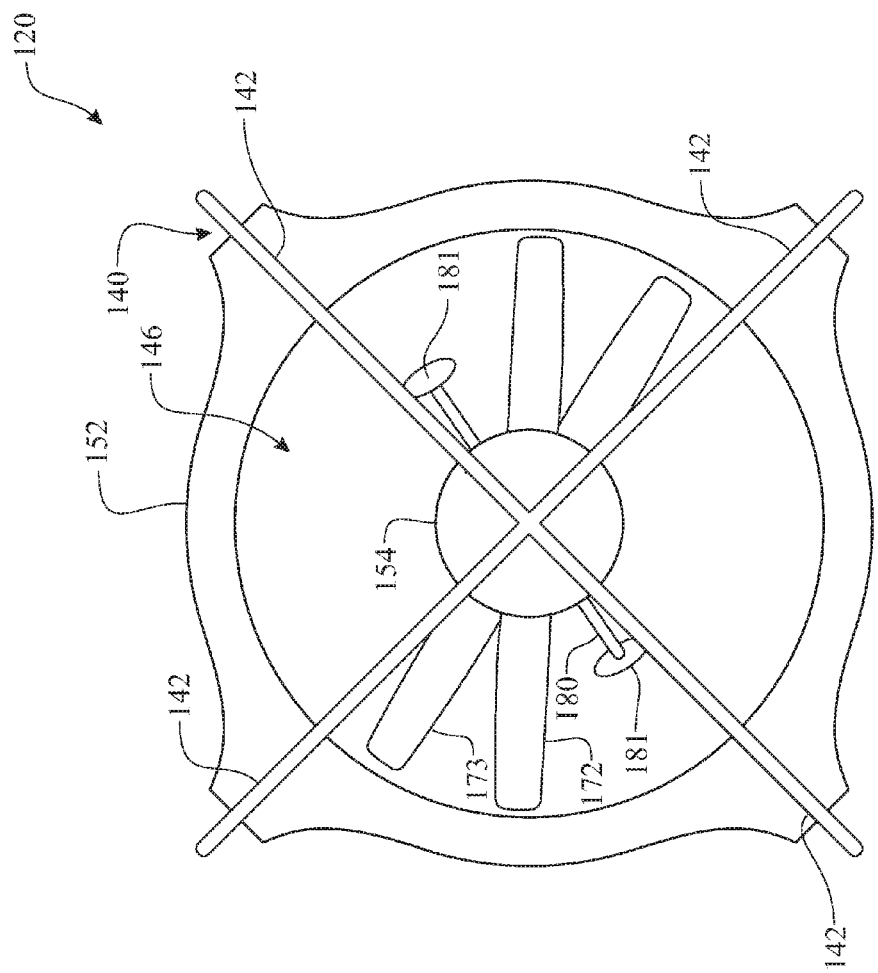
FIG. 5 presents a bottom plan view of the aeronautical vehicle.

The power supply 176 and respective electronics 178 are preferably housed within and contribute to the function of weighted mass 154 as previously described. A rotating mast 174 is connected to the power supply 176, wherein the rotating mast 174 extends upwardly from the weighted mass 154 and is coincident with the central axis 150. At least one aerodynamic rotor 172 is affixed to the rotating mast 174 and, when rotated at a sufficient speed, functions as a rotating airfoil to generate lift to raise the aeronautical vehicle 120 into the air for flying operations. However, as with all aeronautical vehicles employing a rotating aerodynamic rotor to provide lift, the aeronautical vehicle 120 also requires an anti-torque mechanism to maintain the rotational stability of the self-righting frame assembly 140. A preferred embodiment of aeronautical vehicle 120 includes a second aerodynamic rotor 173 that is also rotatably powered by the power supply 176 wherein each rotor 172, 173 is substantially co-planar with a respective horizontal frame 152 as illustrated in FIGS. 2 and 3. However, the second rotor 173 is geared or arranged to rotate in an opposite direction from the first rotor 172 and thus countering the torque produced by the first rotor 172. Such co-axial counter-rotating rotor systems are well known in VTOL design. Other anti-torque systems known in the art and contemplated herein include a single main rotor and a second mechanism such as a smaller rotor at right angles to the main rotor and proximate to a periphery of the frame 140 or dual laterally separated counter-rotating rotors.

The maneuvering and lift mechanism 170 can also include a stabilization mechanism comprising a stabilizer bar 180 having weights 181 at opposite ends thereof also rotatably affixed to mast 174 to rotate in conjunction with the rotors 172, 173. The stabilizer bar 180 and weights 181 during rotation stay relatively stable in the plane of rotation and thus contribute to the flight stability of the aeronautical vehicle 120. The stabilizer bar 180 and weights 181 are of a configuration known in the helicopter design art.

Figure 7:
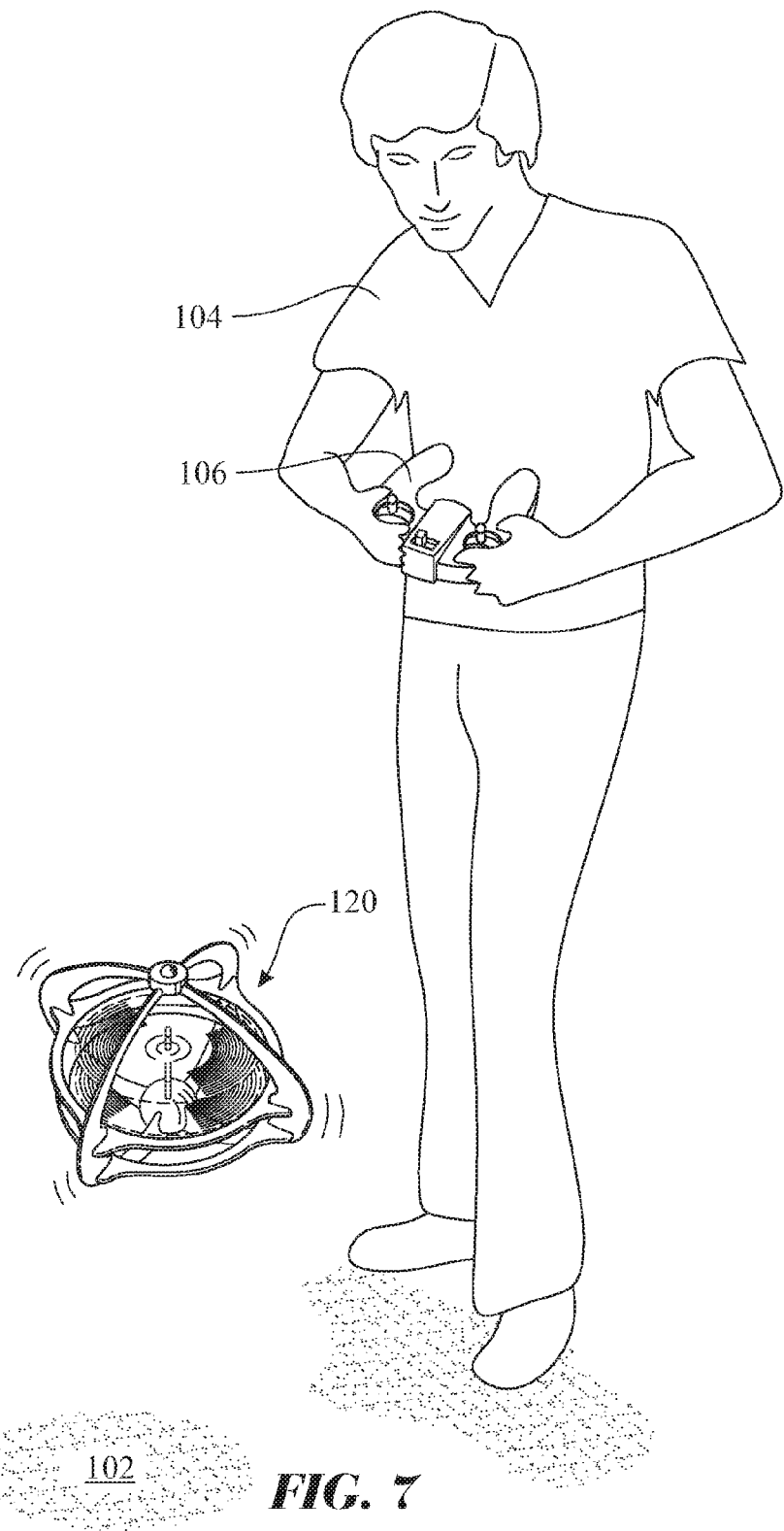
FIG. 7 presents a perspective view of a user remotely operating the aeronautical vehicle.
Figure 16:
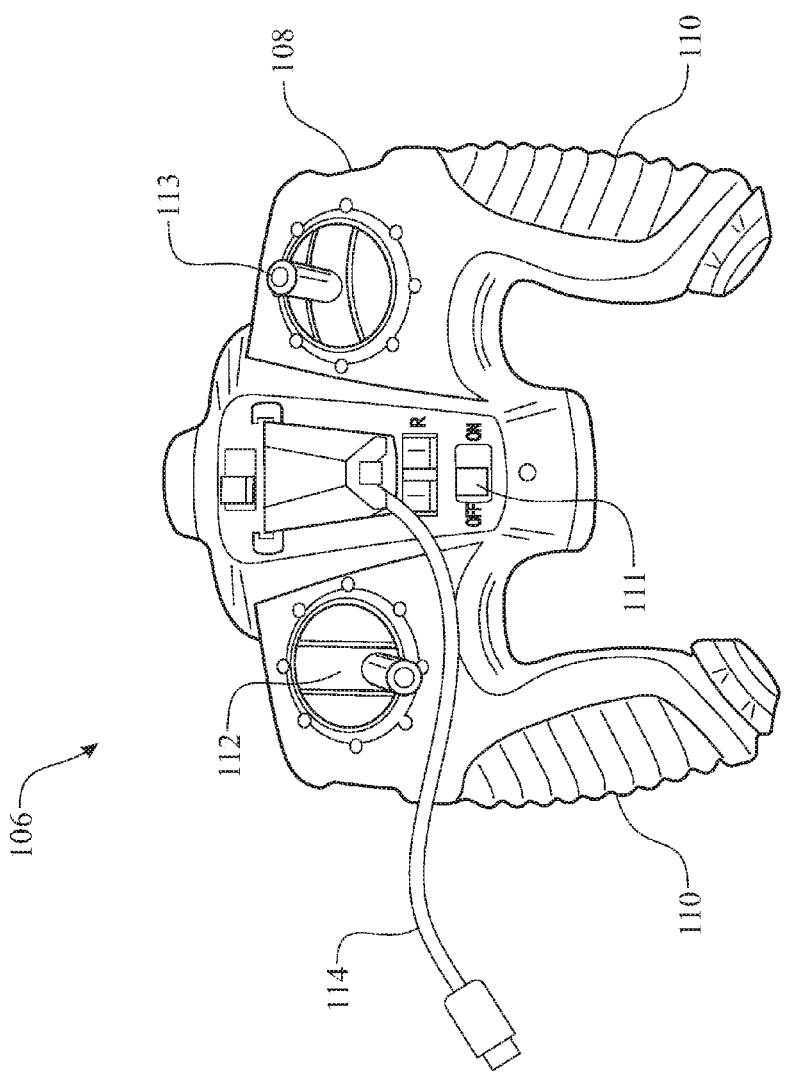
FIG. 16 presents a top perspective view of a representative remote control unit for use by a user for remotely controlling the aeronautical vehicle.
Figure 17:
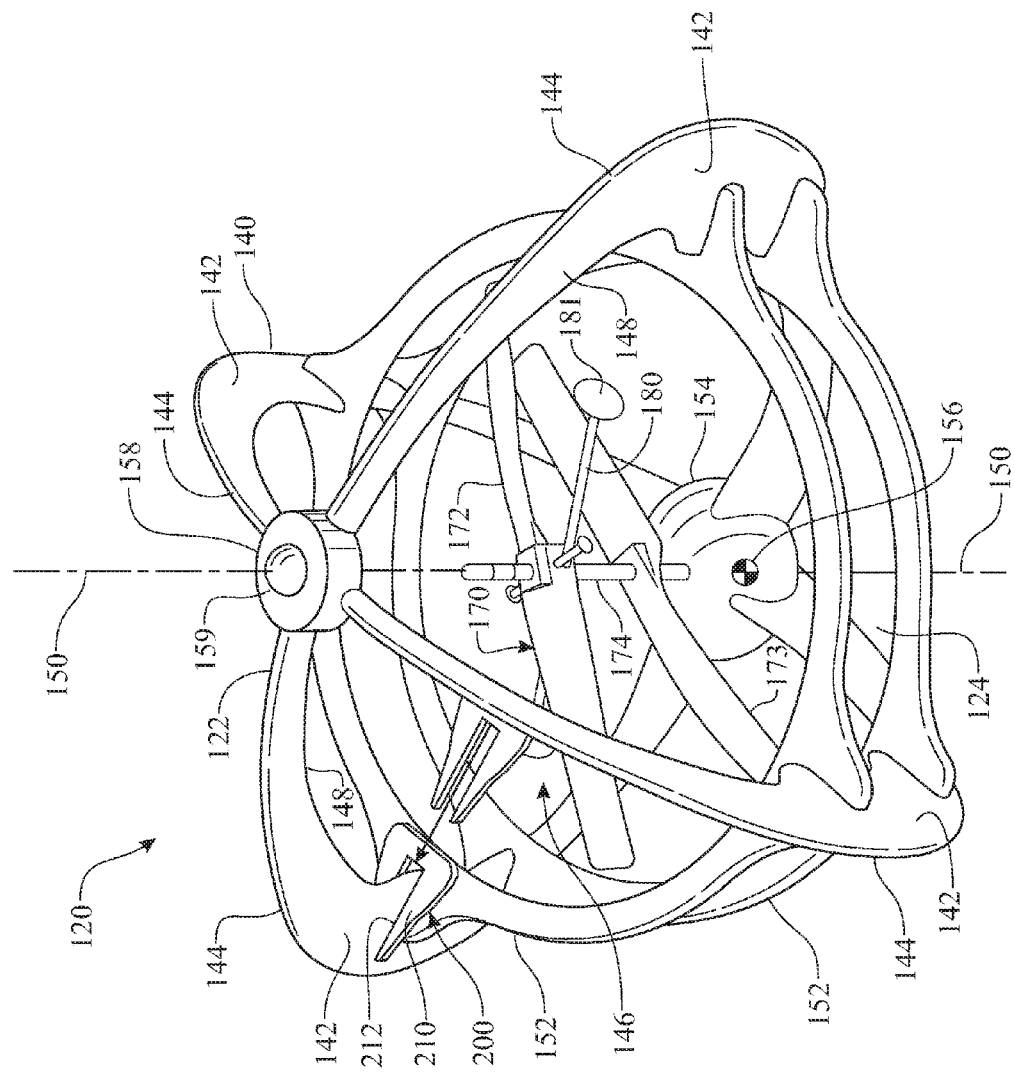
FIG. 17 presents an isometric view of a the aeronautical vehicle, introducing a weight used for directional control thereof during flight.

Referring now to FIGS. 7 and 16, flight operations of the model VTOL aeronautical vehicle 120 are shown wherein a user 104 utilizes a remote hand controller 106 to send control signals to the aeronautical vehicle 120 to take off from and fly above the frame assembly supporting surface 102. The remote hand controller 106, as further shown in FIG. 16, includes a case 108 formed to include handles 110 for grasping by user 104. The case 108 also houses the electronic circuitry (not shown) to generate and transmit the RF control signals for broadcast to aeronautical vehicle 120 to permit the remote controlled flight of the aeronautical vehicle 120. The controller 106 includes a power cord 114 for recharging batteries and various controls such as on-off switch 111 and joy sticks 112, 113 to generate the command signals for vertical and lateral translations of aeronautical vehicle 120 thereby allowing user 104 to control vehicle 120 to take-off, perform flight maneuvers, and land.

During flight operations of a remotely controlled helicopter, one of the major problems occurs when the vehicle tips or lands in other than an upright orientation. In those instances, the user must travel to the location of the vehicle and re-orient the vehicle and then resume operations. The self-righting frame 140 of VTOL aeronautical vehicle 120 causes the vehicle 120 to, in the event of other than an upright landing, re-orient itself without the aid of the user.

Figure 8:
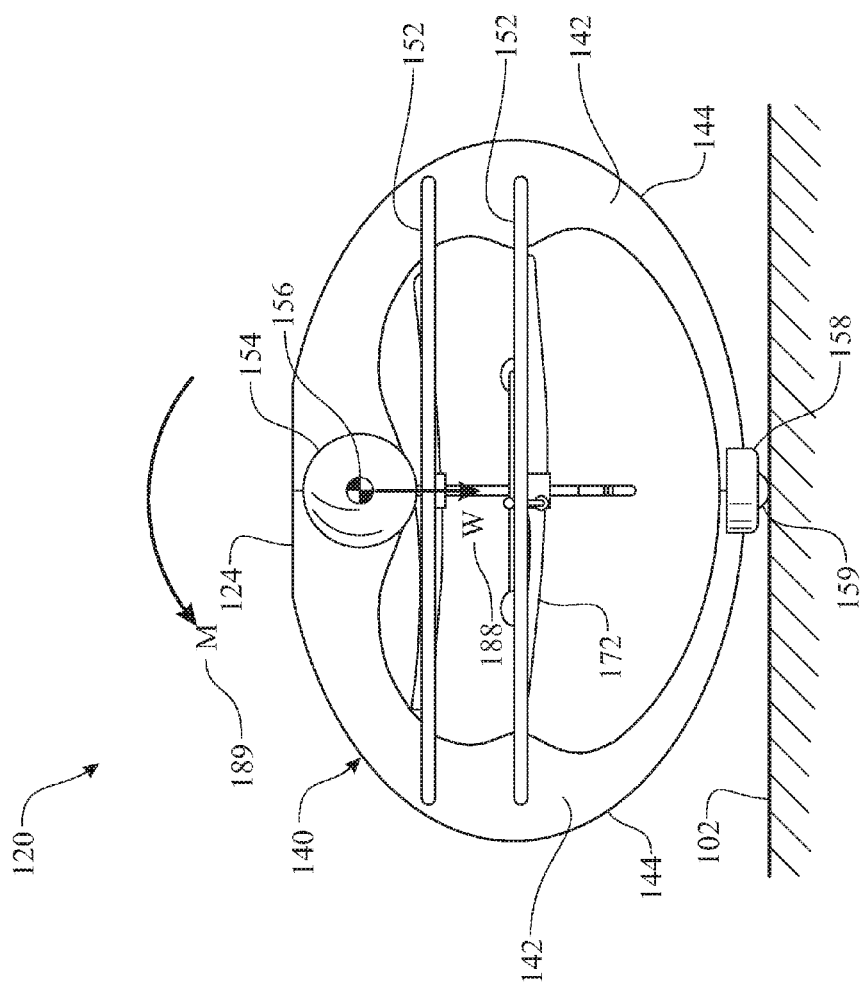
FIG. 8 presents an elevation view of the aeronautical vehicle resting on a frame assembly supporting surface in an inverted orientation.

A worst-case scenario of aeronautical vehicle 120 landing in an inverted orientation and its self-righting sequence is illustrated in FIGS. 8-15 and described herein. In FIG. 8, vehicle 120 has hypothetically landed in a worst-case inverted orientation on frame assembly supporting surface 102 wherein aeronautical vehicle 120 is hypothetically resting on frame assembly supporting surface 102 at a single point of contact of the spherical portion 159 of the protrusion 158. Because of the spherical geometry of portion 159 or other geometry employed such that in an inverted orientation, there is only single point contact such as with a portion 159 being conical, the protrusion 158 imparts an initial instability to the self-righting frame assembly 140. Further, the initial instability is enhanced by the weighted mass 154 positioning the center of gravity 156 opposite most distant from the single point of contact of the portion 159 of the protrusion 158. The initial instability initiates a moment force "M" 189 to begin rotating the remotely controlled aeronautical vehicle 120 about the point of contact of the portion 159 of the protrusion 158.

Figure 9:
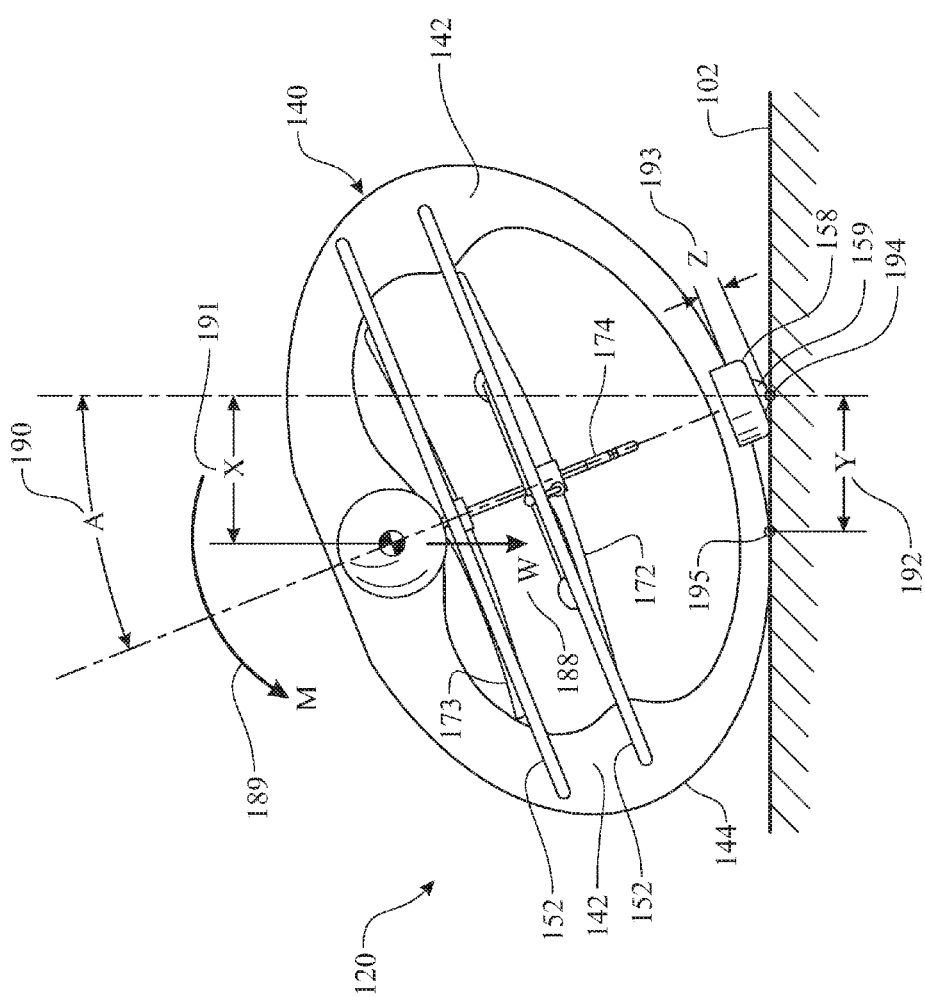
FIG. 9 presents an elevation view of the aeronautical vehicle resting on the frame assembly supporting surface and beginning the process of self-righting itself.

Turning now to FIG. 9, the remotely controlled aeronautical vehicle 120 begins to seek a state of equilibrium from the initial state of instability described with respect to FIG. 8. Those practiced in the mechanical arts will readily recognize that such a state of equilibrium would occur when the self-righting frame assembly 140 contacts the frame assembly supporting surface 102 at three points defining a contact plane with the weight vector 188 of the vehicle 120 vertically projecting within the triangle on the frame assembly supporting surface 102 defined by the three points of contact of frame assembly 140. As illustrated in FIG. 9, the protrusion 158 with the spherical portion 159 extends above the elliptical profile of substantially identical vertically oriented frames 142 a dimensional distance of "Z" 193. As the remotely controlled aeronautical vehicle 120 tips to one side from the protrusion 158, the contact point 194 and the outer edge 144 of substantially identical vertically oriented frames 142 contacts the frame assembly supporting surface 102 at the frame contact points 195. The dimension "Z" 193 extension of protrusion 158 and portion 159 above substantially identical vertically oriented frames 142 results in central axis 150 being angulated from vertical by angle "A" 190.

As illustrated, adjacent substantially identical vertically oriented frames 142 each have a contact point 195 (in FIG. 9, a second frame 142 is hidden behind the illustrated frame 142) such that, as illustrated, a line interconnecting points 195 is orthogonal to the drawing page and forms one leg of a contact triangle defining a contact plane for vehicle 120. The line connecting points 195 is a distance "Y" 192 from contact point 194 of protrusion 158. If the lateral or horizontal displacement of weight vector "W" 188 is such that vector "W" 188 operates through the contact triangle defined by contact point 194 of protrusion 158 and the two contact points 195 of adjacent substantially identical vertically oriented frames 142, an equilibrium state for vehicle 120 is found and it will remain in that state until disturbed into an unstable state. However, as illustrated in FIG. 9, height dimension "Z" is sufficiently large to create angle "A" such that weighted mass 154 and vehicle center of gravity 156 have been horizontally displaced from vertical by a distance "X" 191. Height dimension "Z" is selected to insure that dimension "X" 191 is greater than dimension "Y" 192. Additionally, inertia continues to rotate the remotely controlled aeronautical vehicle 120.

Figure 10:
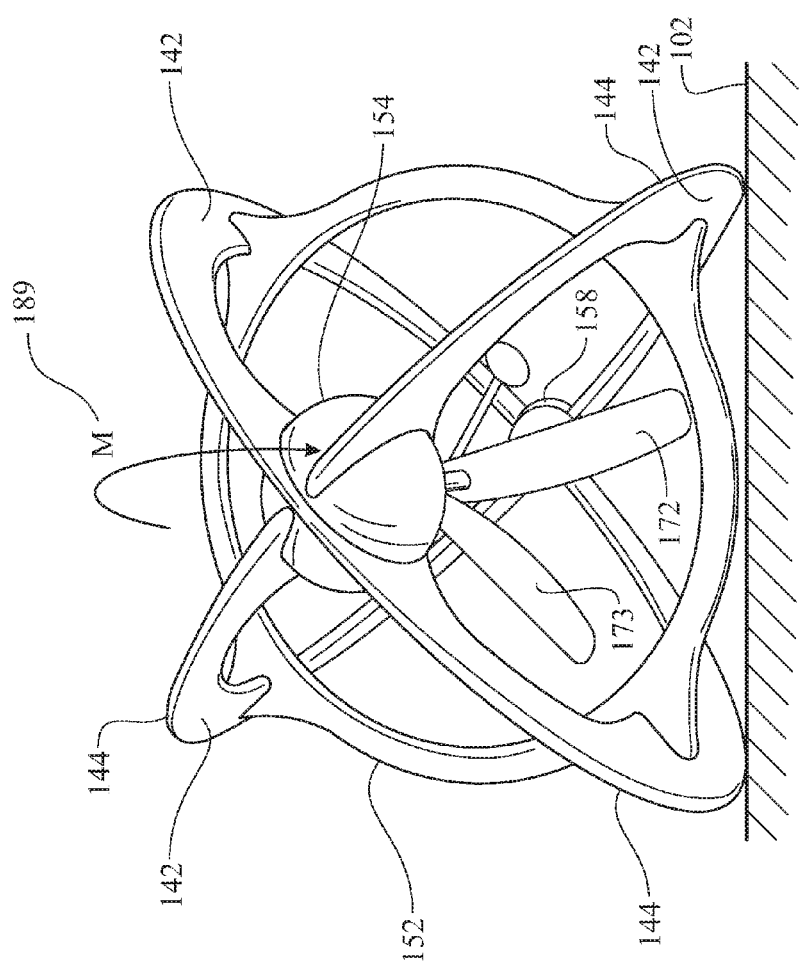
FIG. 10 presents an elevation view of the aeronautical vehicle resting on the frame assembly supporting surface and continuing the process of self-righting itself.
Figure 11:
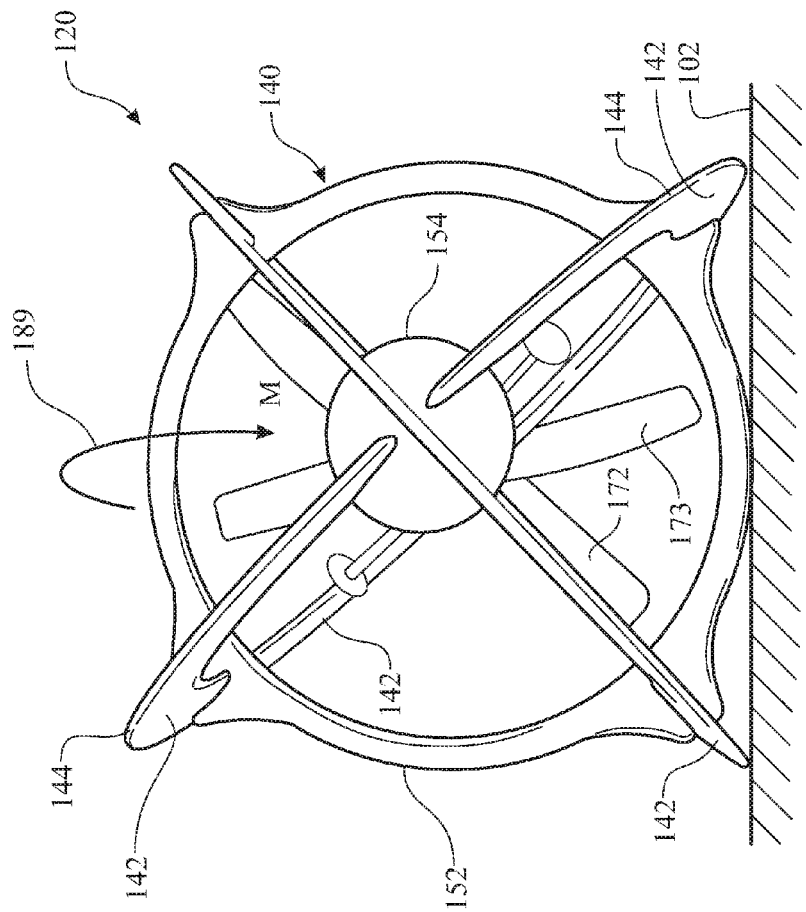
FIG. 11 presents an elevation view of the aeronautical vehicle resting on the frame assembly supporting surface and approximately one-half self-righted.

Turning now to FIG. 10, the vehicle of FIG. 9 is viewed as from the left side of FIG. 9 wherein weighted mass 154 being on the far side of the contact points 195 of FIG. 9 and creating righting moment "M" 189, the remotely controlled aeronautical vehicle 120 follows the righting moment "M" 189 and continues its rotation towards an upright position. Likewise, as illustrated in FIG. 11, the weighted mass 154 approaches the ninety-degree (90°) position of rotation from vertical. Those practiced in the art will readily recognize that an outer periphery of horizontal frame 152 in a preferred embodiment will not engage the frame assembly supporting surface 102 as remotely controlled aeronautical vehicle 120 or self-righting frame assembly 140 rotates across the frame assembly supporting surface 102. In this manner, the self-righting motion caused by the moment "M" 189 will remain continuous and uninterrupted.

Figure 12:
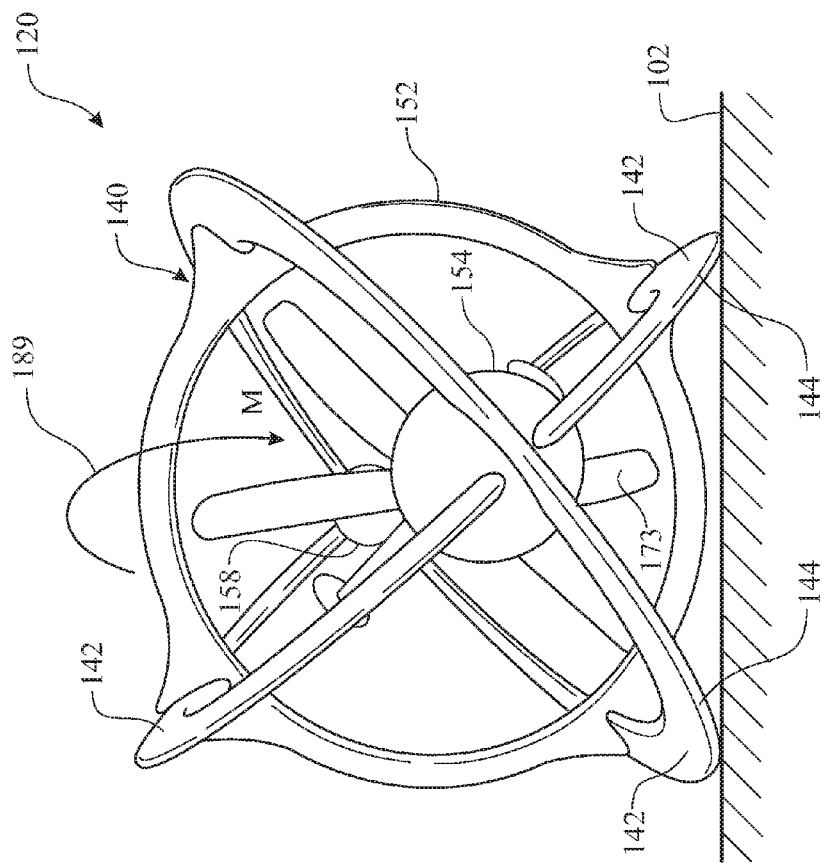
FIG. 12 presents an elevation view of the aeronautical vehicle resting on the frame assembly supporting surface and over one-half self-righted.
Figure 13:
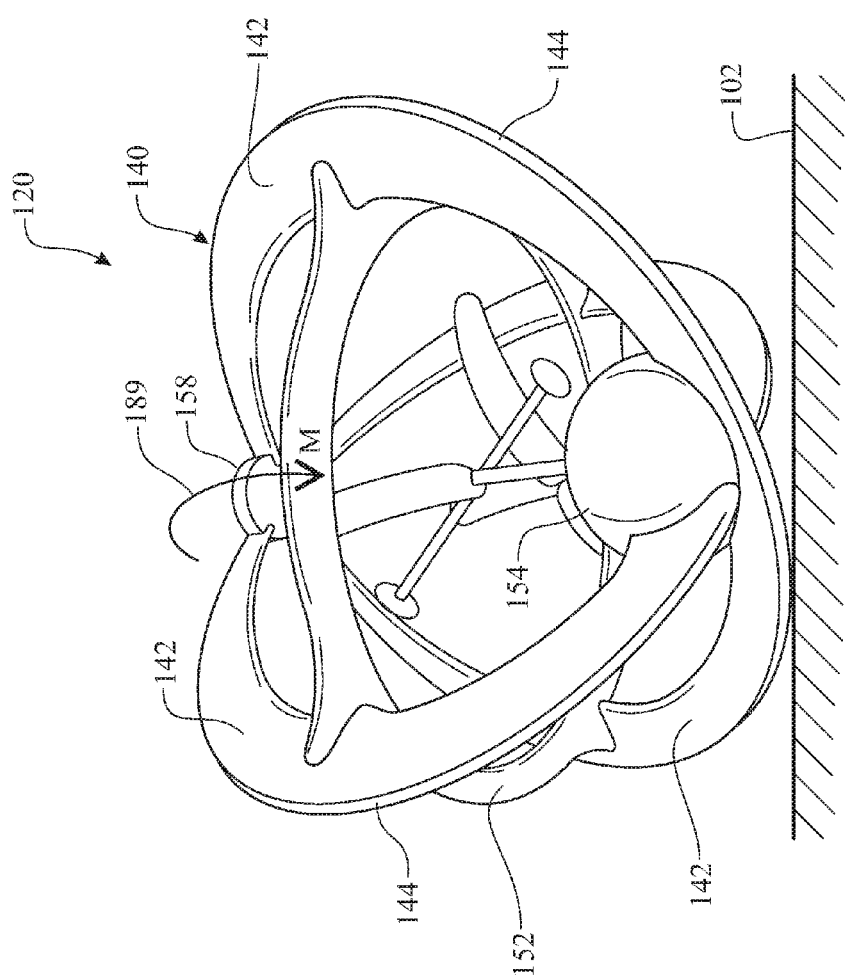
FIG. 13 presents an elevation view of the aeronautical vehicle resting on the frame assembly supporting surface and almost completely self-righted.
Figure 14:
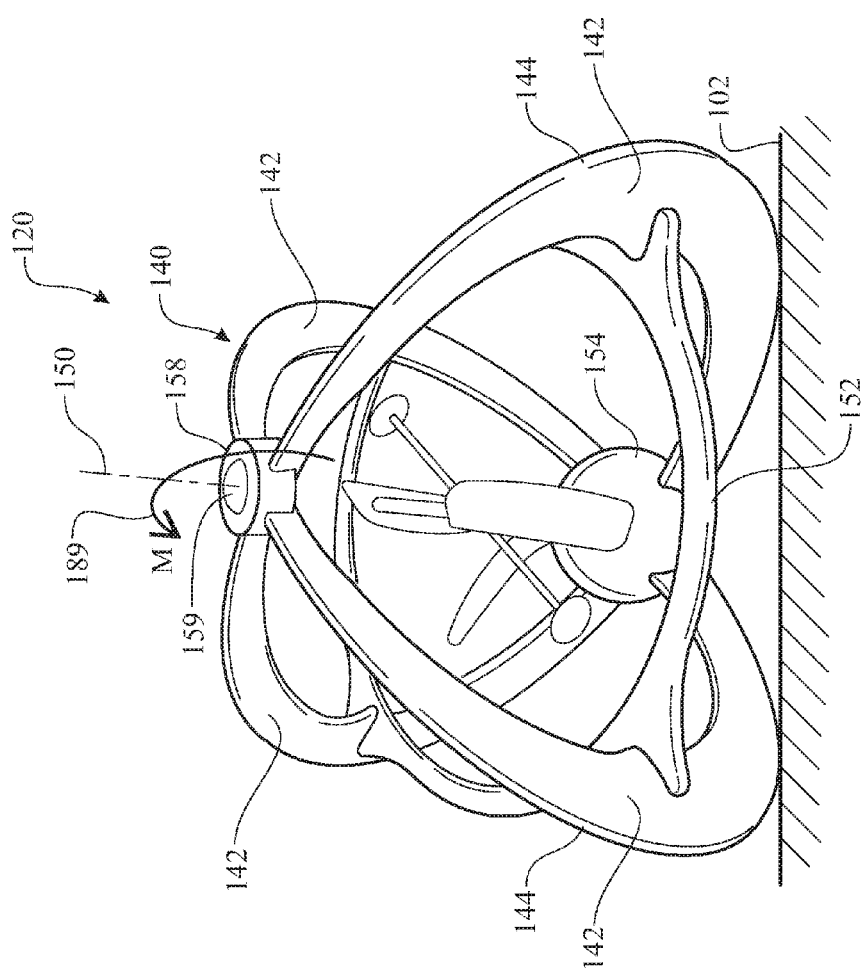
FIG. 14 presents an opposite elevation view of the aeronautical vehicle as shown in FIG. 13 and almost completely self-righted.

Referring now to FIGS. 12-14, the remotely controlled aeronautical vehicle 120 and the self-righting frame assembly 140 continue to rotate toward an upright position with the weighted mass 154 consistently acting beyond the shifting points of contact of the adjacent vertical substantially identical vertically oriented frames 142. In FIG. 12, the weighted mass 154 rotates downwardly from its ninety-degree (90°) position and in FIGS. 13 and 14, the weighted mass 154 approaches a position proximate to the frame assembly supporting surface 102 wherein the remotely controlled aeronautical vehicle 120 is almost upright, FIG. 14 being a one hundred eighty degree (180°) opposing view of FIG. 13.

Figure 15:
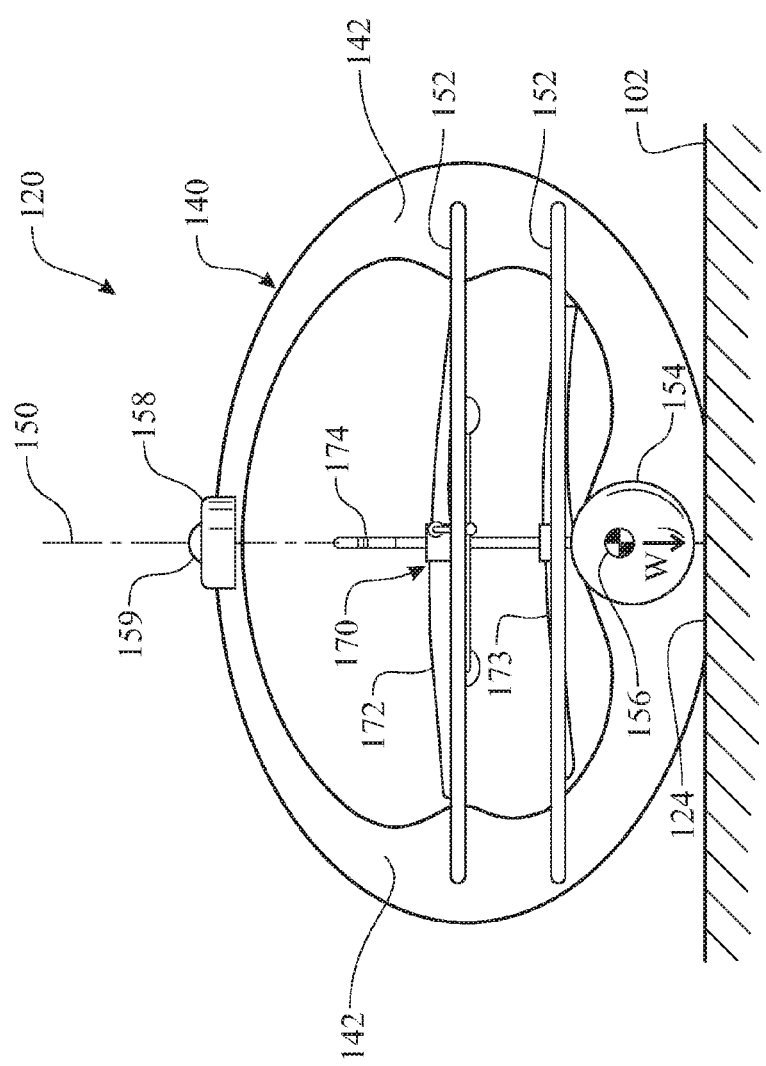
FIG. 15 presents an elevation view of the aeronautical vehicle at completion of the self-righting process.

In FIG. 15, remotely controlled aeronautical vehicle 120 has achieved a stable upright equilibrium state wherein the weighted mass 154 is most proximate to the frame assembly supporting surface 102 and wherein the flattened bottom 124 defines a resting plane on the frame assembly supporting surface 102 to maintain upright stability of the remotely controlled aeronautical vehicle 120. Once the remotely controlled aeronautical vehicle 120 has self-righted itself, the remotely controlled aeronautical vehicle 120 is once again ready to resume flight operations without requiring the user 104 to walk or travel to the location of the remotely controlled aeronautical vehicle 120 to right it prior to resuming flight.

Those skilled in the art will recognize the design options for the quantity of the vertical substantially identical vertically oriented frames 142. Additionally, the same can be considered for the number of the horizontal frames 152. The propulsion system can utilize a single rotor, a pair of counter-rotating rotors located along a common axis, multiple rotors located along either a common axis or separate axis, a jet pack, a rocket propulsion system, a ducted fan, and the like.

Those skilled in the art will recognize the potential applications of the self-righting frame assembly for use in such items as a general vehicle, a construction device, a personnel carrier, a rolling support, a toy, a paperweight, and the like.

The self-righting structural frame 140 provides a structure allowing a body having a width that is greater than a height to naturally self-orient to a desired righted position. As the weight distribution increases towards the base of the self-righting structural frame 140, the more the frame 140 can be lowered and broadened without impacting the self-righting properties.

One method of controlling flight of the remotely controlled aeronautical vehicle 120 can be accomplished by adjusting a symmetric balance thereof. Any change in balance can impact the flight of the remotely controlled aeronautical vehicle 120. A direction controlling weight 200 can be strategically placed and utilized to control a direction of motion of the remotely controlled aeronautical vehicle 120 during flight. The direction controlling weight 200 is designed to be removably attached to the remotely controlled aeronautical vehicle 120 at any suitable location. The exemplary direction controlling weight 200 includes a weight body 210 comprising a weight installation slot 212 extending inward from a distal end thereof. The direction controlling weight 200 is positioned onto the remotely controlled aeronautical vehicle 120 by resting the weight body 210 upon the upper surface of the horizontal frame 152 and sliding the weight installation slot 212 around the substantially identical vertically oriented frame 142. The gap spanning across the weight installation slot 212 is preferably of a dimension providing a snug fit against a width or thickness of the substantially identical vertically oriented frame 142. Friction between the contacting surfaces of the weight installation slot 212 and the substantially identical vertically oriented frame 142 is employed to retain the direction controlling weight 200 in position. The overall friction is determined by a relationship between a contacting surface area, a normal force and a coefficient of friction. The normal force can be increased by enabling the weight body 210 to flex, thus increasing the overall friction. The direction controlling weight 200 establishes an off-balanced condition for the remotely controlled aeronautical vehicle 120. The off-balanced condition drives the remotely controlled aeronautical vehicle 120 in a specific direction, generally in a direction towards the weighted side of the remotely controlled aeronautical vehicle 120. It is understood that the direction controlling weight 200 can be of a nominal weight, enabling the user to insert any number of direction controlling weights 200 to adjust the off-balanced condition.

Figure 18:
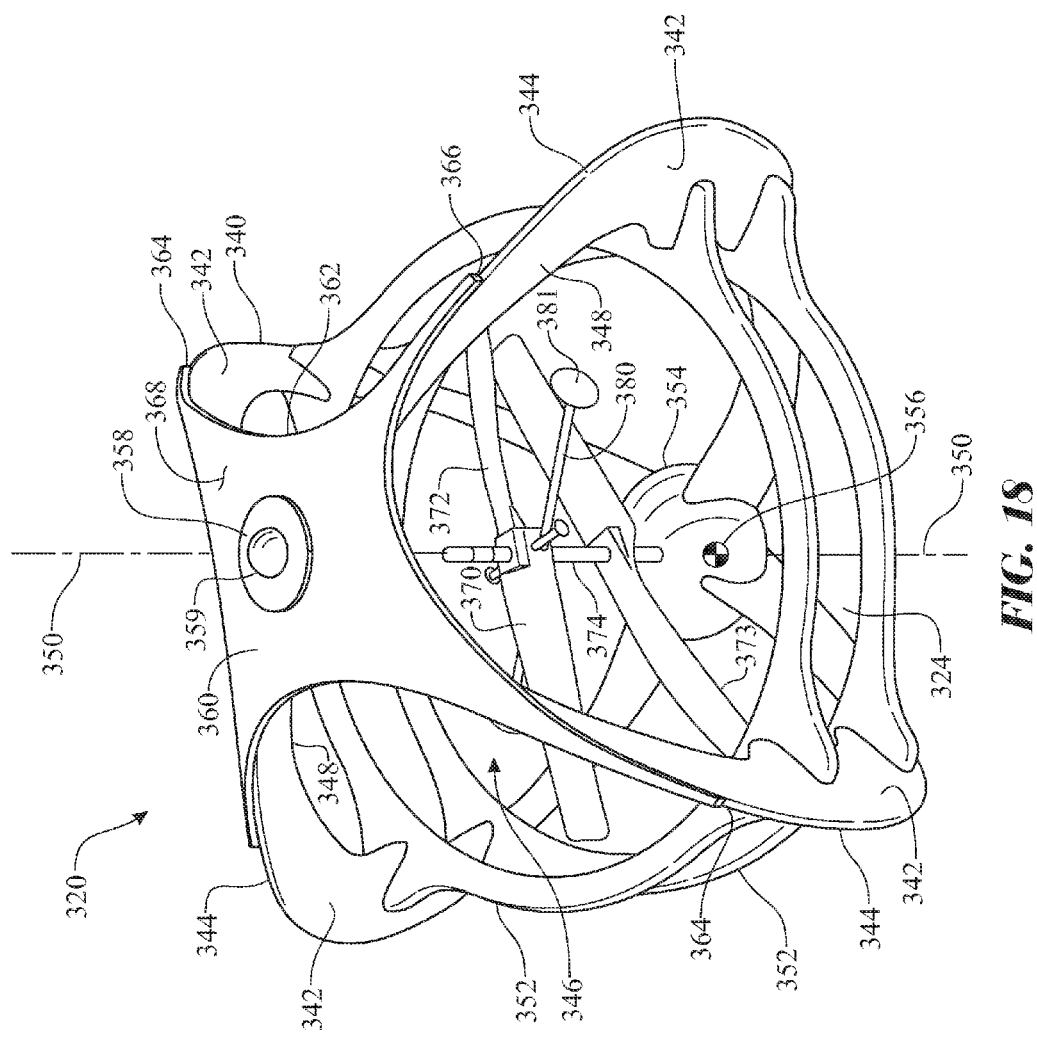
FIG. 18 presents an isometric view of a second exemplary embodiment of an aeronautical vehicle.
Figure 19:
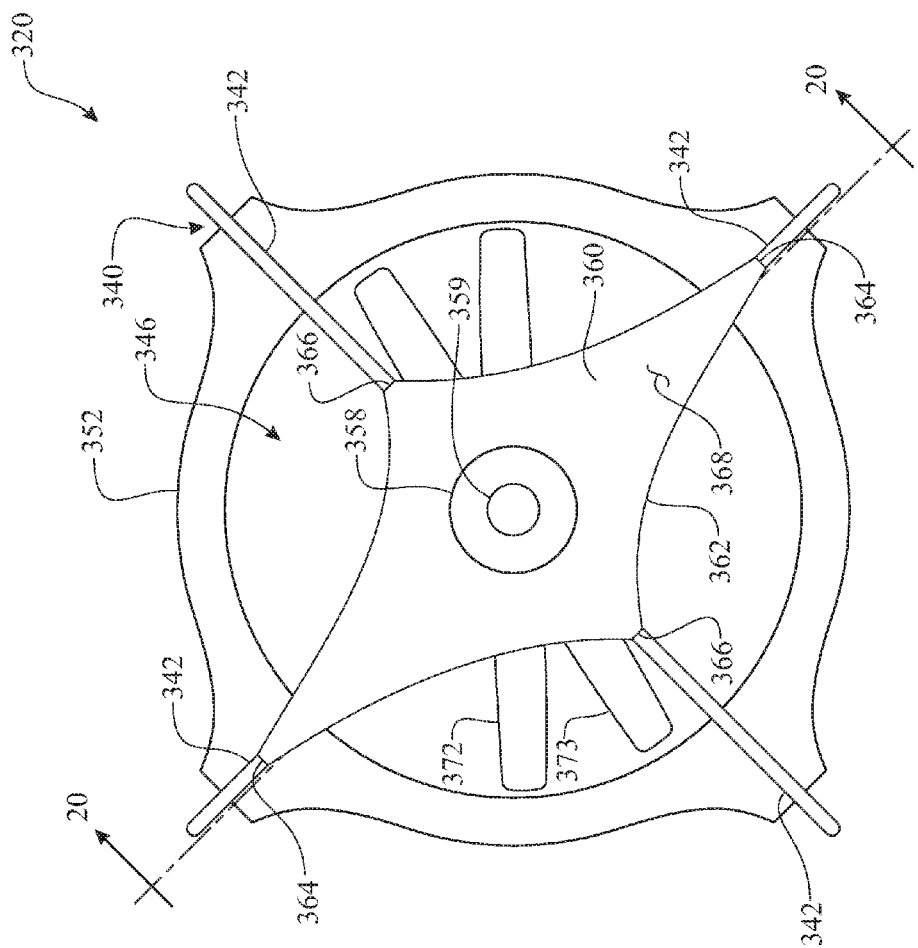
FIG. 19 presents a top plan view of the second exemplary embodiment of an aeronautical vehicle introduced in FIG. 18.
Figure 20:
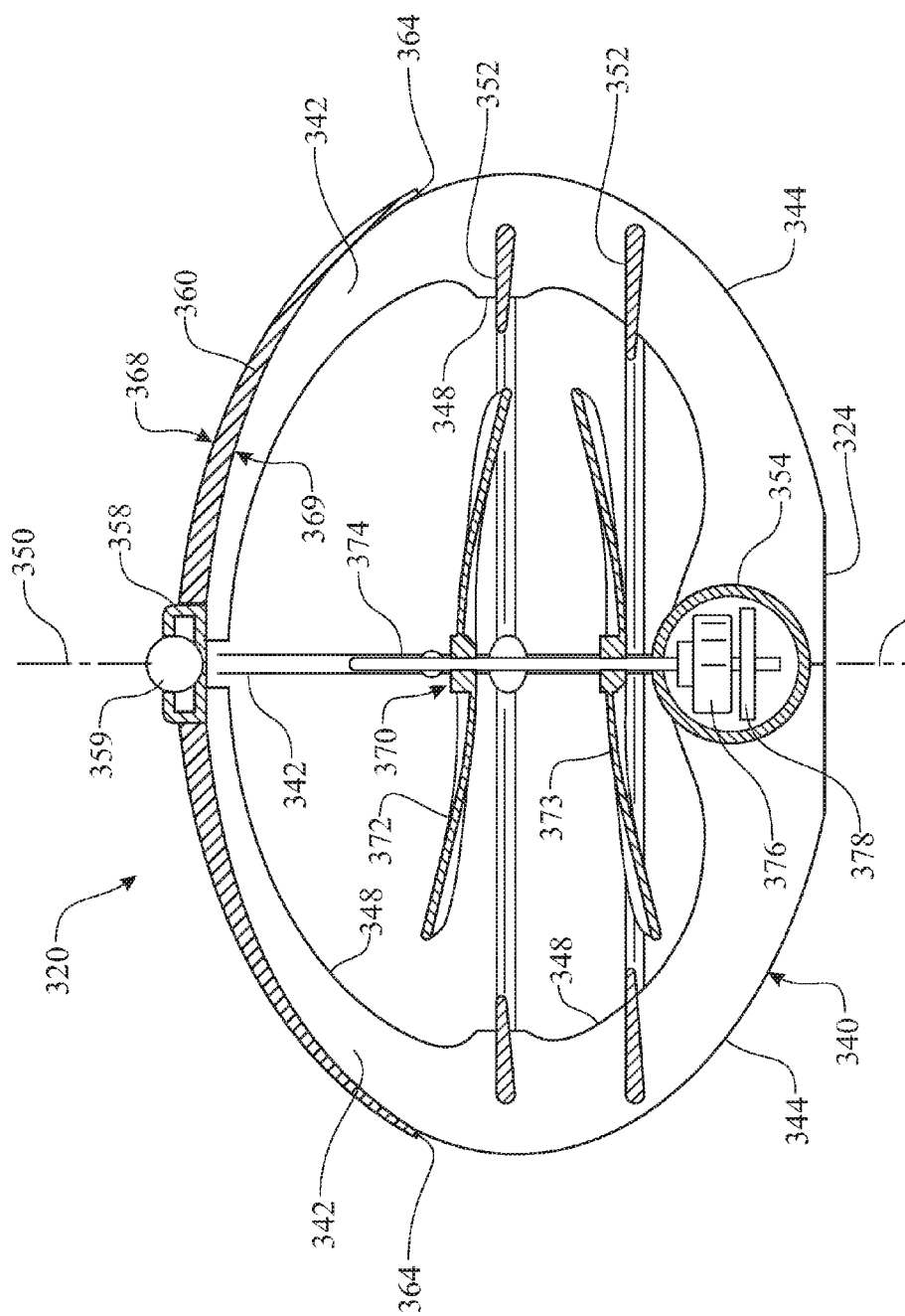
FIG. 20 presents a sectioned elevation view of the second exemplary embodiment, wherein the section is taken along section line 20-20 of FIG. 19.

The remotely controlled aeronautical vehicle 120 can be enhanced by modifying the shape of a portion, or more than one portion, of the shell structure to create additional lift, support, control, stability, or enhance other desirable features as required as illustrated in FIGS. 18 through 20. This modification is not necessarily symmetrical and could be present on any part of the shell structure, furthermore, any individual or multiple section(s) of the shell structure may be capable of independent movement and or orientation as required to enhanced desirable features or performance characteristics.

The remotely controlled aeronautical vehicle 320 comprises a significant number of elements that are the same as in the remotely controlled aeronautical vehicle 120. Like features of the remotely controlled aeronautical vehicle 320 and remotely controlled aeronautical vehicle 120 are numbered the same except preceded by the numeral '3'.

The lift and stabilization panel 360 is shaped comprising a least one arched surface, and more so, preferably designed having a cross sectional shape resembling an airfoil as illustrated in a cross sectioned view presented in FIG. 20. The airfoil shape of the lift and stabilization panel 360 provides lift when the remotely controlled aeronautical vehicle 320 is moving in a horizontal direction. The airfoil shape of the lift and stabilization panel 360 provides drag when the remotely controlled aeronautical vehicle 320 is moving in a vertical direction. The lift and stabilization panel 360 can be designed having any reasonable and suitable shape. The exemplary embodiment presents an elongated configuration, as best shown in the top plan view illustrated in FIG. 19. The lift and stabilization panel 360 is bound by a lift and stabilization panel peripheral edge 362. The lift and stabilization panel peripheral edge 362 can have any suitable shape. The exemplary span segments of the lift and stabilization panel peripheral edge 362 are concave. Alternative embodiments can include linear segments, convex segments, multi-arched segments, non-defined, free-formed segments, and the like. It is understood that the lift and stabilization panel 360 is preferably symmetric ensuring the remotely controlled aeronautical vehicle 320 retains proper balance. In the exemplary embodiment, the lift and stabilization panel 360 is elongated in a longitudinal direction. The lift and stabilization panel 360 extends in the longitudinal direction between a pair of lift and stabilization panel distal end points 364 and a lateral direction between a pair of lift and stabilization panel proximal end points 366. The lift and stabilization panel 360 defines a lift and stabilization panel upper surface 368 and a lift and stabilization panel lower surface 369. The lift and stabilization panel upper surface 368 is of a longer dimension compared to the lift and stabilization panel lower surface 369, thus creating a lift when subjected to a passing generally horizontal airflow. Conversely, the lift and stabilization panel lower surface 369 generates a drag when the remotely controlled aeronautical vehicle 320 is falling downward subjecting the lift and stabilization panel 360 to a vertical airflow. The horizontal frame 352 can also be designed having an airfoil shape, as best shown in the section view illustrated in FIG. 20. Airflow generated by the aerodynamic rotor 372 and second aerodynamic rotor 373 is drawn in around the lift and stabilization panel 360, adding to the lift and support provided by the lift and stabilization panel 360.

Figure 21:
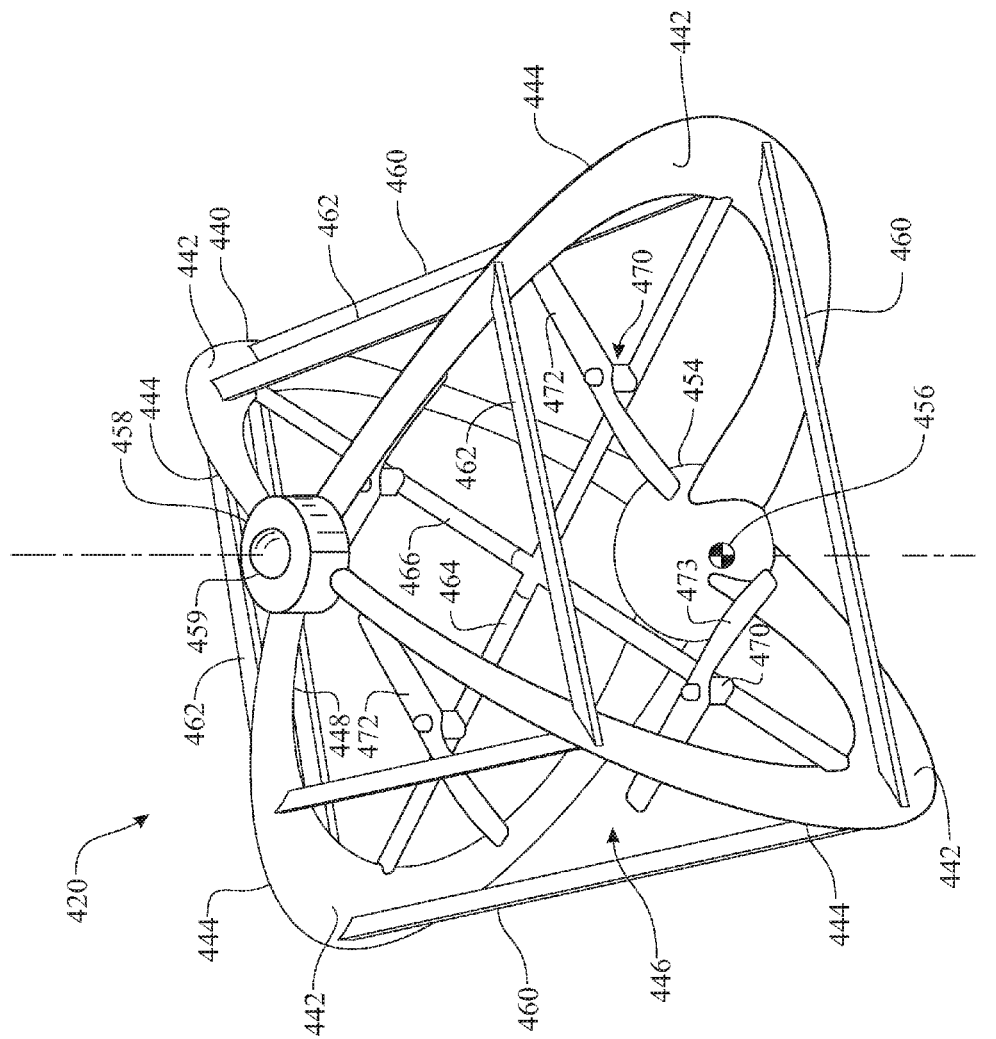
FIG. 21 presents an isometric view of a third exemplary embodiment of an aeronautical vehicle.
Figure 22:
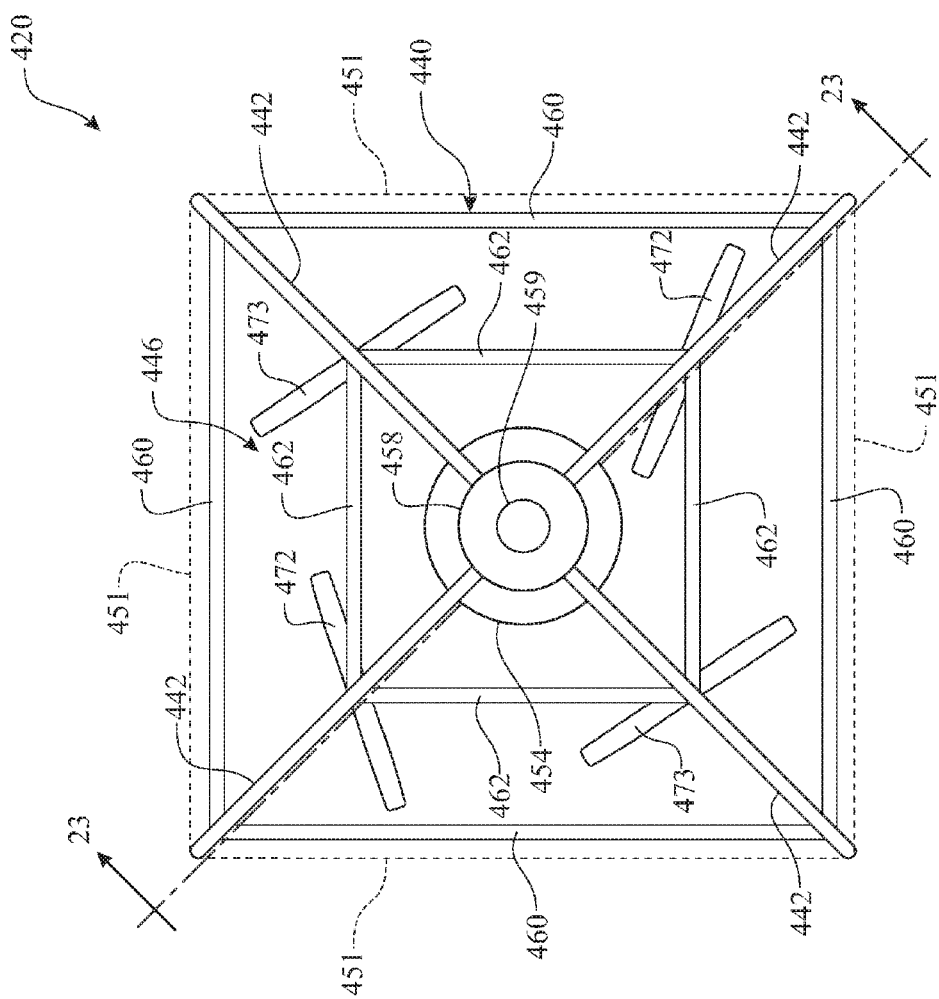
FIG. 22 presents a top plan view of the third exemplary embodiment of the aeronautical vehicle introduced in FIG. 21.
Figure 23:
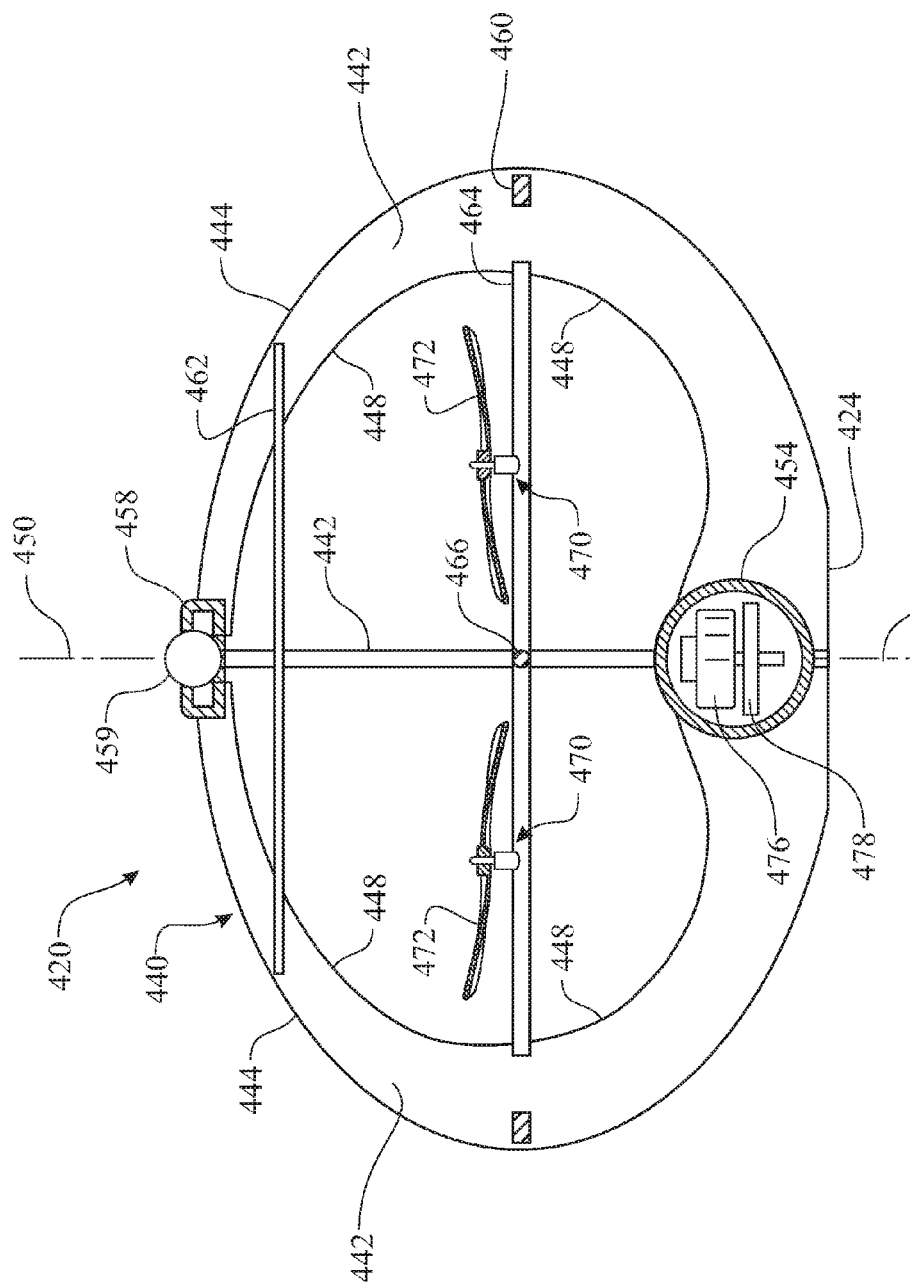
FIG. 23 presents a sectioned elevation view of the third exemplary embodiment, wherein the section is taken along section line 23-23 of FIG. 22.

Another alternative embodiment is referred to as a remotely controlled aeronautical vehicle 420, which is described by the illustrations presented in FIGS. 21 through 23. The remotely controlled aeronautical vehicle 420 comprises a significant number of elements that are the same as in the remotely controlled aeronautical vehicle 120. Like features of the remotely controlled aeronautical vehicle 420 and remotely controlled aeronautical vehicle 120 are numbered the same except preceded by the numeral '4'. The remotely controlled aeronautical vehicle 420 replaces the horizontal frame 352 with a plurality of central horizontal plane support beams 460, each central horizontal plane support beam 460 spanning between adjacent substantially identical vertically oriented frames 442. The substantially identical vertically oriented frame 442 can have any designed cross sectional shape suitable for the remotely controlled aeronautical vehicle 420. In one embodiment, the substantially identical vertically oriented frame 442 can have an airfoil shaped cross section. In another embodiment, the substantially identical vertically oriented frame 442 can have a rectangular shaped cross section. In yet another embodiment, the substantially identical vertically oriented frame 442 can have a triangular, oval, elliptical, circular, or any other suitable cross sectional shape. Each central horizontal plane support beam 460 can be linear (as illustrated), curved, concave, convex, a complex curve, and the like. Each central horizontal plane support beam 460 would be shaped to remain within an interior defined by a horizontal peripheral boundary 451. The remotely controlled aeronautical vehicle 420 can further include a second series of horizontal plane support beams, such as a secondary horizontal plane support beam 462. The second series of horizontal plane support beams can be located between the central horizontal plane support beam 460 and the protrusion 458 as illustrated or between the central horizontal plane support beam 460 and the weighted mass 454. It is also understood that additional horizontal plane support beams can be integrated into the remotely controlled aeronautical vehicle 420 at a location above and/or below the central horizontal plane support beam 460. An additional feature introduced within the remotely controlled aeronautical vehicle 420 is a plurality of traversing beams 464, 466, each traversing beam 464, 466 oriented extending between internal edges of opposing substantially identical vertically oriented frames 442 across a central void 446. The traversing beams 464, 466 can be joined at their intersection, increasing the rigidity of the remotely controlled aeronautical vehicle 420. The remotely controlled aeronautical vehicle 420 can include any or all of the central horizontal plane support beam 460, the secondary horizontal plane support beam 462, and the traversing beams 464, 466.

The traversing beams 464, 466 introduce an opportunity for integrating a plurality of spatially arranged maneuvering and lift mechanisms 470. The preferred embodiment utilizes an even number of maneuvering and lift mechanisms 470, wherein each pair of maneuvering and lift mechanism 470 employs counter rotating rotors 472, 473. More specifically, a first maneuvering and lift mechanism 470 employs a first rotating direction aerodynamic rotor 472 and a second maneuvering and lift mechanism 470 employs a second rotating direction aerodynamic rotor 473. Alternatively or in combination therewith, the remotely controlled aeronautical vehicle 420 can include any number of maneuvering and lift mechanisms 470, wherein each maneuvering and lift mechanism 470 can employ a pair of rotors, each rotor being counter rotating. Those skilled in the art can appreciate that any combination of rotating configurations can be employed to retain a rotational balance between lifting systems.

Figure 24:
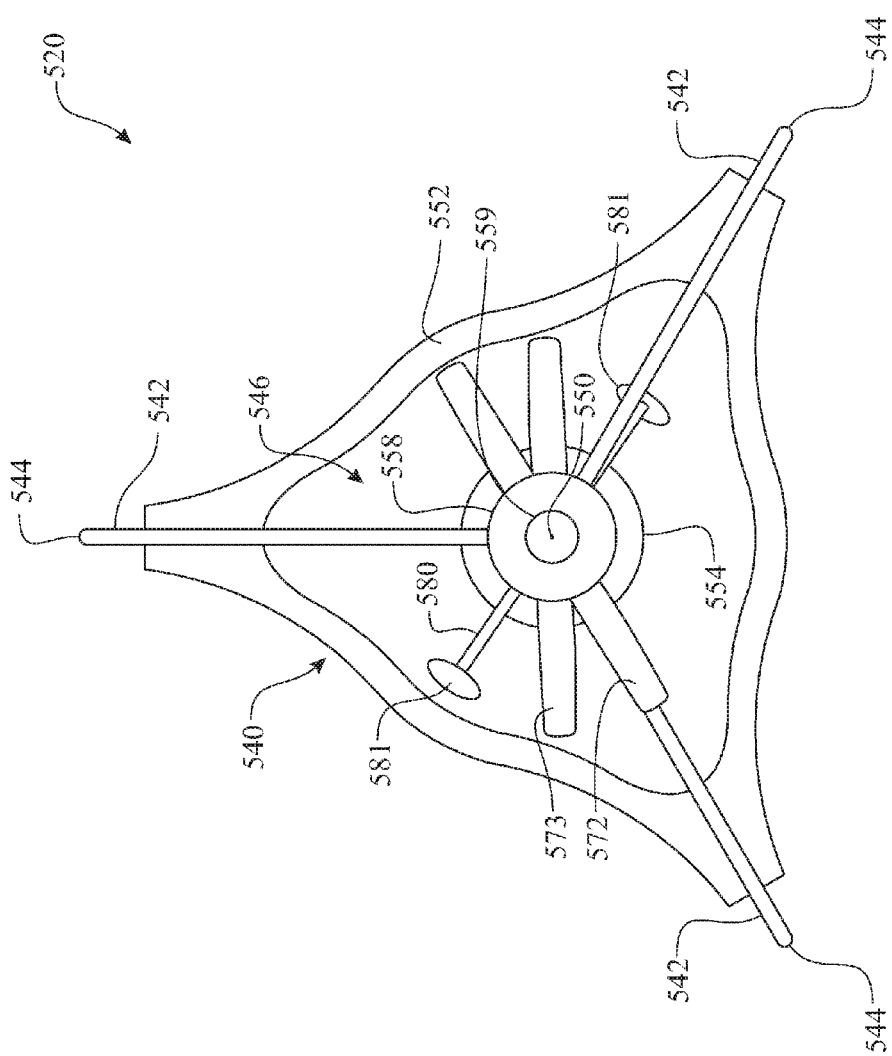
FIG. 24 presents a top plan view of the third exemplary embodiment of the aeronautical vehicle.

Another alternative embodiment is referred to as a remotely controlled aeronautical vehicle 520, which is described by the top view illustration presented in a FIG. 24. The remotely controlled aeronautical vehicle 520 comprises a significant number of elements that are the same as in the remotely controlled aeronautical vehicle 120. Like features of the remotely controlled aeronautical vehicle 520 and remotely controlled aeronautical vehicle 120 are numbered the same except preceded by the numeral '5'. The remotely controlled aeronautical vehicle 120, 320, 420 each include substantially identical vertically oriented frames 142, 342, 442 that extend symmetrically about a respective central vertical axis 150, 350, 450. This configuration can be modified while maintaining within the spirit and intent of the present invention by utilizing an odd number of substantially identical vertically oriented frames 542. Each substantially identical vertically oriented frame 542 extends radially outward from the central vertical axis 550. The substantially identical vertically oriented frames 542 are preferably arranged at equal angles from one another. A horizontal frame 552 or similar element is employed to provide rigidity and structural support to the distal ends of the substantially identical vertically oriented frames 542.

Figure 25:
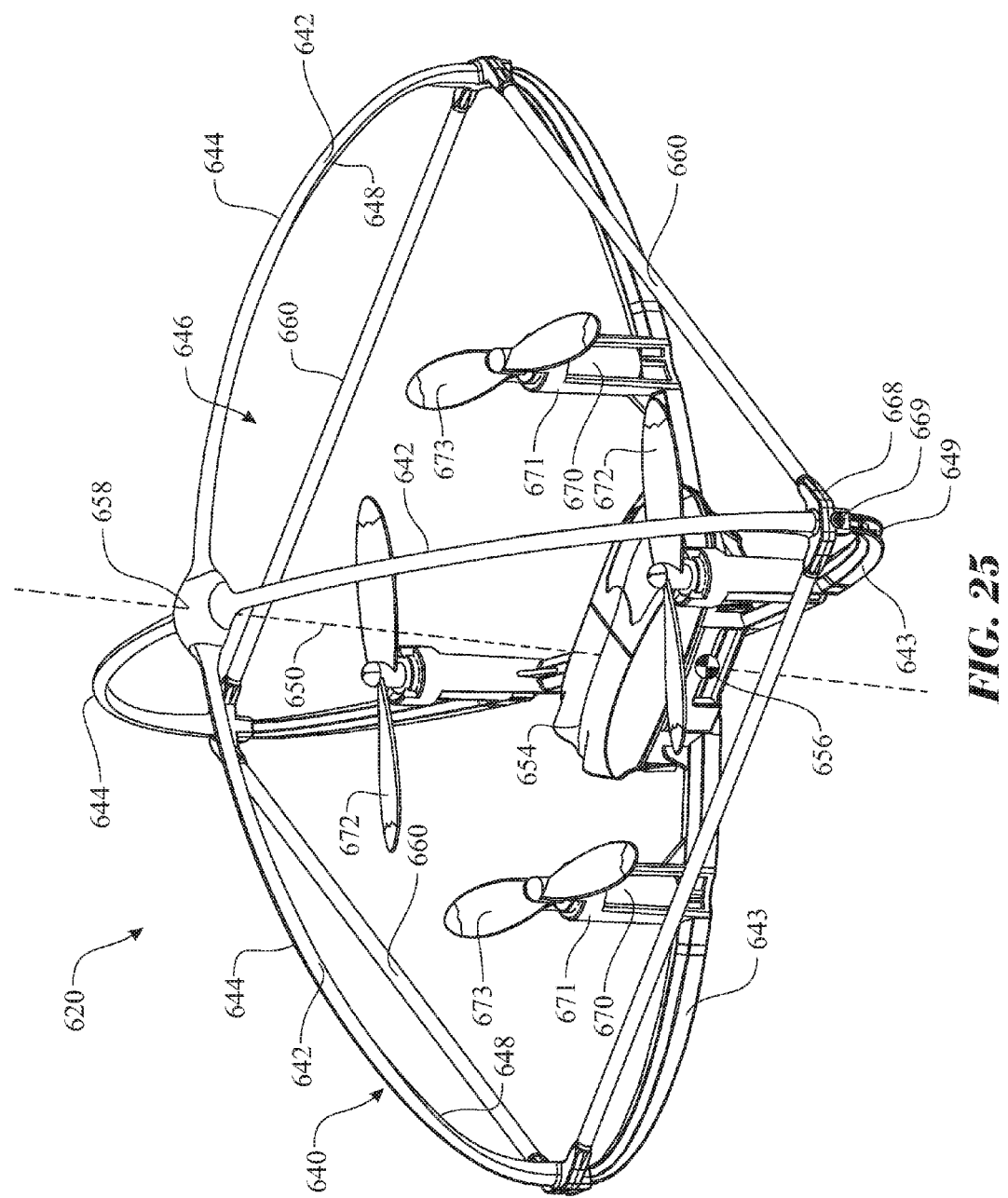
FIG. 25 presents an isometric top and side view of a fourth exemplary embodiment of an aeronautical vehicle, the illustration introducing a generally triangular shaped aeronautical vehicle having a hollowed frame.
Figure 26:
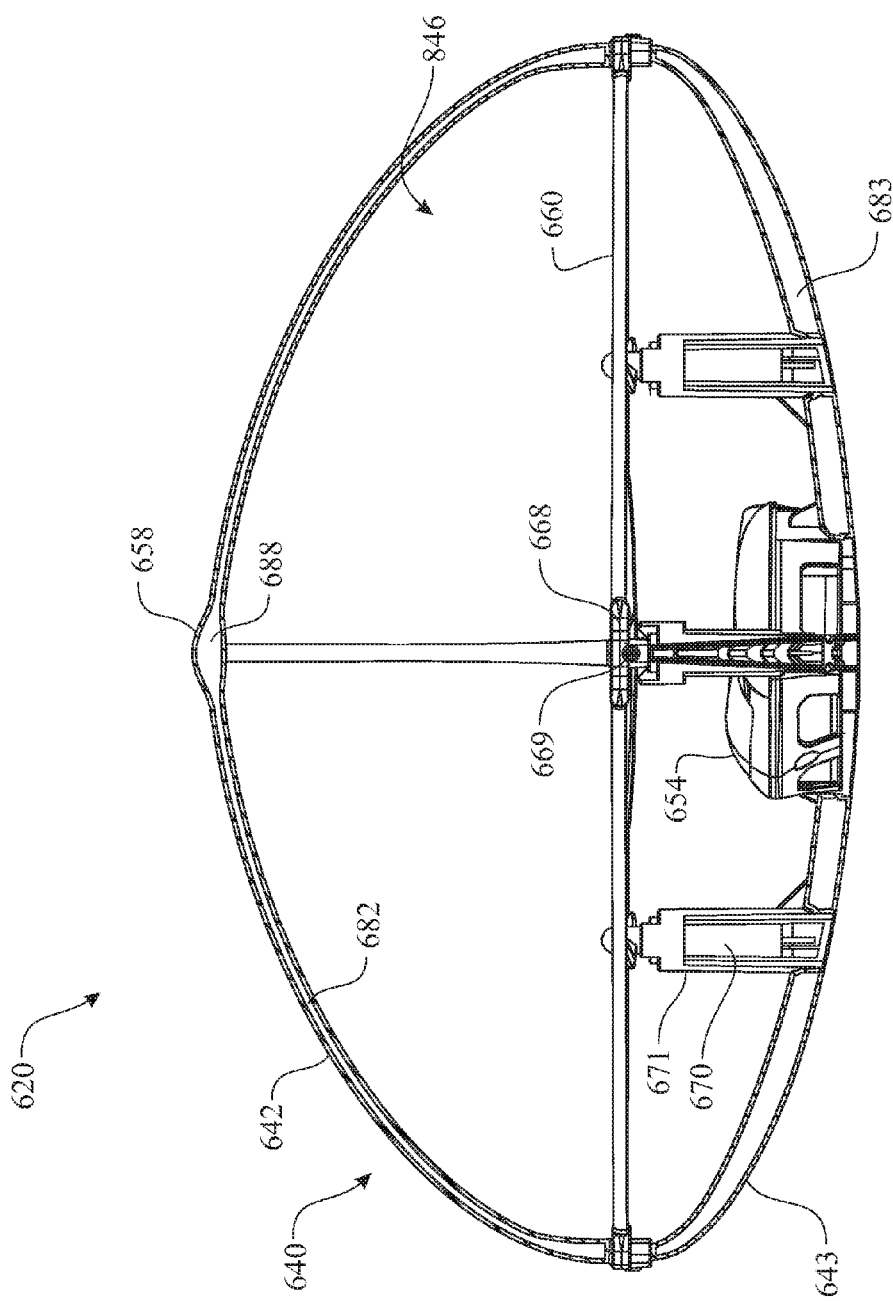
FIG. 26 presents a sectioned elevation view of the fourth exemplary embodiment originally introduced in FIG. 25, wherein the section is taken along a vertically oriented flexible arch shaped upper frame segment.

Another alternative embodiment is referred to as a remotely controlled aeronautical vehicle 620, which is described by the top view illustration presented in a FIGS. 25 and 26. The remotely controlled aeronautical vehicle 620 comprises a significant number of elements that are the same as in the remotely controlled aeronautical vehicle 420 introduced in FIG. 21. Like features of the remotely controlled aeronautical vehicle 620 and remotely controlled aeronautical vehicle 420 are numbered the same except preceded by the numeral '6'. A first distinction is the configuration of a self-righting frame assembly 640. The self-righting frame assembly 640 is fabricated of a series of vertically oriented flexible arch shaped upper frame segment 642 joined to a series of vertically oriented flexible arch shaped lower frame segments 643 by a frame assembly fitting 668 at each junction thereof. Each of the series of vertically oriented flexible arch shaped upper frame segments 642 can be independent of one another or provided as a single, unitary element. Similarly, each of the series of vertically oriented flexible arch shaped lower frame segments 643 can be independent of one another or provided as a single, unitary element. A frame assembly fitting 668 would be employed to assemble mating ends of the vertically oriented flexible arch shaped upper frame segment 642 and the vertically oriented flexible arch shaped lower frame segment 643. One or more frame assembly fasteners 669 could be used to secure the mating ends of the vertically oriented flexible arch shaped upper frame segment 642 and the vertically oriented flexible arch shaped lower frame segment 643 to or within the protrusion hollowed interior 688. Alternatively, the protrusion hollowed interior 688 can be an integral element of one of the vertically oriented flexible arch shaped upper frame segment 642 or the vertically oriented flexible arch shaped lower frame segment 643. The protrusion 658 can be integrated with the series of vertically oriented flexible arch shaped upper frame segments 642, as shown, or configured as a frame assembly fitting, assembling each of the series of vertically oriented flexible arch shaped upper frame segments 642 to one another. The frame would be concentric about a central vertical axis 650.

In the exemplary illustration, the weighted mass controller assembly 654 is supported by the series of vertically oriented flexible arch shaped lower frame segments 643. Each of the series of vertically oriented flexible arch shaped lower frame segments 643 can be fabricated as an integral or unitary assembly or fabricated as an independent unit. When each of the series of vertically oriented flexible arch shaped lower frame segments 643 is fabricated as an independent member, each of the series of vertically oriented flexible arch shaped lower frame segments 643 can be assembled to the weighted mass controller assembly 654.

One protrusion hollowed interior 688 joins mating ends of the vertically oriented flexible arch shaped upper frame segment 642 and the vertically oriented flexible arch shaped lower frame segment 643. In the exemplary illustration, the joints are located at the broadest part of the self-righting frame assembly 640.

The remotely controlled aeronautical vehicle 620 can include a single maneuvering and lift mechanism 670 or a plurality of maneuvering and lift mechanisms 670, as illustrated. When including a single maneuvering and lift mechanism 670, the maneuvering and lift mechanism 670 would be centrally located and preferably assembled to the remotely controlled aeronautical vehicle 620 by a lift mechanism mounting element 671 that is incorporated into the weighted mass controller assembly 654. When including a plurality of maneuvering and lift mechanisms 670, as illustrated, each maneuvering and lift mechanism 670 is assembled to the remotely controlled aeronautical vehicle 620 by a lift mechanism mounting element 671 that is carried by a respective vertically oriented flexible arch shaped lower frame segment 643. By carrying the weighted mass controller assembly 654 and each of the series of maneuvering and lift mechanisms 670 by the vertically oriented flexible arch shaped lower frame segment 643, the configuration provides the lowest possible center of gravity for the remotely controlled aeronautical vehicle 620, while retaining all of the elements within a central void 646 defined by the self-righting frame assembly 640.

The self-righting frame assembly 640 is designed to include pliancy within the series of vertically oriented flexible arch shaped upper frame segment 642. This pliancy introduces a spring function. When the remotely controlled aeronautical vehicle 620 lands upon a surface in an inverted orientation, the spring function aids in the initial self-righting process.

The exemplary remotely controlled aeronautical vehicle 620 is formed having a generally rounded triangular elevation shape. The width of the self-righting frame assembly 640 is greater than the height of the self-righting frame assembly 640. The location of the center of gravity 656 of the remotely controlled aeronautical vehicle 620 in combination with the generally continuously arch shaped outer curved edge 644 directs a self-righting function as previously described herein.

A series of central horizontal plane support beams 660 can be included in the remotely controlled aeronautical vehicle 620. Each central horizontal plane support beam 660 can have any suitable cross sectional design. The central horizontal plane support beam 660 can be solid or hollow. In the exemplary illustration, each central horizontal plane support beam 660 is an elongated element retained by the protrusion hollowed interior 688. The central horizontal plane support beam 660 can be a rigid elongated material or a flexible elongated material, such as a cable, a rope, and the like. The flexible elongated material would be retained in a tensile condition by the protrusion hollowed interior 688 and the self-righting frame assembly 640. The series of central horizontal plane support beam 660 aids in retaining the shape of the self-righting frame assembly 640. The series of central horizontal plane support beams 660 would form a rectangular or square shaped peripheral edge, similar to the central horizontal plane support beam 460 shown in FIG. 22.

Each central horizontal plane support beam 660 is preferably located at a vertical position that is generally parallel with each of the first rotating direction aerodynamic rotors 672 and the second rotating direction aerodynamic rotors 673. This configuration aids in protecting the first rotating direction aerodynamic rotors 672 and the second rotating direction aerodynamic rotors 673 from contacting other objects, thus reducing any risk of damage to the first rotating direction aerodynamic rotors 672 and the second rotating direction aerodynamic rotors 673 or the other objects.

The remotely controlled aeronautical vehicle 620 introduces an adaptation for use in an environment including at least one body of water. The remotely controlled aeronautical vehicle 620 can include features to enable self-righting when the remotely controlled aeronautical vehicle 620 lands in a body of water.

The remotely controlled aeronautical vehicle 620 can include features to water proof the electronic components, including the controller circuits, the wires, the portable power supply, and the like (not shown). Each of the series of vertically oriented flexible arch shaped upper frame segment 642 can be solid or hollow (as shown in a section view illustrated in FIG. 26. Each of the series of vertically oriented flexible arch shaped upper frame segment 642 would be fabricated to include a vertically oriented flexible arch shaped frame upper frame segment hollowed interior 682. Similarly, each of the series of vertically oriented flexible arch shaped lower frame segment 643 would be fabricated to include a vertically oriented flexible arch shaped lower frame segment hollowed interior 683, and the protrusion hollowed interior 688 would be fabricated to include a protrusion hollowed interior 688. The hollowed and sealed self-righting frame assembly 640 is adapted to self-right the remotely controlled aeronautical vehicle 620 when the remotely controlled aeronautical vehicle 620 lands in a body of water. Several features aid in self-righting the remotely controlled aeronautical vehicle 620. The protrusion hollowed interior 688 would be sized to aid in self righting the remotely controlled aeronautical vehicle 620. The centroid of the mass of the weighted mass controller assembly 654 would be below the center of buoyancy of the remotely controlled aeronautical vehicle 620 provided by the hollowed and sealed self-righting frame assembly 640 to aid in self righting the remotely controlled aeronautical vehicle 620.

Each vertically oriented flexible arch shaped lower frame segment hollowed interior 683 can be adapted to fill with water to aid in the self-righting process. Each vertically oriented flexible arch shaped lower frame segment hollowed interior 683 would release the water as the remotely controlled aeronautical vehicle 620 returns to flight. The first rotating direction aerodynamic rotor 672 and second rotating direction aerodynamic rotor 673 would be adapted to remain above the waterline when each vertically oriented flexible arch shaped lower frame segment hollowed interior 683 is filled with water.

The first rotating direction aerodynamic rotor 672 and/or the second rotating direction aerodynamic rotor 673 can be activated to aid in the self-righting process. The activated first rotating direction aerodynamic rotor 672 and/or second rotating direction aerodynamic rotor 673 would introduce an instability, allowing physics to take over and self right the remotely controlled aeronautical vehicle 620.

Figure 27:
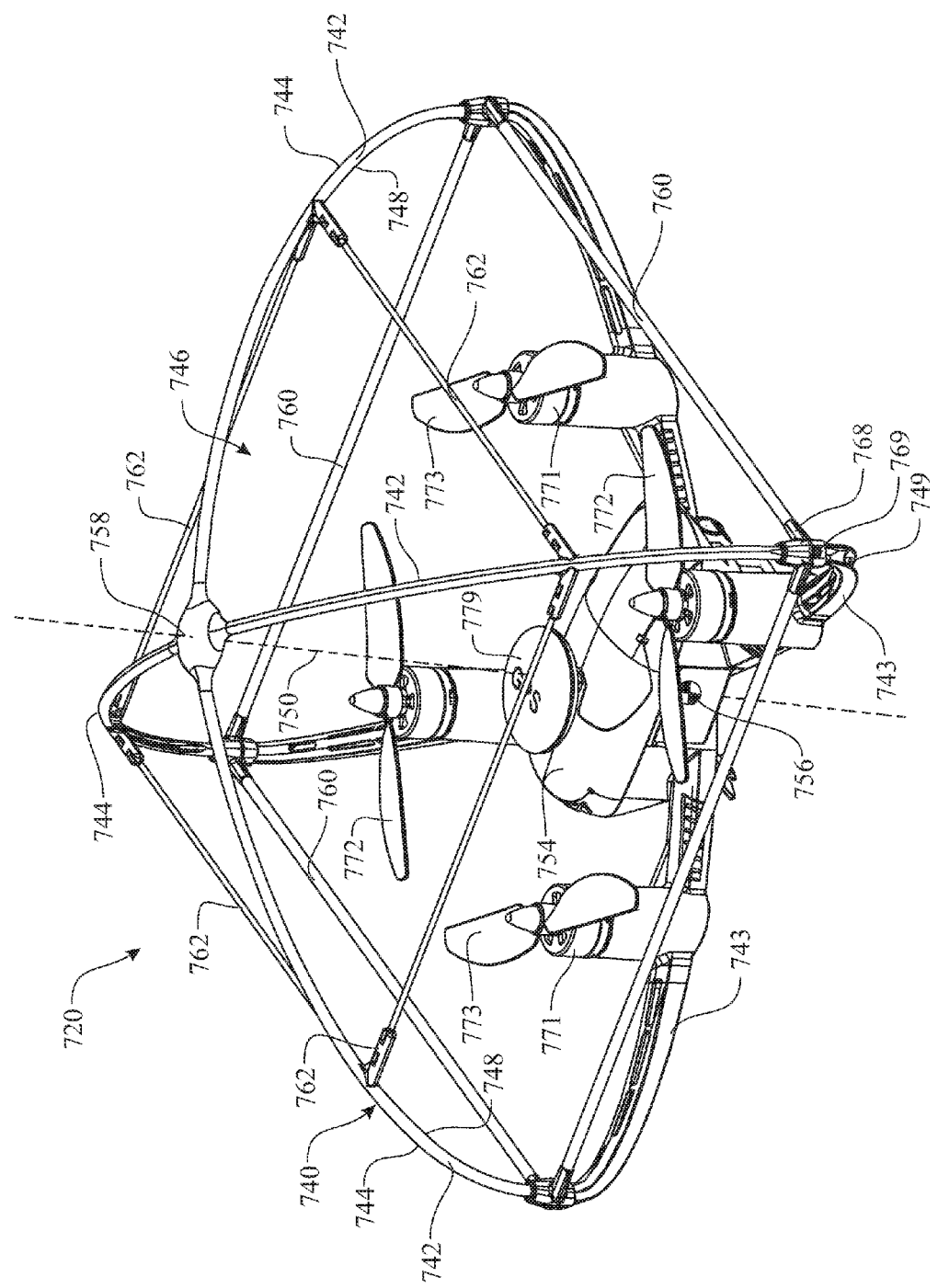
FIG. 27 presents an isometric top and side view of a modified variant of the fourth exemplary embodiment of the aeronautical vehicle originally introduced in FIG. 25.

A remotely controlled aeronautical vehicle 720, introduced in FIG. 27, is an enhanced variant of the remotely controlled aeronautical vehicle 620. The remotely controlled aeronautical vehicle 720 comprises a significant number of elements that are the same as in the remotely controlled aeronautical vehicle 620 introduced in FIG. 25. Like features of the remotely controlled aeronautical vehicle 720 and remotely controlled aeronautical vehicle 620 are numbered the same except preceded by the numeral '7'.

The remotely controlled aeronautical vehicle 720 includes additional function components, including at least one of a Global Positioning System (GPS) circuit 779, inspection equipment, such as a camera, an Infra-Red (IR) circuit, an ultrasonic inspection circuit, an X-ray circuit, an accelerometer, acoustic devices, thermographer, pressure sensor, radiography and the like. The remotely controlled aeronautical vehicle 720 can include a series of secondary horizontal plane support beams 762, replicating the series of central horizontal plane support beams 760, wherein the secondary horizontal plane support beam 762 are located above and/or below the central horizontal plane support beam 760 to provide additionally structural support to the self-righting frame assembly 640.

Figure 28:
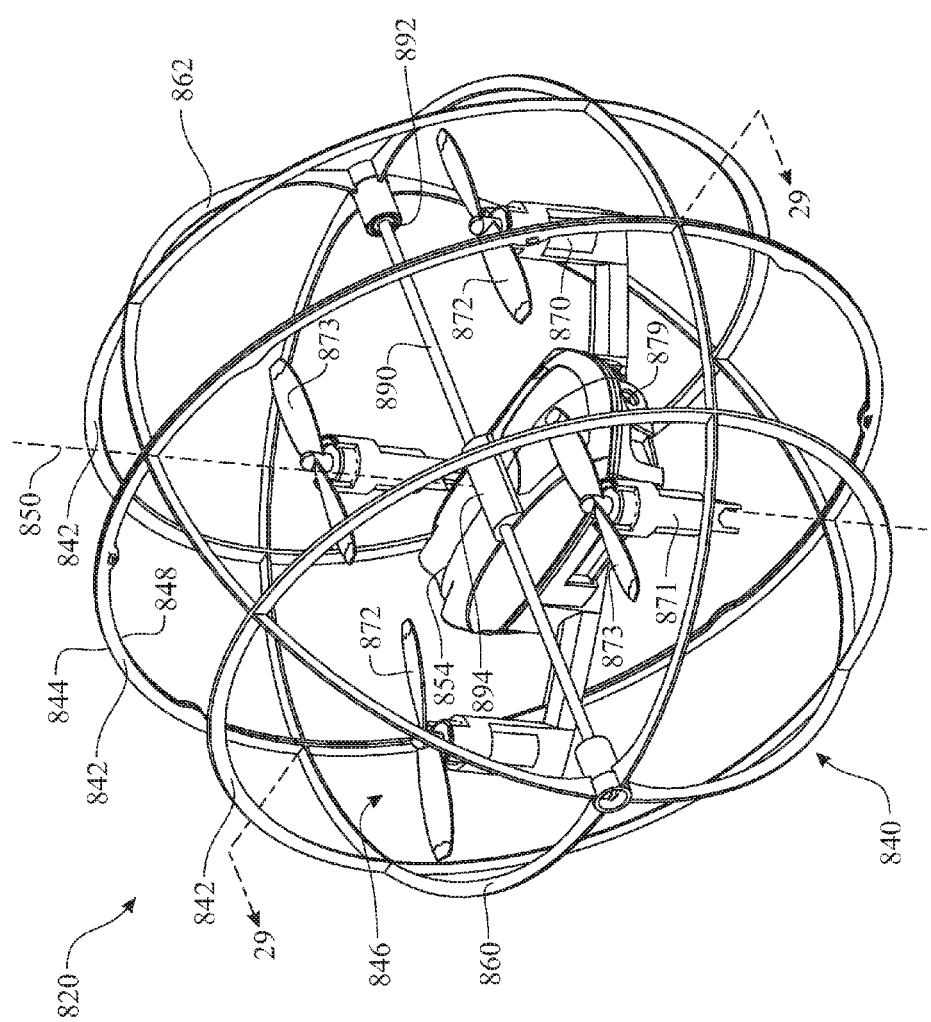
FIG. 28 presents an isometric top and side view of a fifth exemplary embodiment of an aeronautical vehicle, the illustration introducing a pivoting system adapted to pivot a weighted mass controller assembly.
Figure 29:
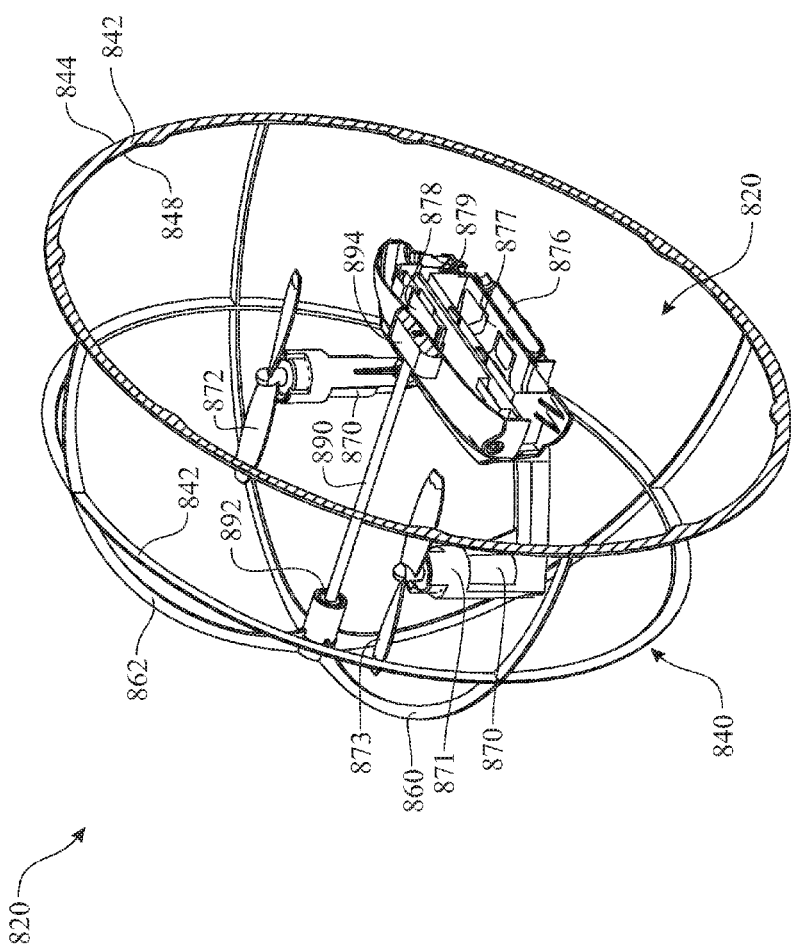
FIG. 29 presents a sectioned elevation view of the fifth exemplary embodiment originally introduced in FIG. 28, wherein the section is taken along section line 29-29 if FIG. 28, introducing the electronic controller circuits.
Figure 31:
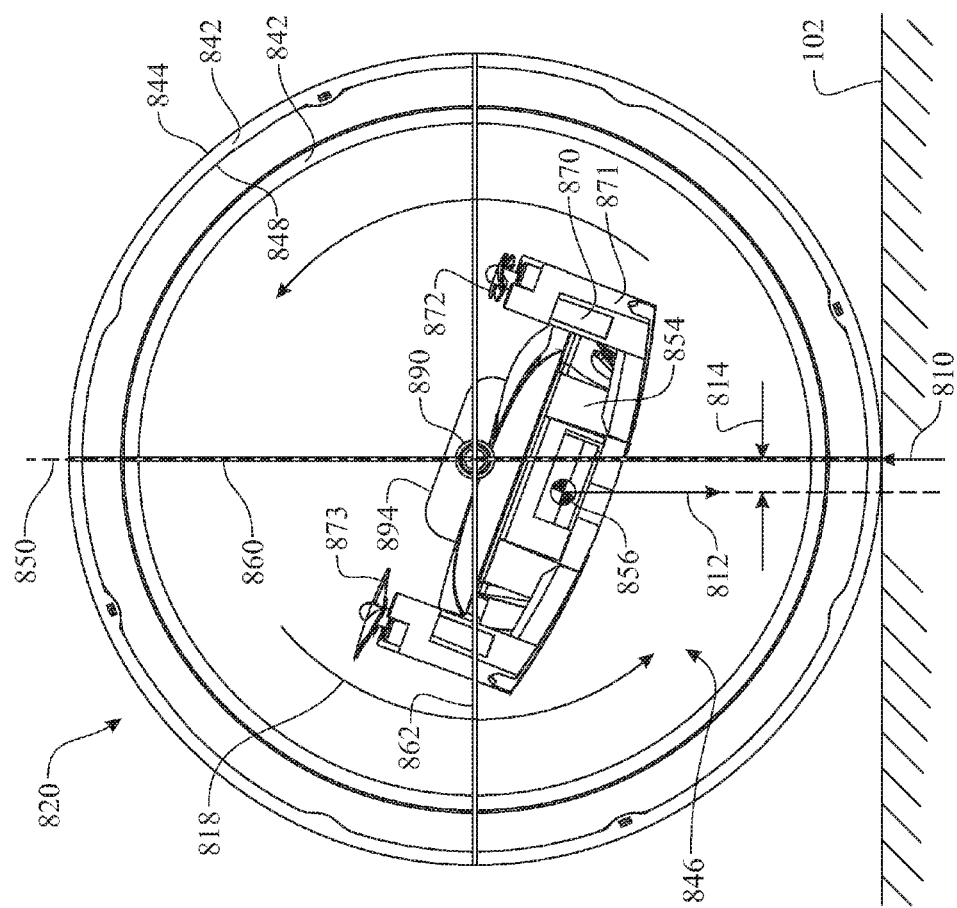
FIG. 31 presents a side elevation view of the fifth exemplary embodiment originally introduced in FIG. 28, the illustration introducing a pivotal correction of the weighted mass controller assembly about an axis parallel to the pivot axle, orienting the weighted mass controller assembly into a flight ready configuration.
Figure 32:
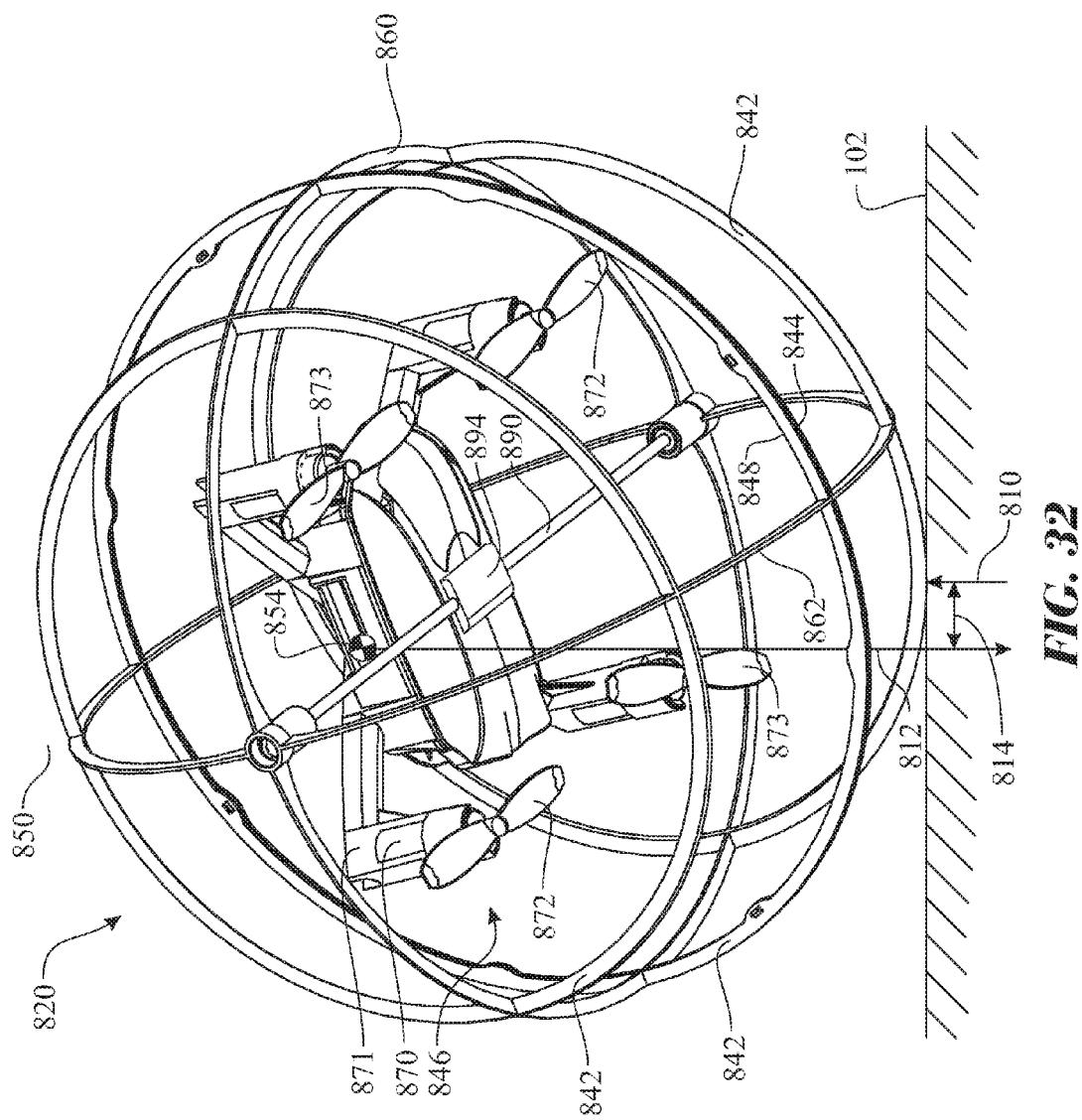
FIG. 32 presents an isometric view of the fifth exemplary embodiment originally introduced in FIG. 28, the illustration introducing corrections from an inverted state into the flight ready configuration.
Figure 33:
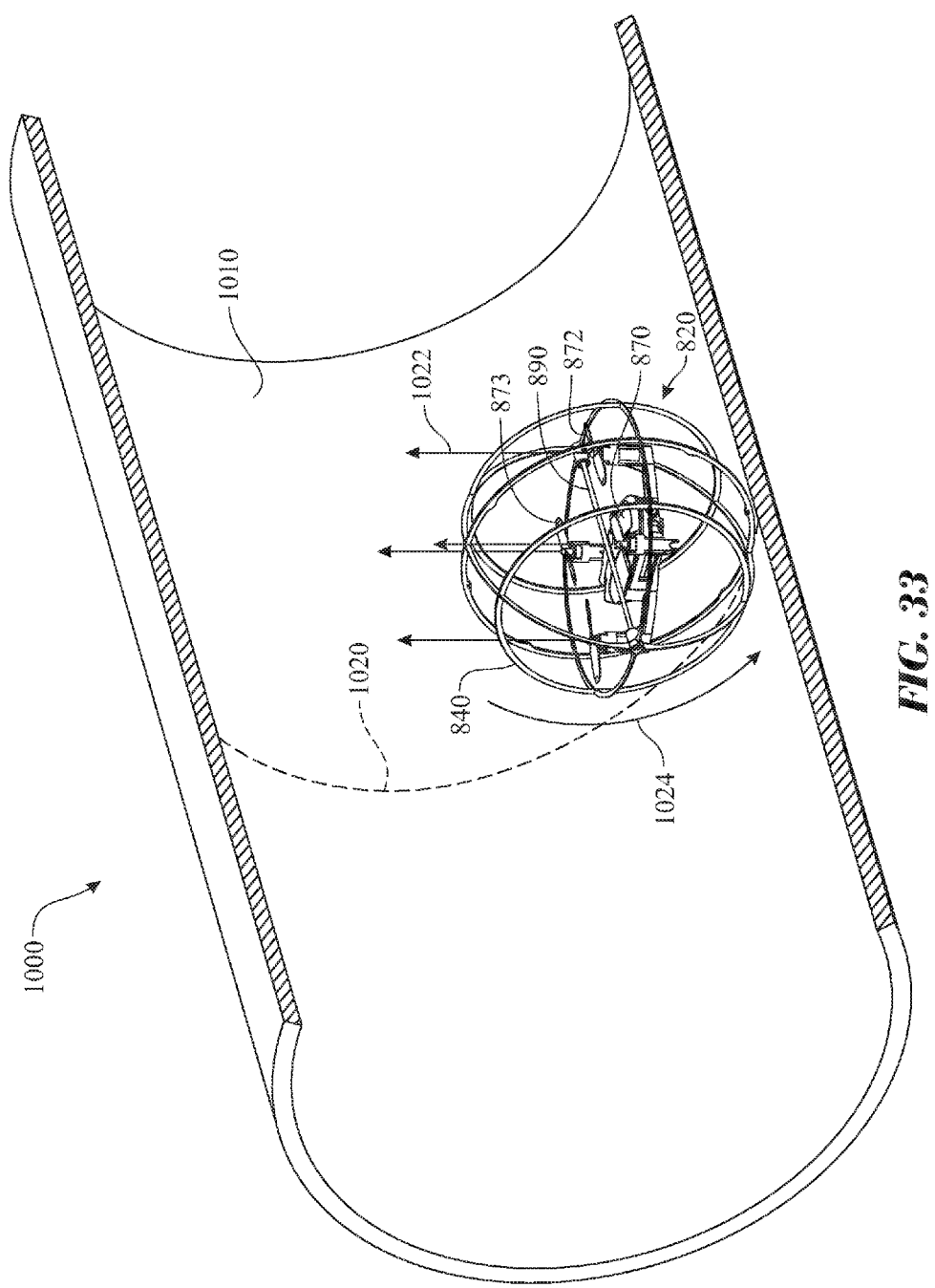
FIG. 33 presents a sectioned isometric view introducing a first position of an exemplary application using the remotely controlled aeronautical vehicle introduced in FIG. 28.
Figure 34:
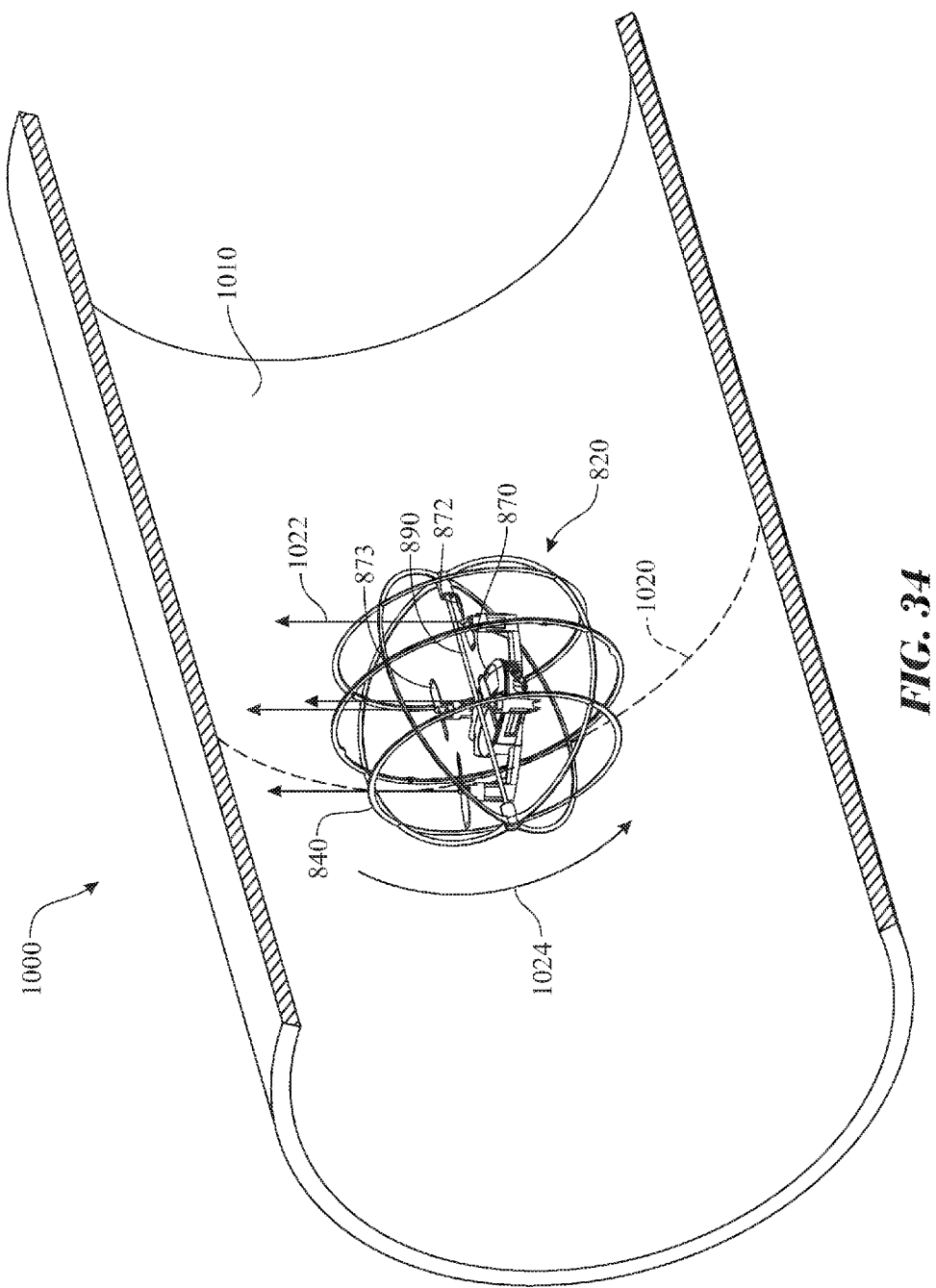
FIG. 34 presents a sectioned isometric view introducing a second position of the exemplary application introduced in FIG. 33 using the remotely controlled aeronautical vehicle introduced in FIG. 28.
Figure 35:
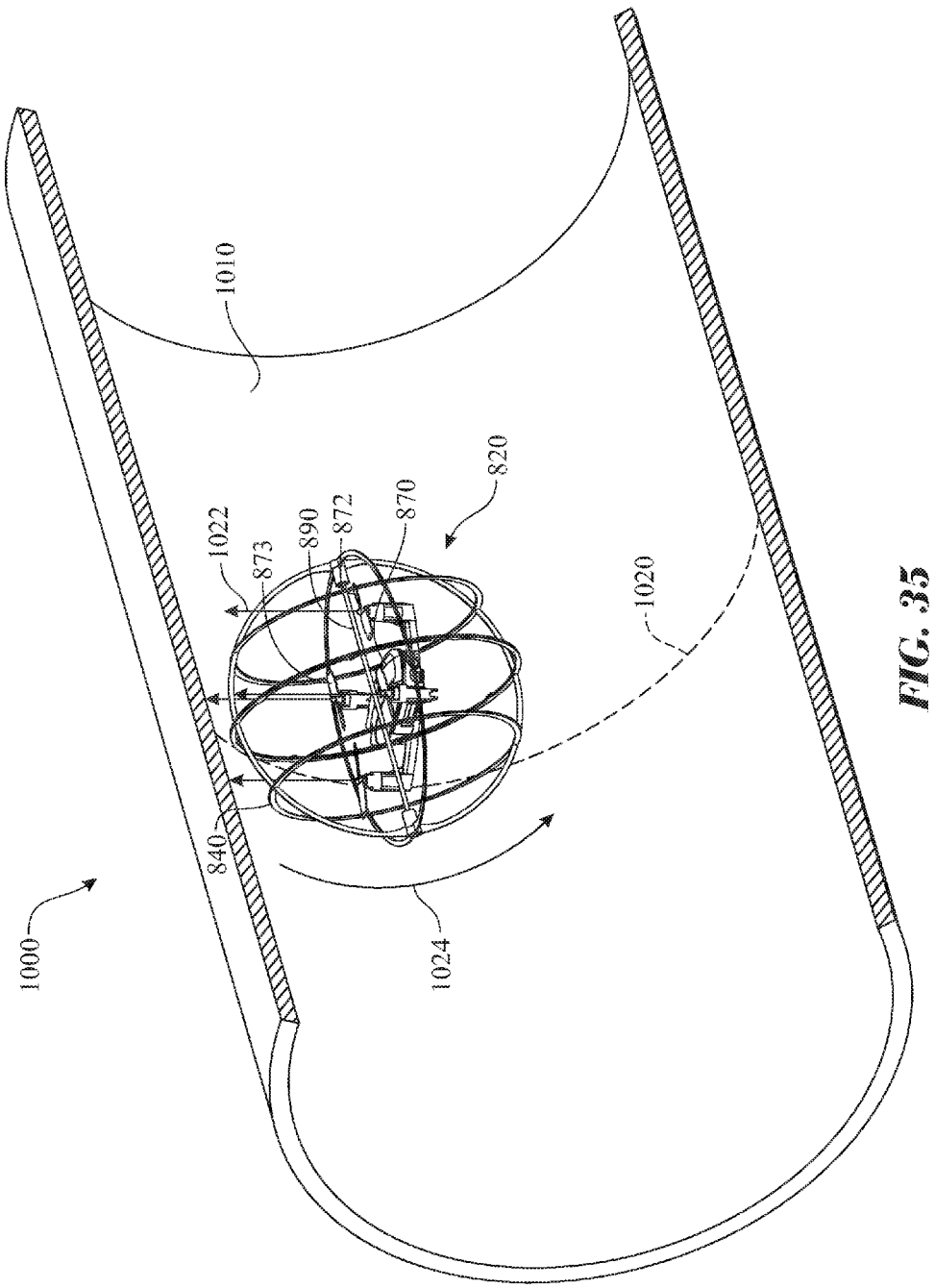
FIG. 35 presents a sectioned isometric view introducing a third position of the exemplary application introduced in FIG. 33 using the remotely controlled aeronautical vehicle introduced in FIG. 28.

A remotely controlled aeronautical travel and inspection vehicle 820, introduced in FIG. 28 and detailed in FIGS. 29 through 32, is adapted for inspection of partially enclosed structure interior surface(s) 1010 of a at least partially enclosed structure 1000, as illustrated in an exemplary inspection shown in FIGS. 33 through 35. The remotely controlled aeronautical travel and inspection vehicle 820 comprises a number of elements that are similar to the remotely controlled aeronautical vehicle 420 introduced in FIG. 21. Like features of the remotely controlled aeronautical travel and inspection vehicle 820 and remotely controlled aeronautical vehicle 420 are numbered the same except preceded by the numeral '8', with the distinctions being described herein.

The self-righting frame assembly 440 includes a plurality of substantially identical vertically oriented frames 442 having an elliptically shaped circular shaped outer curved edge 444.

The remotely controlled aeronautical travel and inspection vehicle 820 includes a self-righting frame assembly 840 comprising a first axially oriented circular shaped frame segment 860 and a second axially oriented circular shaped frame segment 862. The first axially oriented circular shaped frame segment 860 and the second axially oriented circular shaped frame segment 862 each define a plane, wherein the first axially oriented circular shaped frame segment 860 and the second axially oriented circular shaped frame segment 862 are arranged having the defined plane being parallel to a central rotational axis. The first axially oriented circular shaped frame segment 860 and the second axially oriented circular shaped frame segment 862 bisect one another. In the exemplary embodiment, the planes defined by the first axially oriented circular shaped frame segment 860 and the second axially oriented circular shaped frame segment 862 are perpendicular to one another. The self-righting frame assembly 840 can additionally include at least one radially oriented circular shaped frame segment 842. Each of the at least one radially oriented circular shaped frame segment 842 defines a plane, wherein the at least one radially oriented circular shaped frame segment 842 is arranged having the defined plane being perpendicular to a central rotational axis and the planes of the first axially oriented circular shaped frame segment 860 and the second axially oriented circular shaped frame segment 862. It is preferred to position one of the at least one radially oriented circular shaped frame segment 842 centrally. In the exemplary embodiment, the self-righting frame assembly 840 is fabricated having two like hemispherically shaped frame sections, each terminating at a centrally located radially oriented circular shaped frame segment 842. The two like hemispherically shaped frame sections are assembled to one another by joining the pair of centrally located radially oriented circular shaped frame segments 842.

The first axially oriented circular shaped frame segment 860, the second axially oriented circular shaped frame segment 862, and the radially oriented circular shaped frame segment 842 are each designed having a circular shaped circular shaped outer curved edge 844. The circular shaped circular shaped outer curved edge 844 and like exterior edges of the first axially oriented circular shaped frame segment 860 and the second axially oriented circular shaped frame segment 862 enable even, consistent rolling of the self-righting frame assembly 840 against a surface. The spherically shaped exterior of the self-righting frame assembly 840 maintains a generally constant distance between a weighted mass controller assembly 854 and the partially enclosed structure interior surface 1010 of the at least partially enclosed structure 1000.

The weighted mass controller assembly 854 contains the operating circuits used to control the remotely controlled aeronautical travel and inspection vehicle 820. The operating circuits can include a controller circuit 877, remote control electronics 878, and the like. A power supply 876 can be included to provide power to the controller circuit 877 and the remote control electronics 878. One or more inspection equipment 879 can be integrated into the weighted mass controller assembly 854. The inspection equipment 879 is preferably arranged being oriented perpendicular to the mass controller pivot axle 890.

The exemplary remotely controlled aeronautical travel and inspection vehicle 820 includes a plurality of maneuvering and lift mechanism 870. In the remotely controlled aeronautical vehicle 420, each maneuvering and lift mechanism 870 was supported by a first central traversing beam 464 or a second central traversing beam 466. In the remotely controlled aeronautical vehicle 620, each maneuvering and lift mechanism 670 was supported by the vertically oriented flexible arch shaped lower frame segment 643. In the exemplary remotely controlled aeronautical travel and inspection vehicle 820, each maneuvering and lift mechanism 870 is supported by the weighted mass controller assembly 854 by a support arm. The plurality of maneuvering and lift mechanism 870 is arranged maintaining a balance and equilibrium of the remotely controlled aeronautical travel and inspection vehicle 820.

The weighted mass controller assembly 854 is supported by a mass controller pivot axle 890 by a mass controller mounting element 894. The mass controller pivot axle 890 spans across a central void 846 of a self-righting frame assembly 840 of the remotely controlled aeronautical travel and inspection vehicle 820. An elongated axis of the mass controller pivot axle 890 is preferably arranged linearly and concentrically with a central axis of the self-righting frame assembly 840. In the exemplary embodiment, the mass controller pivot axle 890 is assembled to the self-righting frame assembly 840 at a junction location formed between the first axially oriented circular shaped frame segment 860 and the second axially oriented circular shaped frame segment 862.

The weighted mass controller assembly 854 is pivotally carried by the mass controller pivot axle 890 by a mass controller mounting element 894. The pivotal arrangement can be accomplished by any of a number of options. In a first configuration, the mass controller pivot axle 890 can be pivotally assembled to the self-righting frame assembly 840 by a mass controller pivot axle bushing or bearing 892. This configuration enables the mass controller pivot axle 890 to pivot or rotate respective to the self-righting frame assembly 840. The mass controller mounting element 894 can be rigidly mounted to the pivotal mass controller pivot axle 890 or pivotally mounted to the mass controller pivot axle 890. In a second configuration, the mass controller pivot axle 890 can be rigidly mounted to the self-righting frame assembly 840 and the mass controller mounting element 894 would be pivotally assembled to the mass controller pivot axle 890.

Figure 30:
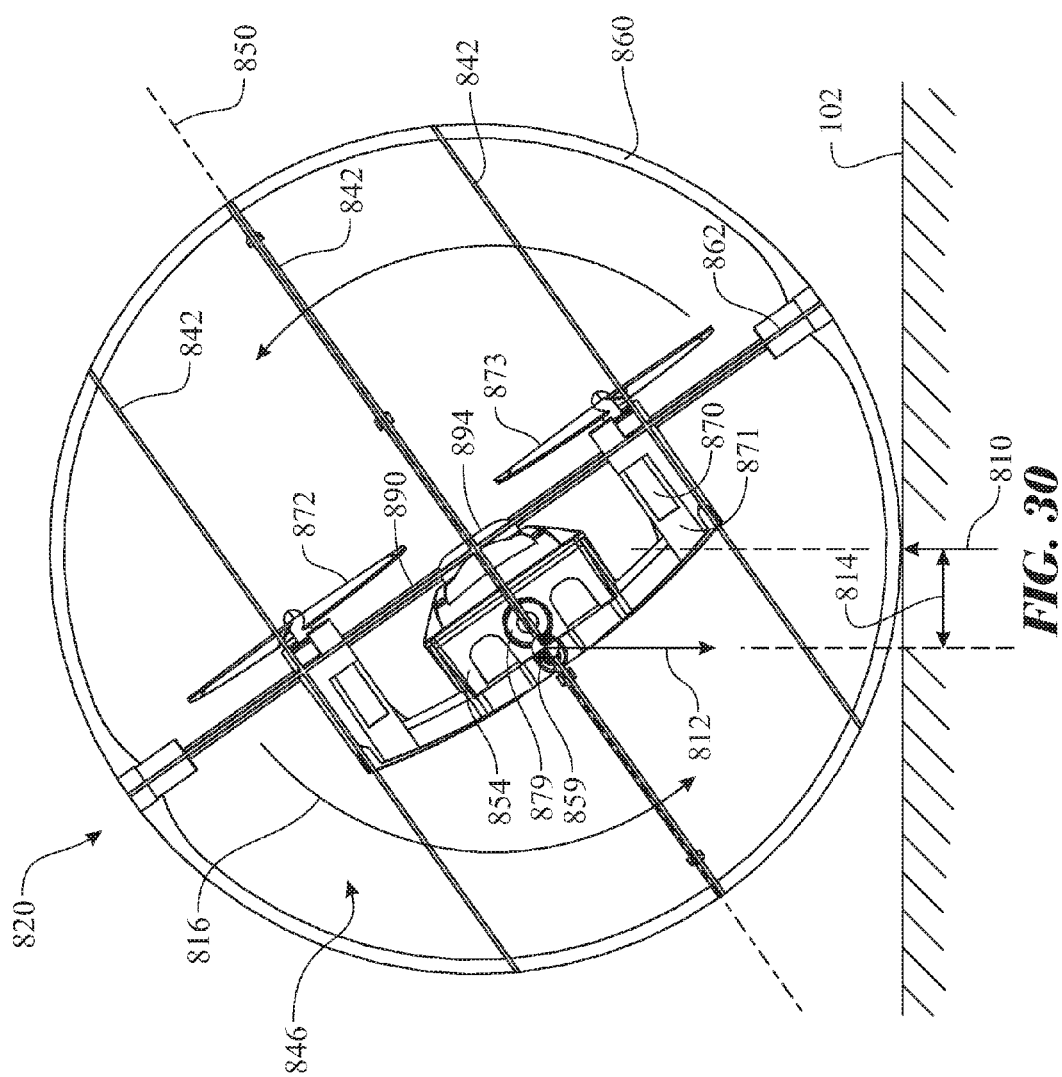
FIG. 30 presents a side elevation view of the fifth exemplary embodiment originally introduced in FIG. 28, the illustration introducing a rotational correction of the self-righting frame assembly about an axis perpendicular to the pivot axle, orienting the pivot axis and the weighted mass controller assembly into the flight ready configuration.

The general self-righting nature of the remotely controlled aeronautical travel and inspection vehicle 820 is based upon two different steps, as illustrated in FIGS. 30 through 32. A first portion of the process rotates the self-righting frame assembly 840 positioning the mass controller pivot axle 890 in a horizontal orientation. A second portion of the process rotates the weighted mass controller assembly 854 into a flight ready orientation.

The first portion of the process is applied when the mass controller pivot axle 890 is oriented horizontally, as illustrated in the side elevation view shown in FIG. 30. The external shape of the self-righting frame assembly 840 enables the remotely controlled aeronautical travel and inspection vehicle 820 to return to a semi-flight ready orientation, positioning the mass controller pivot axle 890 in a horizontal orientation. A support normal force 810 is created by the weight of the remotely controlled aeronautical travel and inspection vehicle 820 and applied vertically where the self-righting frame assembly 840 contacts the surface 102. A controller assembly weight 812 is created by the weight of the weighted mass controller assembly 854 at the center of gravity 856. In a condition where the mass controller pivot axle 890 is angled, respective to a horizontal, normal flight orientation, the center of gravity 856 is offset by a moment arm 814. The offset or moment arm 814 between the support normal force 810 and the controller assembly weight 812 creates a torque. The created torque causes the self-righting frame assembly 840 to rotate in accordance with a frame assembly self-righting motion 816, returning the mass controller pivot axle 890 into a horizontal or flight ready orientation.

The second portion of the process is applied when the mass controller pivot axle 890 is oriented horizontally, as illustrated in the side elevation view shown in FIG. 31. The pivotal enablement of the weighted mass controller assembly 854 respective to the self-righting frame assembly 840 enables the weighted mass controller assembly 854 to return to a flight ready orientation. A limited friction provided between the pivoting elements is preferred to minimize any continuous pendulum motion of the weighted mass controller assembly 854. The self-righting frame assembly 840 is supported by the surface 102. A support normal force 810 is created by the weight of the remotely controlled aeronautical travel and inspection vehicle 820 and applied vertically where the self-righting frame assembly 840 contacts the surface 102. A controller assembly weight 812 is created by the weight of the weighted mass controller assembly 854 at the center of gravity 856. In a condition where the weighted mass controller assembly 854 is angled, respective to a horizontal, normal flight orientation, the center of gravity 856 is offset by a moment arm 814. The offset or moment arm 814 between the support normal force 810 and the controller assembly weight 812 creates a torque. The created torque causes the weighted mass controller assembly 854 to rotate in accordance with a controller assembly self-righting motion 818, returning the weighted mass controller assembly 854 into a flight ready orientation.

The remotely controlled aeronautical travel and inspection vehicle 820 is adapted to inspect an interior of an at least partially enclosed structure 1000, as illustrated in FIGS. 33 through 35. Although the exemplary at least partially enclosed structure 1000 is a pipe, the at least partially enclosed structure can be any applicable structure, including a tank, a fuel tank, a water tank, a cargo container, ships, trains, airplanes, rockets, spaceships, tunnels, and the like. The application can be expanded to inspection of any object comprising a generally vertically oriented surface, including buildings, bridges, elevators, and the like.

The remotely controlled aeronautical travel and inspection vehicle 820 would be placed within the interior of the at least partially enclosed structure 1000, and preferably placed upon a lower surface. The remotely controlled aeronautical travel and inspection vehicle 820 would preferably be oriented arranging the mass controller pivot axle 890 to be substantially parallel to the partially enclosed structure interior surface 1010 of the at least partially enclosed structure 1000. This arrangement allows the self-righting frame assembly 840 to roll along the partially enclosed structure interior surface 1010 during the inspection process. The remotely controlled aeronautical travel and inspection vehicle 820 would be activated, powering each of the at least one maneuvering and lift mechanism 870, which rotates each of the aerodynamic rotors 872, 873 to generate a vehicle lifting force 1022. The direction of the vehicle lifting force 1022 can be slightly offset from vertical, wherein the vehicle lifting force 1022 would be directed slightly towards the partially enclosed structure interior surface 1010. This would retain the self-righting frame assembly 840 against the partially enclosed structure interior surface 1010, causing the self-righting frame assembly 840 to roll along an inspection vehicle travel path 1020, as indicated by a vehicle frame rotation 1024. The pivoting capabilities of the weighted mass controller assembly 854 provided by the mass controller pivot axle 890 retain the weighted mass controller assembly 854 in a flight configuration, while the self-righting frame assembly 840 rotates along the partially enclosed structure interior surface 1010. The inspection equipment 879 would acquire inspection information during the inspection process. The inspection equipment 879 can be configured to complete a visual inspection, a thermal inspection, an ultrasonic inspection, an X-ray inspection, and the like. The collected inspection data can be stored in a non-volatile digital memory device installed in the controller circuit 877 and/or forwarded to a server or other data acquisition device using any suitable wireless communication protocol. The use of wireless communication can enable real time inspection, allowing the inspector to modify the inspection time and/or inspection path as needed. The inspection process would continue until the inspector determines that the process is complete. Upon completion, the remotely controlled aeronautical travel and inspection vehicle 820 would be removed from within the at least partially enclosed structure 1000 and the at least partially enclosed structure 1000 would be returned to an operational configuration.

Figure 36:
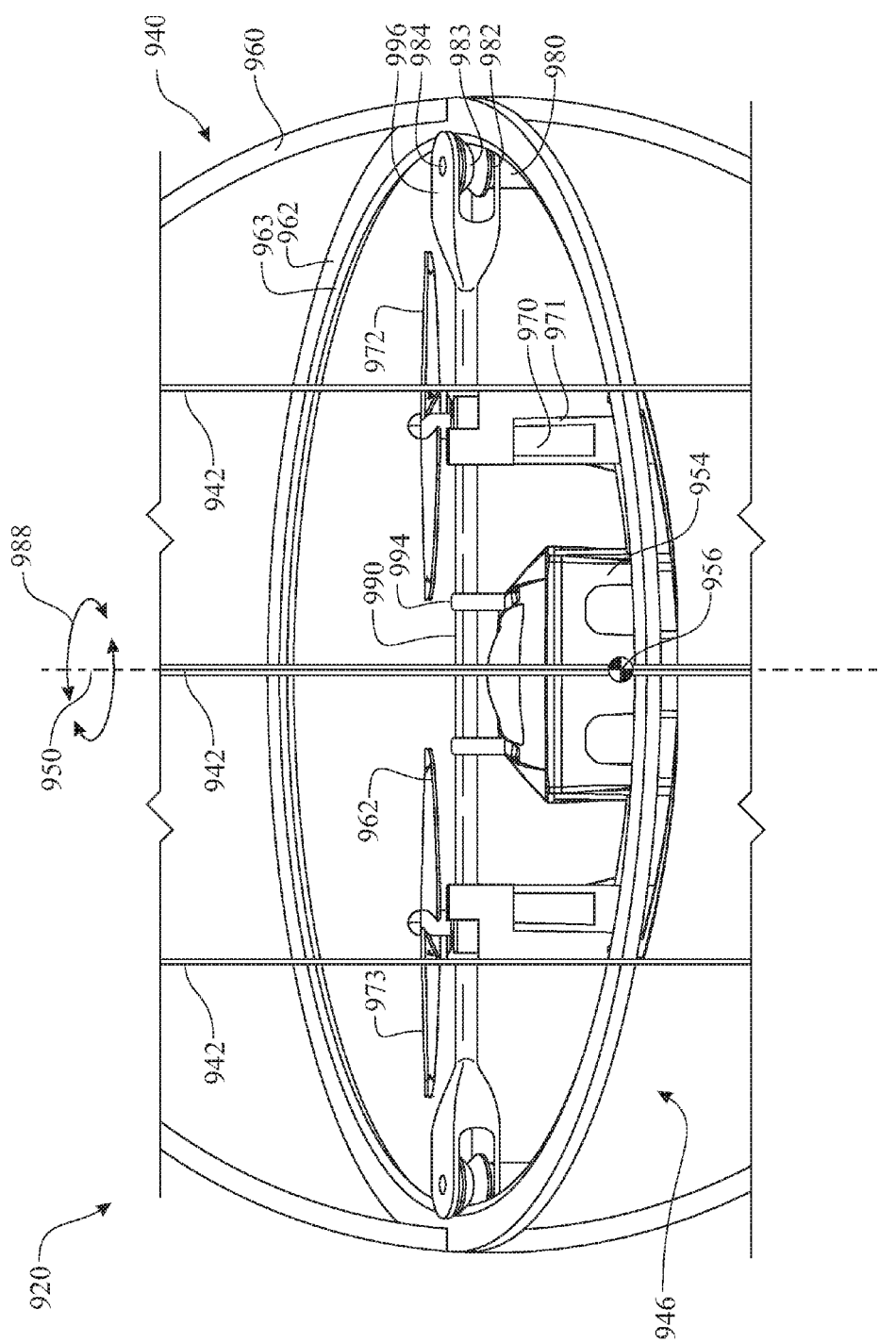
FIG. 36 presents a front isometric view introducing an enhanced variant of the fifth exemplary embodiment originally introduced in FIG. 28, the illustration introducing a rotating system into the pivot system.

The mass controller pivot axle 890 is fixed respective to the self-righting frame assembly 840 of the remotely controlled aeronautical travel and inspection vehicle 820, thus introducing some limitations when navigating about an interior of the at least partially enclosed structure 1000. A remotely controlled aeronautical travel and inspection vehicle 920, introduced in FIG. 36, is an enhanced version of the remotely controlled aeronautical travel and inspection vehicle 820, wherein the remotely controlled aeronautical travel and inspection vehicle 920 is adapted to overcome the limitations of a fixed mass controller pivot axle 890 within the self-righting frame assembly 840. The remotely controlled aeronautical travel and inspection vehicle 920 comprises a significant number of elements that are the same as in the remotely controlled aeronautical travel and inspection vehicle 820 introduced in FIG. 28. Like features of the remotely controlled aeronautical travel and inspection vehicle 920 and the remotely controlled aeronautical travel and inspection vehicle 820 are numbered the same except preceded by the numeral '9'. The mass controller pivot axle 990 is modified to enable rotation about an axis perpendicular to the elongated central axis of the mass controller pivot axle 990 by including a pair of pivot axle rotational wheels 982 at each distal end. Each pivot axle rotational wheel 982 would be rotationally assembled to a pivot axle rotational wheel mounting bracket 996 by a pivot axle rotational wheel shaft 984. The pivot axle rotational wheel mounting bracket 996 is carried at each respective distal end of the mass controller pivot axle 990. One or more pivot axle rotational wheels 982 would be rotationally controlled by a respective pivot axle rotational wheel controller motor 980 or any other suitable rotational controlling mechanism. It is understood that one pivot axle rotational wheel 982 can be rotationally controlled and the remaining pivot axle rotational wheel 982 can rotated freely. Weight would be provided to retain proper balance across the remotely controlled aeronautical travel and inspection vehicle 920. Each rotational controlling mechanism would be in operational communication with the controller circuit of the weighted mass controller assembly 954. A pivot axle rotational wheel concave shaped engaging surface 983 can be formed about a contacting circumferential surface of the respective pivot axle rotational wheel 982, wherein the pivot axle rotational wheel concave shaped engaging surface 983 is formed to mate with a second axially oriented circular shaped frame segment guide edge 963 of the second axially oriented circular shaped frame segment 962. The shape of the pivot axle rotational wheel concave shaped engaging surface 983 and the mating second axially oriented circular shaped frame segment guide edge 963 are to retain engagement therebetween.

In operation, the weighted mass controller assembly 954 pivots freely about the mass controller pivot axle 990, maintaining an in flight orientation. The mass controller pivot axle 990 would be rotated to maintain an orientation that is parallel to a surface of desired travel by activating one or more pivot axle rotational wheel controller motors 980. Activation of the pivot axle rotational wheel controller motor 980 would rotate the mass controller pivot axle 990 about the central vertical axis 950, wherein the motion of the mass controller pivot axle 990 is identified as a pivot axle rotational motion 988.

Although the described concepts are adapted for use as a radio controlled vehicle, it is understood that the same principles can be adapted to a larger scale vehicle used for transporting weapons and/or people.

The embodiments described above described each of the vertically oriented frames 142, 342, 442, 542, 642, 742 being as substantially identical. The vertically oriented frames 142, 342, 442, 542 are preferred to be identical for balance. It is understood that the vertically oriented frames 142, 342, 442, 542, 642, 742 can differ from one to another as long as the self-righting frame assembly 140, 340, 440, 540, 640, 740 is suitably balanced for flight. Similarly, the arrangement of the vertically oriented frames 142, 342, 442, 542, 642, 742 is described as being separated by equal angles. It is understood that the vertically oriented frames 142, 342, 442, 542, 642, 742 can be arranged at varying spacing or angles from one to another as long as the self-righting frame assembly 140, 340, 440, 540, 640, 740 is suitably balanced for flight.

It is understood that a portion of the shell structure may in fact be capable of independent movement and varying orientation (similar to an aileron as a sub-component capable of independent movement from a wing) as required for performance, control or other desirable feature as required.

The self-righting frame assembly 140, 340, 440, 540, 640, 740, 840 can further incorporate elements commonly used in aviation, including ailerons, a rudder, elevators, and the like to improve flight control. These can be controlled using any suitable control elements known by those skilled in the art for both radio controlled vehicles as well as manned vehicles.

The previous embodiments were adapted for flight. The movements of the remotely controlled aeronautical travel and inspection vehicle 920 can be adapted for terrestrial motion.

Figure 37:
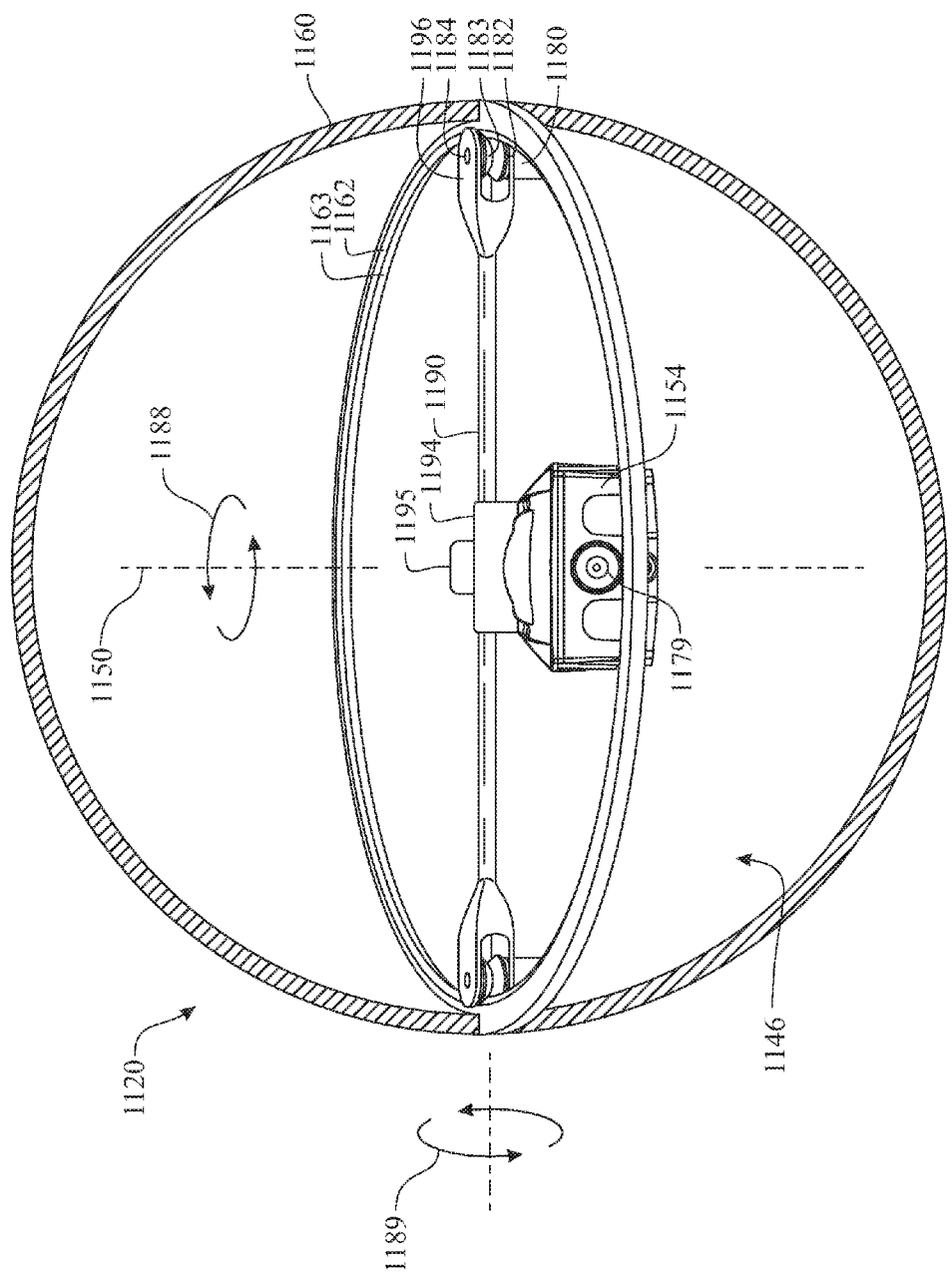
FIG. 37 presents a front isometric view introducing an adaptation of the remotely controlled aeronautical vehicle introduced in FIG. 36 to a terrain vehicle.

A remotely controlled terrestrial vehicle 1120, introduced in FIG. 37, is adapted for terrestrial travel. The remotely controlled terrestrial vehicle 1120 comprises a number of elements that are the same as in the remotely controlled aeronautical travel and inspection vehicle 920 introduced in FIG. 36. Like features of the remotely controlled terrestrial vehicle 1120 and the remotely controlled aeronautical travel and inspection vehicle 920 are numbered the same except preceded by the numeral '11'. The remotely controlled terrestrial vehicle 1120 omits the components associated with lift, such as the maneuvering and lift mechanisms 970 and the aerodynamic rotors 972, 973. The spherically shaped shell 1160 is a solid spherically shaped shell. Motion is provided by two movement generating mechanisms. A first movement generating mechanism is a pivotal motion of the weighted mass controller assembly 1154 provided by a mass controller pivot control mechanism 1195. The mass controller pivot control mechanism 1195 includes mechanisms to rotate the weighted mass controller assembly 1154 respective to the mass controller pivot axle 1190. The operating mechanisms of the mass controller pivot control mechanism 1195 can be any suitable mechanism known by those skilled in the art to accomplish the desired motion. Contrary to previous designs, the mass controller mounting element 1194 does not freely pivot about the mass controller pivot axle 1190. The pivoting of the weighted mass controller assembly 1154 about the mass controller pivot axle 1190 is controlled by the mass controller pivot control mechanism 1195. For example, the mass controller pivot control mechanism 1195 can employ a motor, gears, a clutch, an electronic magnet, a chain, a belt drive, and the like.

By driving a pivoting motion of the weighted mass controller assembly 1154 about the mass controller pivot axle 1190, identified as a pivot axle pivotal drive motion 1189, the offset weight of the weighted mass controller assembly 1154 causes the spherically shaped shell 1160 to rotate about an elongated axis of the mass controller pivot axle 1190. The orientation of the mass controller pivot axle 1190 determines the direction of travel. By rotating the mass controller pivot axle 1190, the controller can redirect the direction of travel of the remotely controlled terrestrial vehicle 1120. The orientation of the mass controller pivot axle 1190 is controlled by rotation of the pivot axle rotational wheel 1182 and engagement between the pivot axle rotational wheel concave shaped engaging surface 1183 and the circular ring shaped frame element guide edge 1163 of the circular ring shaped frame element 1162. Rotation of the pivot axle rotational wheel 1182 rotates the mass controller pivot axle 1190 about a central vertical axis 1150, referenced as a pivot axle rotational motion 1188.

The remotely controlled terrestrial vehicle 1120 employs a circular ring shaped frame element 1162 within the central void 1146. A remotely controlled terrestrial vehicle 1220, introduced in FIG. 38, is a variant of the remotely controlled terrestrial vehicle 1120 utilizing the same concept for terrestrial movement, where the terrestrial movement relies upon the orientation of the mass controller pivot axle 1290 to determine the direction of travel and pivoting of the weighted mass controller assembly 1254 for generation of travel.

The weighted mass controller assembly 1254 is preferably fixed to the mass controller pivot axle 1290. A pivotal motion of the mass controller pivot axle 1290 about an elongated axis thereof, identified by a pivot axle pivotal drive motion 1289, raises the weighted mass controller assembly 1254 accordingly. Raising the weighted mass controller assembly 1254 offsets the center of gravity of the weighted mass controller assembly 1254 away from a vertical alignment with the mass controller pivot axle 1290. This offset generates a torque, which drives a rotation of the mass controller pivot axle 1290 to return the center of gravity of the weighted mass controller assembly 1254 to the lowest point possible; in vertical alignment with the mass controller pivot axle 1290. The pivotal motion of the mass controller pivot axle 1290 drives the remotely controlled terrestrial vehicle 1220 to travel in a direction that is perpendicular to the elongated axis of the mass controller pivot axle 1290.

A series of wheels 1282, 1286 are used to alter the orientation of the mass controller pivot axle 1290 within an interior of a spherically shaped shell 1260, thus changing the direction of travel of the remotely controlled terrestrial vehicle 1220. Each pair of wheels 1282, 1286 is located at a respective distal end of the mass controller pivot axle 1290. The wheels are arranged to rotate about a generally vertical axis, wherein the orientation of the wheels are defined by the location of the weighted mass controller assembly 1254. The wheels can be slightly offset from a vertical rotation, with the first pivot axle rotational wheel 1282 being oriented slightly downward and the second pivot axle rotational wheel 1286 being oriented slightly upward. This configuration aids in retaining the mass controller pivot axle 1290 centered about the interior of the spherically shaped shell 1260.

Each wheel 1282, 1286 is controlled independent of the other wheel 1286, 1282 by a respective wheel controller motor 1280, 1281. The first pivot axle rotational wheel 1282 rotates in accordance with a first wheel rotational motion 1212. Similarly, the second pivot axle rotational wheel 1286 rotates in accordance with a second wheel rotational motion 1216. The first wheel rotational motion 1212 and the second wheel rotational motion 1216 can rotate in the same direction to rotate the mass controller pivot axle 1290 about the central vertical axis 1250, referenced as a pivot axle rotational motion 1288. The first wheel rotational motion 1212 and the second wheel rotational motion 1216 can rotate in an opposite direction from one another causing the mass controller pivot axle 1290 to rotate about the elongated axis thereof.

In the exemplary embodiment, each wheel 1282, 1286 is independently controlled. In an alternative variant, the first pivot axle rotational wheel 1282 on one distal end and the second pivot axle rotational wheel 1286 on the opposite distal end can be independently controlled and the remaining wheels would rotate freely.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REFERENCE ELEMENT DESCRIPTIONS

Ref No. Description
102 surface
104 user
106 remote hand controller
108 case
110 handles
111 on-off switch
112 joy sticks
113 joy sticks
114 power cord
120 remotely controlled aeronautical vehicle
122 top portion
124 flattened bottom
140 self-righting frame assembly
142 substantially identical vertically oriented frames
144 circular shaped outer curved edge
146 central void
148 inner edge
150 central vertical axis
152 horizontal frame
154 weighted mass
156 center of gravity
158 protrusion
159 spherical portion
170 maneuvering and lift mechanism
172 aerodynamic rotor
173 second aerodynamic rotor
174 mast
176 power supply
178 remote control electronics
180 stabilizer bar
181 weights
186 major axis (represented by dimension "a")
187 minor axis (represented by dimension "b")
188 weight vector
189 moment force "M"
190 angle "A"
191 dimension "X"
192 dimension "Y"
193 dimensional distance of "Z"
194 contact point
195 frame contact points
200 direction controlling weight
210 weight body
212 weight installation slot
320 remotely controlled aeronautical vehicle
322 top portion
324 flattened bottom
340 self-righting frame assembly
342 substantially identical vertically oriented frames
344 circular shaped outer curved edge
346 central void
348 inner edge
350 central vertical axis
352 horizontal frame
354 weighted mass
356 center of gravity
358 protrusion
359 spherical portion
360 lift and stabilization element
362 lift and stabilization panel peripheral edge
364 lift and stabilization panel distal end point
366 lift and stabilization panel proximal end point
368 lift and stabilization panel upper surface
369 lift and stabilization panel lower surface
370 maneuvering and lift mechanism
372 aerodynamic rotor
373 second aerodynamic rotor
374 mast
376 power supply
378 remote control electronics
380 stabilizer bar
381 weights
420 remotely controlled aeronautical vehicle
422 top portion
424 flattened bottom
440 self-righting frame assembly
442 substantially identical vertically oriented frame
444 circular shaped outer curved edge
446 central void
448 inner edge
450 central vertical axis
451 horizontal peripheral boundary
454 weighted mass
456 center of gravity
458 protrusion
459 spherical portion
460 central horizontal plane support beam
462 secondary horizontal plane support beam
464 first central traversing beam
466 second central traversing beam
470 maneuvering and lift mechanism 472 first rotating direction aerodynamic rotor
473 second rotating direction aerodynamic rotor
476 power supply
478 remote control electronics
520 remotely controlled aeronautical vehicle
540 self-righting frame assembly
542 substantially identical vertically oriented frame
544 circular shaped outer curved edge
546 central void
550 central vertical axis
552 horizontal frame
554 weighted mass
558 protrusion
559 spherical portion
572 first rotating direction aerodynamic rotor
573 second rotating direction aerodynamic rotor
580 stabilizer bar
581 weights
620 remotely controlled aeronautical vehicle
640 self-righting frame assembly
642 vertically oriented flexible arch shaped upper frame segment
643 vertically oriented flexible arch shaped lower frame segment
644 arch shaped outer curved edge
646 central void
648 vertically oriented flexible arch shaped upper frame segment inner edge
650 central vertical axis
654 weighted mass controller assembly
656 center of gravity
658 protrusion
660 central horizontal plane support beam
668 frame assembly fitting
669 frame assembly fastener
670 maneuvering and lift mechanism
671 lift mechanism mounting element
672 first rotating direction aerodynamic rotor
673 second rotating direction aerodynamic rotor
682 vertically oriented flexible arch shaped frame upper frame segment hollowed interior
683 vertically oriented flexible arch shaped lower frame segment hollowed interior
688 protrusion hollowed interior
720 remotely controlled aeronautical vehicle
740 self-righting frame assembly
742 vertically oriented flexible arch shaped upper frame segment
743 vertically oriented flexible arch shaped lower frame segment
744 arch shaped outer curved edge
746 central void
748 vertically oriented flexible arch shaped upper frame segment inner edge
749 vertically oriented flexible arch shaped lower frame segment inner edge
750 central vertical axis
754 weighted mass controller assembly
756 center of gravity
758 protrusion
760 central horizontal plane support beam
762 secondary horizontal plane support beam
768 frame assembly fitting
769 frame assembly fastener
770 maneuvering and lift mechanism
771 lift mechanism mounting element
772 first rotating direction aerodynamic rotor
773 second rotating direction aerodynamic rotor
779 Global Positioning System (GPS) circuit
810 support normal force
812 controller assembly weight
814 moment arm
816 frame assembly self-righting motion
818 controller assembly self-righting motion
820 remotely controlled aeronautical travel and inspection vehicle
840 self-righting frame assembly
842 radially oriented circular shaped frame segment
844 circular shaped outer curved edge
846 central void
848 radially oriented circular shaped frame segment inner edge
850 central vertical axis
854 weighted mass controller assembly
856 center of gravity
860 first axially oriented circular shaped frame segment
862 second axially oriented circular shaped frame segment
870 maneuvering and lift mechanism
871 lift mechanism mounting element
872 first rotating direction aerodynamic rotor
873 second rotating direction aerodynamic rotor
876 power supply
877 controller circuit
878 remote control electronics
879 inspection equipment
890 mass controller pivot axle
892 mass controller pivot axle bushing or bearing
894 mass controller mounting element
920 remotely controlled aeronautical travel and inspection vehicle
940 self-righting frame assembly
942 radially oriented circular shaped frame segment
946 central void
950 central vertical axis
954 weighted mass controller assembly
956 center of gravity
960 first axially oriented circular shaped frame segment
962 second axially oriented circular shaped frame segment
963 second axially oriented circular shaped frame segment guide edge
970 maneuvering and lift mechanism
971 lift mechanism mounting element
972 first rotating direction aerodynamic rotor
973 second rotating direction aerodynamic rotor
980 pivot axle rotational wheel controller motor
982 pivot axle rotational wheel
983 pivot axle rotational wheel concave shaped engaging surface
984 pivot axle rotational wheel shaft
988 pivot axle rotational motion
990 mass controller pivot axle
994 mass controller mounting element
996 pivot axle rotational wheel mounting bracket
1000 at least partially enclosed structure
1010 partially enclosed structure interior surface
1020 inspection vehicle travel path
1022 vehicle lifting force
1024 vehicle frame rotation
1120 remotely controlled terrestrial vehicle
1146 central void
1150 central vertical axis
1154 weighted mass controller assembly
1160 spherically shaped shell
1162 circular ring shaped frame element 1163 circular ring shaped frame element guide edge
1179 inspection equipment
1180 pivot axle rotational wheel controller motor
1182 pivot axle rotational wheel
1183 pivot axle rotational wheel concave shaped engaging surface
1184 pivot axle rotational wheel shaft
1188 pivot axle rotational motion
1189 pivot axle pivotal drive motion
1190 mass controller pivot axle
1194 mass controller mounting element
1195 mass controller pivot control mechanism
1196 pivot axle rotational wheel mounting bracket
1212 first wheel rotational motion
1216 second wheel rotational motion
1220 remotely controlled terrestrial vehicle
1246 central void
1250 central vertical axis
1254 weighted mass controller assembly
1260 spherically shaped shell
1279 inspection equipment
1280 first pivot axle rotational wheel controller motor
1281 second pivot axle rotational wheel controller motor
1282 first pivot axle rotational wheel
1286 second pivot axle rotational wheel
1288 pivot axle rotational motion
1289 pivot axle pivotal drive motion
1290 mass controller pivot axle
1294 mass controller mounting element
1295 mass controller pivot control mechanism
1296 pivot axle rotational wheel mounting bracket

What is claimed is:

1. A method of using an aeronautical vehicle to inspect a structure, the method comprising steps of:
    obtaining the aeronautical vehicle, the aeronautical vehicle comprising:
        a hollowed frame, the hollowed frame having a circular circumferential exterior surface,
        a pivot axle extending along a central horizontal axis of the hollowed frame, the circular circumferential exterior surface being concentric and radially arranged about the pivot axle,
        a weighted mass controller assembly assembled to the pivot axis in a manner enabling self-righting of the weighted mass controller assembly during use, a center of gravity of the weighted mass controller assembly being located below the pivot axle, and
        at least one maneuvering and lift mechanism adapted to generate a lifting force;
    activating the aeronautical vehicle;
    placing the aeronautical vehicle against a generally vertically oriented surface;
    using the at least one maneuvering and lift mechanism to generate a lifting force, lifting the aeronautical vehicle; and
    rolling the hollowed frame against the generally vertically oriented surface.

2. A method of using an aeronautical vehicle as recited in claim 1, the method further comprising steps of:
    orienting the pivot axle substantially parallel to the generally vertically oriented surface;
    rotating the hollowed frame about the pivot axle.

3. A method of using an aeronautical vehicle as recited in claim 1, the hollowed frame having a spherically shaped circumferential exterior surface,
    the method further comprising a step of:
        rotating the spherically shaped circumferential exterior surface along the generally vertically oriented surface.

4. A method of using an aeronautical vehicle as recited in claim 1, the hollowed frame having a spherically shaped circumferential exterior surface, the aeronautical vehicle further comprising a rotational mechanism adapted to rotate the pivot axle about a central vertical axis, the central vertical axis being perpendicular to the elongated pivot axis,
    the method further comprising steps of:
        rotating the pivot axle about the central vertical axis to align the pivot axle in an orientation that is substantially parallel to the generally vertically oriented surface; and
        rotating the spherically shaped circumferential exterior surface about the pivot axle, the spherically shaped circumferential exterior surface traveling along the generally vertically oriented surface.

5. A method of using an aeronautical vehicle as recited in claim 1, the hollowed frame having a spherically shaped circumferential exterior surface, the aeronautical vehicle further comprising a rotational mechanism adapted to rotate the pivot axle about a central vertical axis, the central vertical axis being perpendicular to the elongated pivot axis,
    the method further comprising steps of:
        adapting the rotational mechanism to rotated about an interior equator of the spherically shaped aeronautical vehicle;
        rotating the pivot axle about the central vertical axis to align the pivot axle in an orientation that is substantially parallel to the generally vertically oriented surface; and
        rotating the spherically shaped circumferential exterior surface about the pivot axle, the spherically shaped circumferential exterior surface traveling along the generally vertically oriented surface.

6. A method of using an aeronautical inspection vehicle as recited in claim 1,
    the aeronautical vehicle further comprising:
        at least one inspection device for inspecting an object;
    the method further comprising a step of:
        acquiring inspection data.

7. A method of using an aeronautical vehicle as recited in claim 6, the method further comprising a step of:
    using at least one of the following to inspect the object:
        a digital camera,
        an Infra-Red (IR) circuit,
        an ultrasonic inspection circuit,
        an X-ray circuit, and
        an accelerometer,
        an acoustic device,
        a thermographer,
        a pressure sensor, and
        a radiographic sensor.

8. A method of using an aeronautical vehicle as recited in claim 6, the method further comprising a step of:
    inspecting at least one of:
        piping,
        a tank,
        a fuel tank,
        a water tank,
        a cargo container,
        a ship,
        a train,
        an airplane,
        a rocket,
        a spaceship,
        a tunnel, a building,
a bridge, and
an elevator.

9. A method of using an aeronautical vehicle as recited in claim 1, the aeronautical vehicle further comprising at least one wheel located at each distal end of the pivot axle, wherein each at least one wheel is adapted to rotate the pivot axle about a central vertical axis, the central vertical axis being perpendicular to the elongated pivot axis,
the method further comprising steps of:
rotating the pivot axle about the central vertical axis to align the pivot axle in an orientation that is substantially parallel to the generally vertically oriented surface; and
rotating the spherically shaped circumferential exterior surface about the pivot axle, the spherically shaped circumferential exterior surface traveling along the generally vertically oriented surface.

10. A method of using an aeronautical vehicle as recited in claim 1, each at least one maneuvering and lift mechanism is carried by the weighted mass controller assembly,
the method further comprising a step of:
orienting each at least one maneuvering and lift mechanism into a flight ready orientation by pivoting the weighted mass controller assembly.

11. A method of using an aeronautical vehicle as recited in claim 1, the method further comprising a step of:
self-righting the hollowed frame into a flight ready orientation when the aeronautical vehicle lands on a generally planar horizontal surface, wherein the flight ready orientation orients the pivot axle in a generally horizontal orientation.

12. A method of using an aeronautical vehicle to inspect a structure, the method comprising steps of:
obtaining the aeronautical vehicle, the aeronautical vehicle comprising:
a hollowed spherically shaped frame, the hollowed spherically shaped frame having a spherically shaped circumferential exterior surface,
a pivot axle extending along a central horizontal axis of the hollowed spherically shaped frame, the hollowed spherically shaped frame being concentrically arranged about the pivot axle,
a weighted mass controller assembly assembled to the pivot axis in a manner enabling self-righting of the weighted mass controller assembly during use, a center of gravity of the weighted mass controller assembly being located below the pivot axle, and
at least one maneuvering and lift mechanism adapted to generate a lifting force;
activating the aeronautical vehicle;
placing the aeronautical vehicle against a generally vertically oriented surface;
using the at least one maneuvering and lift mechanism to generate a lifting force, lifting the aeronautical vehicle; and
rolling the hollowed spherically shaped frame against the generally vertically oriented surface.

13. A method of using an aeronautical vehicle as recited in claim 12, the method further comprising steps of:
orienting the pivot axle substantially parallel to the generally vertically oriented surface;
rotating the hollowed spherically shaped frame about the pivot axle.

14. A method of using an aeronautical vehicle as recited in claim 12, the aeronautical vehicle further comprising a rotational mechanism adapted to rotate the pivot axle about a central vertical axis, the central vertical axis being perpendicular to the elongated pivot axis,
the method further comprising steps of:
rotating the pivot axle about the central vertical axis to align the pivot axle in an orientation that is substantially parallel to the generally vertically oriented surface; and
rotating the spherically shaped circumferential exterior surface about the pivot axle, the spherically shaped circumferential exterior surface traveling along the generally vertically oriented surface.

15. A method of using an aeronautical vehicle as recited in claim 12, the aeronautical vehicle further comprising a rotational mechanism adapted to rotate the pivot axle about a central vertical axis, the central vertical axis being perpendicular to the elongated pivot axis,
the method further comprising steps of:
adapting the rotational mechanism to rotated about an interior equator of the spherically shaped aeronautical vehicle;
rotating the pivot axle about the central vertical axis to align the pivot axle in an orientation that is substantially parallel to the generally vertically oriented surface; and
rotating the spherically shaped circumferential exterior surface about the pivot axle, the spherically shaped circumferential exterior surface traveling along the generally vertically oriented surface.

16. A method of using an aeronautical vehicle as recited in claim 12, the aeronautical vehicle further comprising at least one wheel located at each distal end of the pivot axle, wherein each at least one wheel is adapted to rotate the pivot axle about a central vertical axis, the central vertical axis being perpendicular to the elongated pivot axis,
the method further comprising steps of:
rotating the pivot axle about the central vertical axis to align the pivot axle in an orientation that is substantially parallel to the generally vertically oriented surface; and
rotating the spherically shaped circumferential exterior surface about the pivot axle, the spherically shaped circumferential exterior surface traveling along the generally vertically oriented surface.

17. A method of using an aeronautical vehicle as recited in claim 12, further comprising a step of self-righting of the weighted mass controller assembly during use by at least one of:
pivoting the weighted mass controller assembly about the pivot axle, and
pivoting the pivot axle within the hollowed spherically shaped frame about an elongated axis of the pivot axle.

18. A method of using an aeronautical inspection vehicle as recited in claim 12,
the aeronautical vehicle further comprising:
at least one inspection device for inspecting an object;
the method further comprising a step of:
acquiring inspection data.

19. A method of using an aeronautical vehicle as recited in claim 18, the method further comprising a step of:
using at least one of the following to inspect the object:
a digital camera,
an Infra-Red (IR) circuit,
an ultrasonic inspection circuit,
an X-ray circuit, and
an accelerometer,
an acoustic device,
a thermographer, a pressure sensor, and
a radiographic sensor.

20. A method of using an aeronautical vehicle as recited in claim 18, the method further comprising a step of:
inspecting at least one of:
piping,
a tank,
a fuel tank,
a water tank,
a cargo container,
a ship,
a train,
an airplane,
a rocket,
a spaceship,
a tunnel,
a building,
a bridge, and
an elevator.

21. A method of using an aeronautical vehicle as recited in claim 12, the method further comprising a step of:
self-righting the hollowed spherically shaped frame into a flight ready orientation when the aeronautical vehicle lands on a generally planar horizontal surface, wherein the flight ready orientation orients the pivot axle in a generally horizontal orientation.

22. A method of using an aeronautical vehicle as recited in claim 12, each at least one maneuvering and lift mechanism is carried by the weighted mass controller assembly, the method further comprising a step of:
orienting each at least one maneuvering and lift mechanism into a flight ready orientation by pivoting the weighted mass controller assembly.

* * * * *